(12) United States Patent
Bromberg et al.

(10) Patent No.: US 12,257,778 B2
(45) Date of Patent: Mar. 25, 2025

(54) ADDITIVE MANUFACTURING RECOAT ASSEMBLIES INCLUDING A VACUUM AND METHODS FOR USING THE SAME

(71) Applicant: General Electric Company, Schenectady, NY (US)

(72) Inventors: Vadim Bromberg, Niskayuna, NY (US); John Sterle, Clifton Park, NY (US); Sara Rostami, Sherman Oaks, CA (US)

(73) Assignee: General Electric Company, Evendale, OH (US)

( * ) Notice: Subject to any disclaimer, the term of this patent is extended or adjusted under 35 U.S.C. 154(b) by 551 days.

(21) Appl. No.: 17/611,265

(22) PCT Filed: May 22, 2020

(86) PCT No.: PCT/US2020/034204
§ 371 (c)(1),
(2) Date: Nov. 15, 2021

(87) PCT Pub. No.: WO2020/237142
PCT Pub. Date: Nov. 26, 2020

(65) Prior Publication Data
US 2022/0227047 A1    Jul. 21, 2022

Related U.S. Application Data

(60) Provisional application No. 62/851,955, filed on May 23, 2019.

(51) Int. Cl.
*B29C 64/214*     (2017.01)
*B22F 10/14*      (2021.01)
(Continued)

(52) U.S. Cl.
CPC .......... *B29C 64/214* (2017.08); *B29C 64/153* (2017.08); *B29C 64/218* (2017.08);
(Continued)

(58) Field of Classification Search
CPC ... B29C 64/214; B29C 64/153; B29C 64/393; B29C 64/35; B29C 64/218; B33Y 40/20;
(Continued)

(56) References Cited

U.S. PATENT DOCUMENTS 4,034,219 A    7/1977   Ouden et al.
4,680,895 A    7/1987   Roestenberg
(Continued)

FOREIGN PATENT DOCUMENTS

CN    204366039 U    6/2015
CN    105188993 A    12/2015
(Continued)

OTHER PUBLICATIONS

Chinese Office Action for Application No. 202080052391.5 dated Jan. 11, 2024 (20 pages with English Translation).
(Continued)

*Primary Examiner* — Nahida Sultana
(74) *Attorney, Agent, or Firm* — Dinsmore & Shohl LLP

(57) ABSTRACT

A recoat assembly (200) for an additive manufacturing system includes a base member (250) that is movable in a lateral direction, a powder spreading member (202, 204) coupled to the base member (250), wherein the base member (250) at least partially encapsulates the powder spreading member (202, 204), and a vacuum (290) in fluid communication with at least a portion of the base member (250).

15 Claims, 44 Drawing Sheets

(51) Int. Cl.
  *B22F 10/20* (2021.01)
  *B22F 10/73* (2021.01)
  *B22F 12/00* (2021.01)
  *B22F 12/63* (2021.01)
  *B22F 12/67* (2021.01)
  *B29C 64/153* (2017.01)
  *B29C 64/218* (2017.01)
  *B29C 64/35* (2017.01)
  *B29C 64/393* (2017.01)
  *B33Y 10/00* (2015.01)
  *B33Y 30/00* (2015.01)
  *B33Y 40/20* (2020.01)
  *B33Y 50/02* (2015.01)

(52) U.S. Cl.
  CPC ............ *B29C 64/35* (2017.08); *B29C 64/393* (2017.08); *B33Y 10/00* (2014.12); *B33Y 30/00* (2014.12); *B33Y 40/20* (2020.01); *B33Y 50/02* (2014.12); *B22F 10/14* (2021.01); *B22F 10/20* (2021.01); *B22F 10/73* (2021.01); *B22F 12/222* (2021.01); *B22F 12/226* (2021.01); *B22F 12/63* (2021.01); *B22F 12/67* (2021.01)

(58) Field of Classification Search
  CPC ......... B33Y 10/10; B33Y 30/00; B33Y 50/02; B22F 10/14; B22F 10/20; B22F 10/73; B22F 12/226; B22F 12/222; B22F 12/67; B22F 12/63
  See application file for complete search history.

(56) References Cited

U.S. PATENT DOCUMENTS

| | | |
|---|---|---|
| 4,722,824 A | 2/1988 | Wiech, Jr. |
| 4,853,717 A | 8/1989 | Harmon et al. |
| 5,204,055 A | 4/1993 | Sachs et al. |
| 5,234,636 A | 8/1993 | Hull et al. |
| 5,387,380 A | 2/1995 | Cima et al. |
| 5,610,824 A | 3/1997 | Vinson et al. |
| 5,672,579 A | 9/1997 | Diaz et al. |
| 5,810,988 A | 9/1998 | Smith, Jr. et al. |
| 5,847,283 A | 12/1998 | Finot et al. |
| 5,902,537 A | 5/1999 | Almquist et al. |
| 5,997,128 A | 12/1999 | Lou et al. |
| 6,007,318 A | 12/1999 | Russell et al. |
| 6,146,567 A | 11/2000 | Sachs et al. |
| 6,158,838 A | 12/2000 | Capurso |
| 6,159,085 A | 12/2000 | Hara |
| 6,164,751 A | 12/2000 | Griffin et al. |
| 6,241,337 B1 | 6/2001 | Sharma et al. |
| 6,372,178 B1 | 4/2002 | Tseng |
| 6,375,874 B1 | 4/2002 | Russell et al. |
| 6,406,122 B1 | 6/2002 | Sharma et al. |
| 6,416,850 B1 | 7/2002 | Bredt et al. |
| 6,454,811 B1 | 9/2002 | Sherwood et al. |
| 6,497,471 B1 | 12/2002 | Gargir |
| 6,595,618 B1 | 7/2003 | Roy et al. |
| 6,596,224 B1 | 7/2003 | Sachs et al. |
| 6,764,636 B1 | 7/2004 | Allanic et al. |
| 6,896,839 B2 | 5/2005 | Kubo et al. |
| 6,899,777 B2 | 5/2005 | Vaidyanathan et al. |
| 6,986,654 B2 | 1/2006 | Imiolek et al. |
| 6,989,115 B2 | 1/2006 | Russell et al. |
| 7,037,382 B2 | 5/2006 | Davidson et al. |
| 7,225,803 B2 | 6/2007 | Boyadjieff |
| 7,291,002 B2 | 11/2007 | Russell et al. |
| 7,296,990 B2 | 11/2007 | Devos et al. |
| 7,387,359 B2 | 6/2008 | Hernandez et al. |
| 7,389,154 B2 | 6/2008 | Hunter et al. |
| 7,435,368 B2 | 10/2008 | Davidson et al. |
| 7,520,740 B2 | 4/2009 | Wahlstrom et al. |
| 7,665,636 B2 | 2/2010 | Ederer et al. |
| 7,686,995 B2 | 3/2010 | Davidson et al. |
| 7,690,909 B2 | 4/2010 | Wahlstrom |
| 7,700,020 B2 | 4/2010 | Nielsen et al. |
| 7,736,578 B2 | 6/2010 | Ederer |
| 7,790,093 B2 | 9/2010 | Shkolnik et al. |
| 7,824,001 B2 | 11/2010 | Fienup et al. |
| 7,897,074 B2 | 3/2011 | Batchelder et al. |
| 7,962,238 B2 | 6/2011 | Shkolnik et al. |
| 7,979,152 B2 | 7/2011 | Davidson |
| 8,017,055 B2 | 9/2011 | Davidson et al. |
| 8,033,812 B2 | 10/2011 | Collins et al. |
| 8,105,527 B2 | 1/2012 | Wahlstrom |
| 8,167,395 B2 | 5/2012 | Fienup et al. |
| 8,185,229 B2 | 5/2012 | Davidson |
| 8,862,260 B2 | 10/2014 | Shkolnik et al. |
| 8,979,244 B2 | 3/2015 | Kritchman et al. |
| 8,997,799 B2 | 4/2015 | Hodson et al. |
| 9,193,164 B2 | 11/2015 | Kritchman et al. |
| 9,403,322 B2 | 8/2016 | Das et al. |
| 9,415,443 B2 | 8/2016 | Ljungblad et al. |
| 9,434,838 B2 | 9/2016 | Jung et al. |
| 9,446,448 B2 | 9/2016 | Mccoy et al. |
| 9,561,622 B2 | 2/2017 | Das et al. |
| 9,586,364 B2 | 3/2017 | El-Siblani et al. |
| 9,757,831 B2 | 9/2017 | Ederer et al. |
| 9,912,915 B2 | 3/2018 | Sinclair |
| 9,956,612 B1 | 5/2018 | Redding et al. |
| 9,962,767 B2 | 5/2018 | Buller et al. |
| 10,000,009 B2 | 6/2018 | Maier |
| 10,022,794 B1 | 7/2018 | Redding et al. |
| 10,022,795 B1 | 7/2018 | Redding et al. |
| 10,029,440 B2 | 7/2018 | Satoh |
| 10,073,434 B1 | 9/2018 | Hollander |
| 10,232,443 B2 | 3/2019 | Myerberg et al. |
| 2001/0050448 A1 | 12/2001 | Kubo et al. |
| 2002/0079601 A1 | 6/2002 | Russell et al. |
| 2002/0089081 A1 | 7/2002 | Fong |
| 2004/0145623 A1 | 7/2004 | Choi |
| 2004/0160472 A1 | 8/2004 | Khalid et al. |
| 2004/0173946 A1 | 9/2004 | Pfeifer et al. |
| 2004/0263557 A1 | 12/2004 | Premnath et al. |
| 2006/0098040 A1 | 5/2006 | Kang |
| 2006/0246222 A1 | 11/2006 | Winkler |
| 2007/0077323 A1 | 4/2007 | Stonesmith et al. |
| 2008/0190905 A1 | 8/2008 | Heinlein |
| 2008/0200104 A1 | 8/2008 | Chuang |
| 2008/0241404 A1 | 10/2008 | Allaman et al. |
| 2010/0151136 A1 | 6/2010 | Davidson et al. |
| 2011/0074866 A1 | 3/2011 | Imamura et al. |
| 2011/0190923 A1 | 8/2011 | Matsui et al. |
| 2012/0274701 A1 | 11/2012 | Zhou et al. |
| 2013/0000553 A1 | 1/2013 | Hoechsmann et al. |
| 2014/0092172 A1 | 4/2014 | Koshi et al. |
| 2014/0220168 A1 | 8/2014 | Perez et al. |
| 2015/0145177 A1 | 5/2015 | El-Siblani et al. |
| 2015/0151973 A1 | 6/2015 | Lee et al. |
| 2015/0258706 A1 | 9/2015 | Okamoto et al. |
| 2015/0266242 A1 | 9/2015 | Comb et al. |
| 2015/0273762 A1 | 10/2015 | Okamoto |
| 2015/0343533 A1 | 12/2015 | Park et al. |
| 2016/0039207 A1 | 2/2016 | Kritchman et al. |
| 2016/0067929 A1 | 3/2016 | Park |
| 2016/0075085 A1 | 3/2016 | Sasaki |
| 2016/0151973 A1 | 6/2016 | Jover et al. |
| 2016/0214320 A1 | 7/2016 | Sasaki et al. |
| 2016/0221263 A1 | 8/2016 | Din et al. |
| 2016/0221269 A1 | 8/2016 | Okamoto et al. |
| 2016/0325496 A1 | 11/2016 | De Pena et al. |
| 2016/0325503 A1 | 11/2016 | Mironets et al. |
| 2016/0332380 A1 | 11/2016 | De Pena et al. |
| 2016/0361874 A1 | 12/2016 | Park et al. |
| 2016/0368054 A1 | 12/2016 | Ng et al. |
| 2016/0368214 A1* | 12/2016 | Sasaki .................. B33Y 10/00 |
| 2017/0014911 A1 | 1/2017 | Ng et al. |
| 2017/0021569 A1 | 1/2017 | Puigardeu Aramendia et al. |
| 2017/0056974 A1 | 3/2017 | Miyashita et al. |
| 2017/0072644 A1 | 3/2017 | Ng et al. |
| 2017/0095980 A1 | 4/2017 | Kritchman et al. |
| 2017/0100937 A1 | 4/2017 | Ohnishi |
| 2017/0115594 A1 | 4/2017 | Martin |

(56) References Cited

U.S. PATENT DOCUMENTS

| | | |
|---|---|---|
| 2017/0136695 A1 | 5/2017 | Versluys et al. |
| 2017/0203513 A1 | 7/2017 | Chanclon et al. |
| 2017/0217104 A1 | 8/2017 | Cortes I Herms et al. |
| 2017/0225227 A1* | 8/2017 | Volk ................ B22F 10/47 |
| 2017/0239889 A1 | 8/2017 | Ganapathiappan et al. |
| 2017/0239932 A1 | 8/2017 | Knecht et al. |
| 2017/0252975 A1 | 9/2017 | Park |
| 2017/0259456 A1 | 9/2017 | Sasaki et al. |
| 2017/0305142 A1 | 10/2017 | Yamaguchi |
| 2017/0318186 A1 | 11/2017 | Morovic et al. |
| 2017/0326792 A1 | 11/2017 | Paternoster et al. |
| 2017/0334138 A1 | 11/2017 | Vilajosana et al. |
| 2017/0341365 A1 | 11/2017 | De Lajudie et al. |
| 2017/0355137 A1 | 12/2017 | Ederer et al. |
| 2017/0368756 A1 | 12/2017 | Sanz Ananos et al. |
| 2018/0001559 A1 | 1/2018 | Paternoster et al. |
| 2018/0004192 A1 | 1/2018 | Perret et al. |
| 2018/0009157 A1 | 1/2018 | Gutierrez et al. |
| 2018/0009167 A1 | 1/2018 | Alejandre et al. |
| 2018/0011475 A1 | 1/2018 | Donovan et al. |
| 2018/0071820 A1 | 3/2018 | Natarajan et al. |
| 2018/0079137 A1 | 3/2018 | Herzog et al. |
| 2018/0126632 A1 | 5/2018 | Bonatsos et al. |
| 2018/0141271 A1 | 5/2018 | Gunther et al. |
| 2018/0154480 A1 | 6/2018 | Bai et al. |
| 2018/0193947 A1 | 7/2018 | Harding et al. |
| 2018/0200791 A1* | 7/2018 | Redding ............ B29C 64/153 |
| 2018/0236549 A1 | 8/2018 | Spears et al. |
| 2018/0311898 A1 | 11/2018 | Schwarzbaum et al. |
| 2018/0326660 A1 | 11/2018 | Gifford et al. |
| 2018/0326712 A1 | 11/2018 | Raghavan et al. |
| 2018/0339467 A1* | 11/2018 | Donovan ........... B29C 64/218 |
| 2018/0370213 A1 | 12/2018 | Gold et al. |
| 2019/0001571 A1 | 1/2019 | Stockett et al. |
| 2019/0022752 A1 | 1/2019 | Twelves, Jr. et al. |
| 2019/0091766 A1 | 3/2019 | Kasperchik et al. |
| 2019/0111619 A1 | 4/2019 | Schalk et al. |
| 2019/0111628 A1* | 4/2019 | Martin ............... B29C 64/393 |
| 2019/0118468 A1 | 4/2019 | Bobar et al. |
| 2019/0126554 A1 | 5/2019 | Iwase |
| 2020/0101667 A1* | 4/2020 | Prakash ............. B29C 64/329 |
| 2020/0238613 A1* | 7/2020 | Shi ..................... B29C 64/393 |
| 2020/0376773 A1* | 12/2020 | Sweetland ......... B29C 64/393 |
| 2022/0072769 A1* | 3/2022 | Sweetland ......... B29C 64/218 |

FOREIGN PATENT DOCUMENTS

| | | |
|---|---|---|
| CN | 106457615 A | 2/2017 |
| CN | 106862570 A | 6/2017 |
| CN | 107175827 A | 9/2017 |
| CN | 107364126 A | 11/2017 |
| CN | 108165961 A | 6/2018 |
| CN | 108472869 A | 8/2018 |
| CN | 108927491 A | 12/2018 |
| EP | 1018429 A1 | 7/2000 |
| EP | 1108546 A1 | 6/2001 |
| EP | 1270185 A1 | 1/2003 |
| EP | 1440803 A1 | 7/2004 |
| EP | 1946907 A2 | 7/2008 |
| EP | 2543514 A2 | 1/2013 |
| EP | 3168035 A1 | 5/2017 |
| EP | 3205483 A1 | 8/2017 |
| EP | 3486008 A1 | 5/2019 |
| GB | 2550341 A | 11/2017 |
| GB | 2568518 A | 5/2019 |
| JP | H11157087 A | 6/1999 |
| JP | 2001334582 A | 12/2001 |
| JP | 2003508246 A | 3/2003 |
| JP | 2003211687 A | 7/2003 |
| JP | 2005319650 A | 11/2005 |
| JP | 2008086846 A | 4/2008 |
| JP | 2014065179 A | 4/2014 |
| JP | 2014527481 A | 10/2014 |
| JP | 2015174338 A | 10/2015 |
| JP | 2015182428 A | 10/2015 |
| JP | 2015193184 A | 11/2015 |
| JP | 2016093909 A | 5/2016 |
| JP | 2016107543 A | 6/2016 |
| JP | 2016141151 A | 8/2016 |
| JP | 2017508063 A | 3/2017 |
| JP | 2018503543 A | 2/2018 |
| JP | 2018516774 A | 6/2018 |
| JP | 2018520029 A | 7/2018 |
| JP | 2018523595 A | 8/2018 |
| JP | 2018526527 A | 9/2018 |
| WO | 20010117783 A1 | 3/2001 |
| WO | 2015100085 A2 | 7/2015 |
| WO | 2015151832 A1 | 10/2015 |
| WO | 2017023281 A1 | 2/2017 |
| WO | 2017177603 A1 | 10/2017 |
| WO | 2017196337 A1 | 11/2017 |
| WO | 2018026011 A1 | 2/2018 |
| WO | 2018072975 A1 | 4/2018 |
| WO | 2018091007 A1 | 5/2018 |
| WO | 2018143953 A1 | 8/2018 |
| WO | 2018194688 A1 | 10/2018 |
| WO | 2018231205 A1 | 12/2018 |
| WO | 2019027405 A1 | 2/2019 |
| WO | 2019027431 A1 | 2/2019 |
| WO | 2019059099 A1 | 3/2019 |
| WO | 2019066781 A1 | 4/2019 |
| WO | 2019194795 A1 | 10/2019 |
| WO | 2020066781 A1 | 4/2020 |
| WO | 2020237161 A1 | 11/2020 |

OTHER PUBLICATIONS

International Search Report and Written Opinion for application PCT/US2020/034254 mail date Aug. 24, 2020 (14 pages).
International Search Report and Written Opinion for application PCT/US2020/034261 mail date Jan. 29, 2021 (32 pages).
Japanese Office Action for Application No. 2021-567071 dated Nov. 29, 2022 (8 pages).
International Search Report and Written Opinion for application PCT/US2020/034144 mail date Jan. 13, 2021 (22 pages).
International Search Report and Written Opinion for application PCT/US2020/034207 mail date Sep. 1, 2020 (16 pages).
International Search Report and Written Opinion for application PCT/US2020/034205 mail date Nov. 13, 2020 (23 pages).
Japanese Patent Office Action for Application No. 2021-567073 dated Dec. 6, 2022 (5 pages).
International Search Report and Written Opinion for application PCT/US2020/034189 mail date Oct. 1, 2020 (24 pages).
International Search Report and Written Opinion for application PCT/US2020/034204 mail date Sep. 2, 2020 (15 pages).
International Search Report and Written Opinion for application PCT/US2020/034244 mail date Nov. 12, 2020 (23 pages).
Hewlett Packard Thermal Inkjet Printhead information sheet, undated (1 page).
International Search Report and Written Opinion for application PCT/US2020/034145 mail date Dec. 1, 2020 (21 pages).
International Search Report and Written Opinion for application PCT/US2020/034259 mail date of Dec. 1, 2020 (23 pages).
International Search Report and Written Opinion application PCT/US2020/034142 mail date Aug. 20, 2020 (15 pages).
International Search Report and Written Opinion for application PCT/US2020/034141 mail date Aug. 20, 2020 (27 pages).
Mercedes-Benz USA: "Magic Vision Control—Mercedes-Benz Windshield Wipers", YouTube, dated Nov. 21, 2013 (Nov. 21, 2013), pp. 1-1, XP054980752, Retrieved from the Internet: URL:https://www.youtube.com/watch?v=07AZHkkLROk [retrieved on Aug. 5, 2020] 0:13-0:40.
International Search Report and Written Opinion for application PCT/US2020/034140 mail date Nov. 27, 2020 (21 pages).
Hewlett Packard HP LaserJet Pro M404 Series information sheet, undated, https://www8.hp.com/h20195/v2/GetPDF.aspx/4AA7-4955EEP.pdf (5 pages).
"Solution Preparation Guidelines" The Sekisui Chemical Group, httpswww.sekisui-sc.comwp-contentuploadsSelvolPVOH_SolutionPreparationGuidelines_EN.pdf.

(56) References Cited

OTHER PUBLICATIONS

Cooke et al., "Process Intermittent Measurement for Powder-Bed Based Additive Manufacturing" National Institute of Standards and Technology, Gaithersburg, MD 208991, Institute for Research in Electronics and Applied Physics, University of Maryland, College Park, MD 20742-3511., Aug. 17, 2011.

Hong et al., "Solvent Effect on Structural Change of Poly(vinyl alcohol) Physical Gels" Journal of Applied Polymer Science • Sep. 1998, DOI: 10.1002/(SICI)1097-4628(19980919)69:123.0.CO;2-U.

Shanjani et al., "Material Spreading and Compaction in Powder-Based Solid Freeform Fabrication Methods: Mathematical Modeling" Department of Mechanical and Mechatronics Engineering, University of Waterloo, 200 University Avenue West Waterloo, ON N2L 3G1, Canada, Sep. 10, 2008.

Sparrow, "Evonik, Voxeljet partner to develop 3D-printing systems for series production of finished plastic parts", Plastics Today, Nov. 10, 2019, https://www.plasticstoday.com/3d-printing/evonik-voxeljet-partner-develop-3d-printing-systems-series-production-finished-plastic.

"Advanced DLP for Superior 3D Printing" EnvisionTec, Mar. 9, 2017.

European Patent Office Action for Application No. 20735467.1 dated Mar. 16, 2023 (4 pages).

European Patent Office Action for Application No. 20732377.5 dated Mar. 9, 2023 (5 pages).

\* cited by examiner

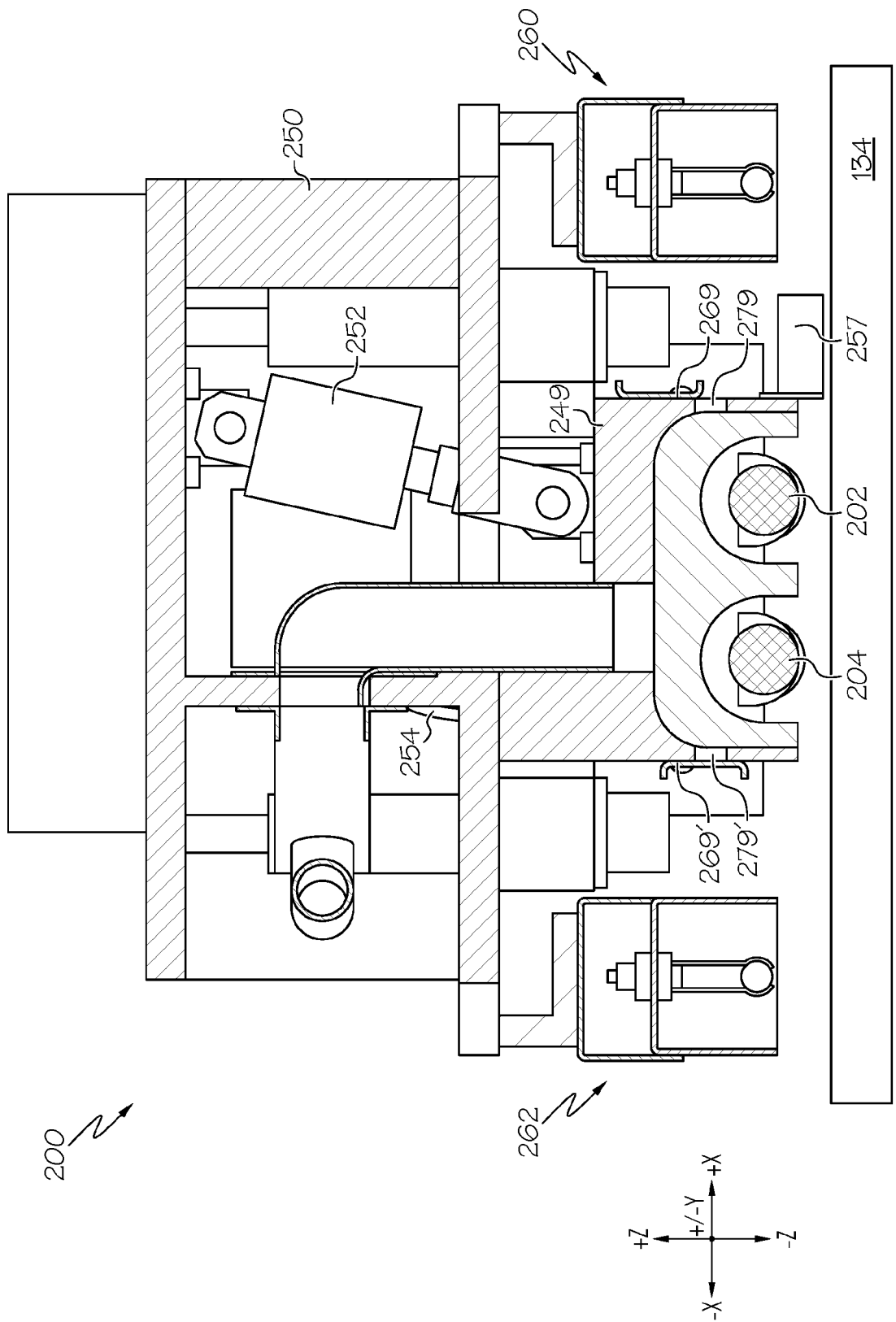

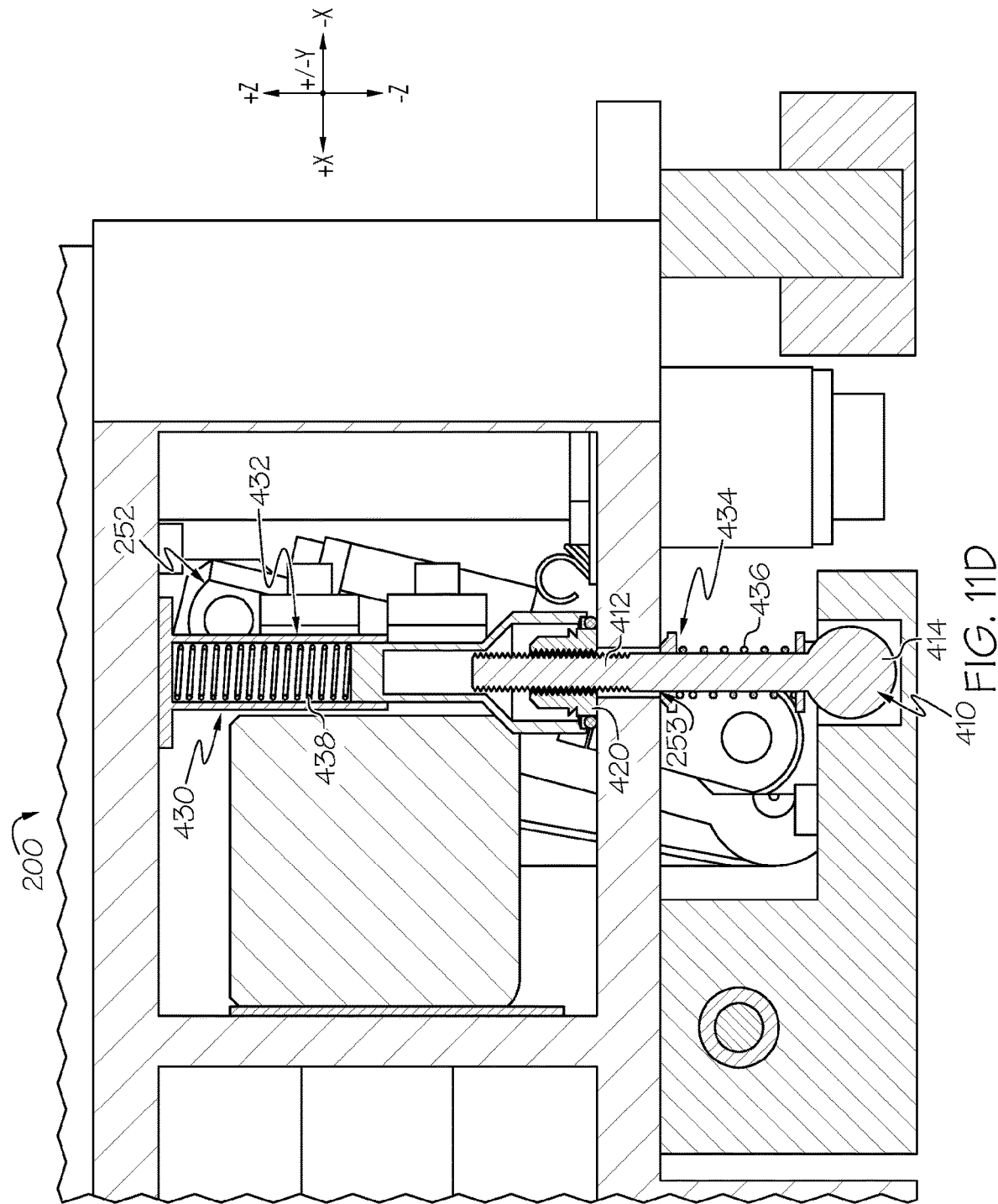

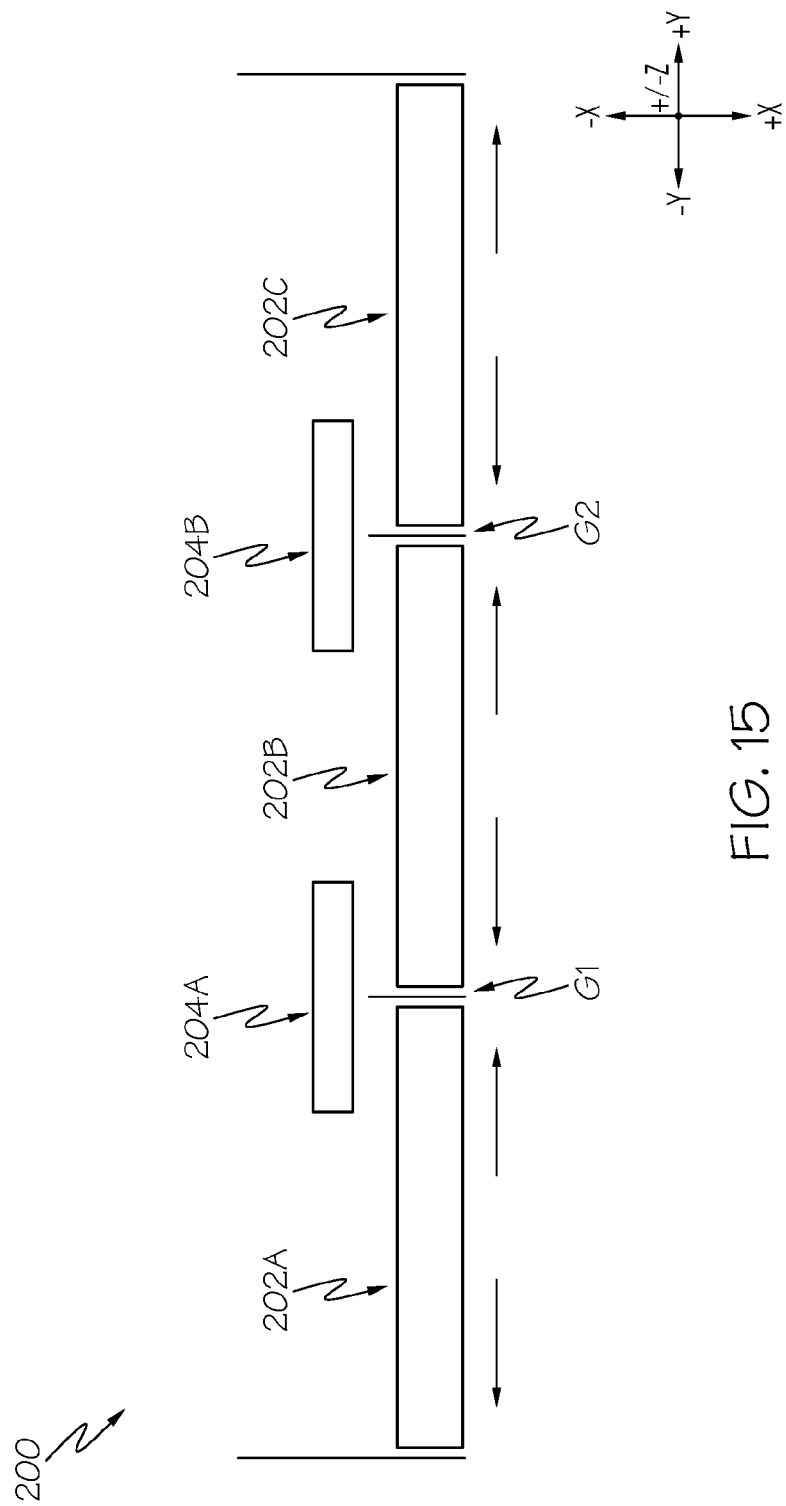

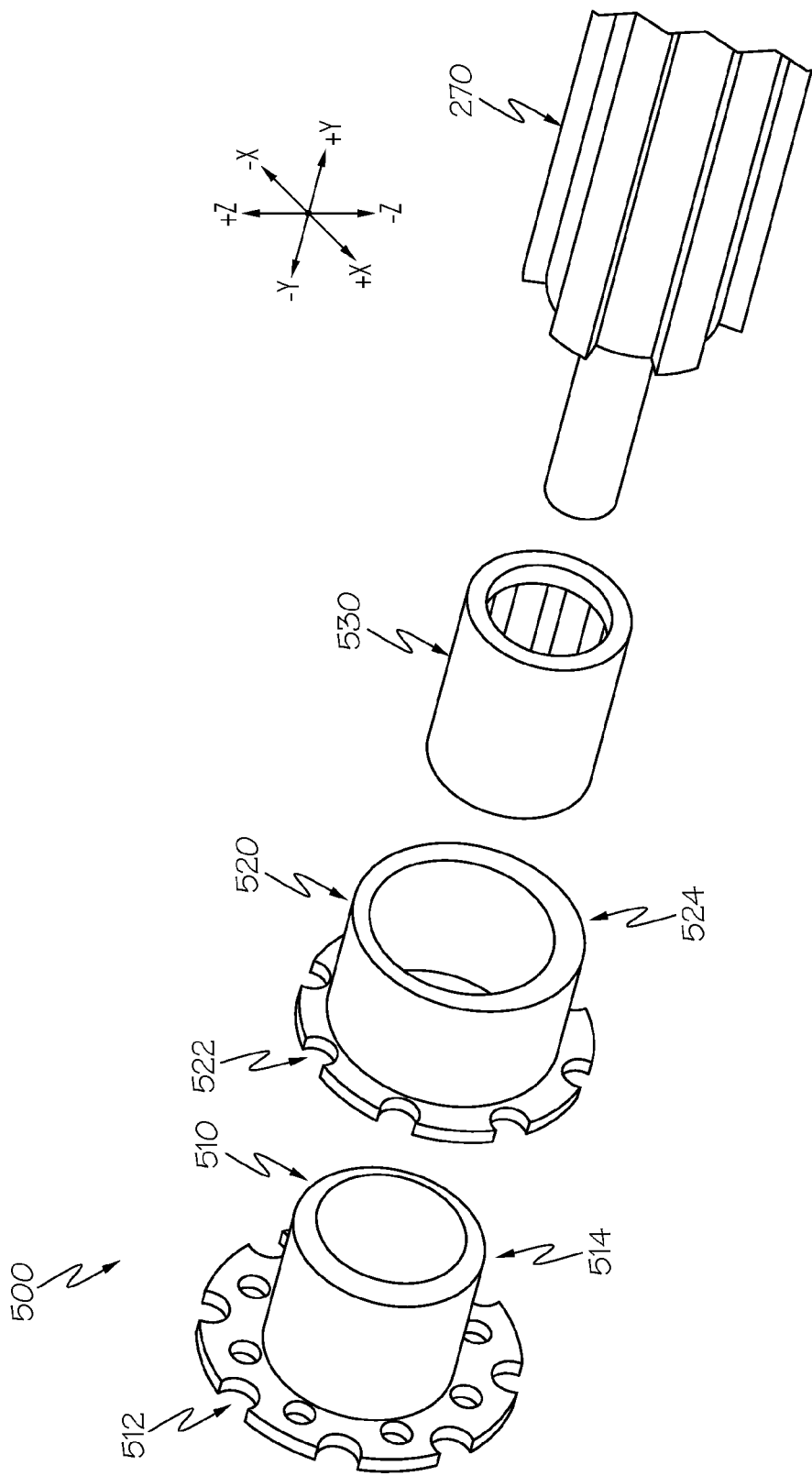

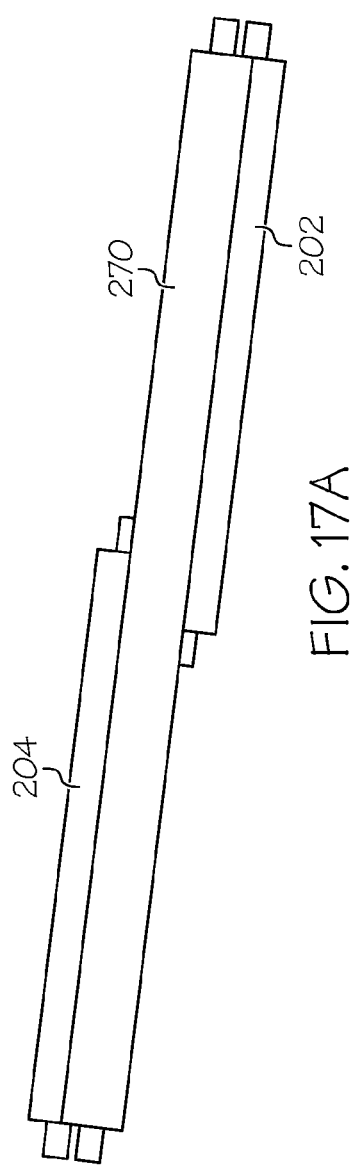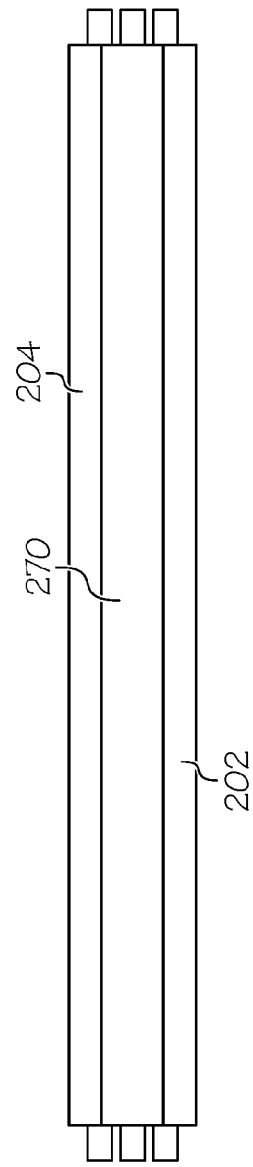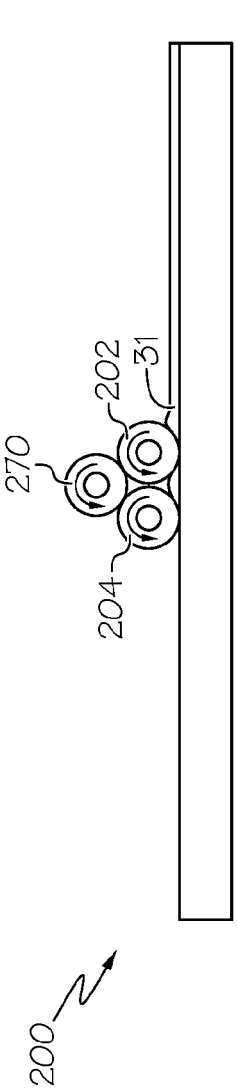

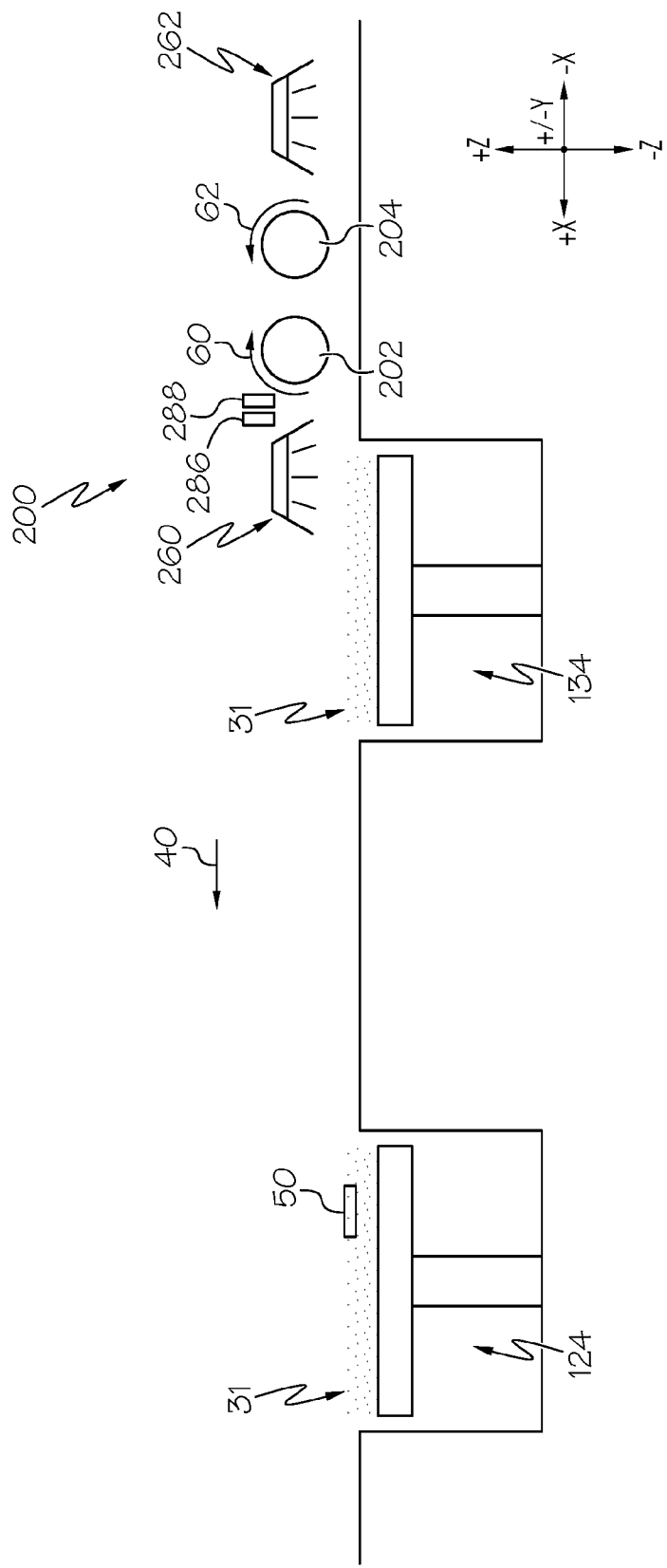

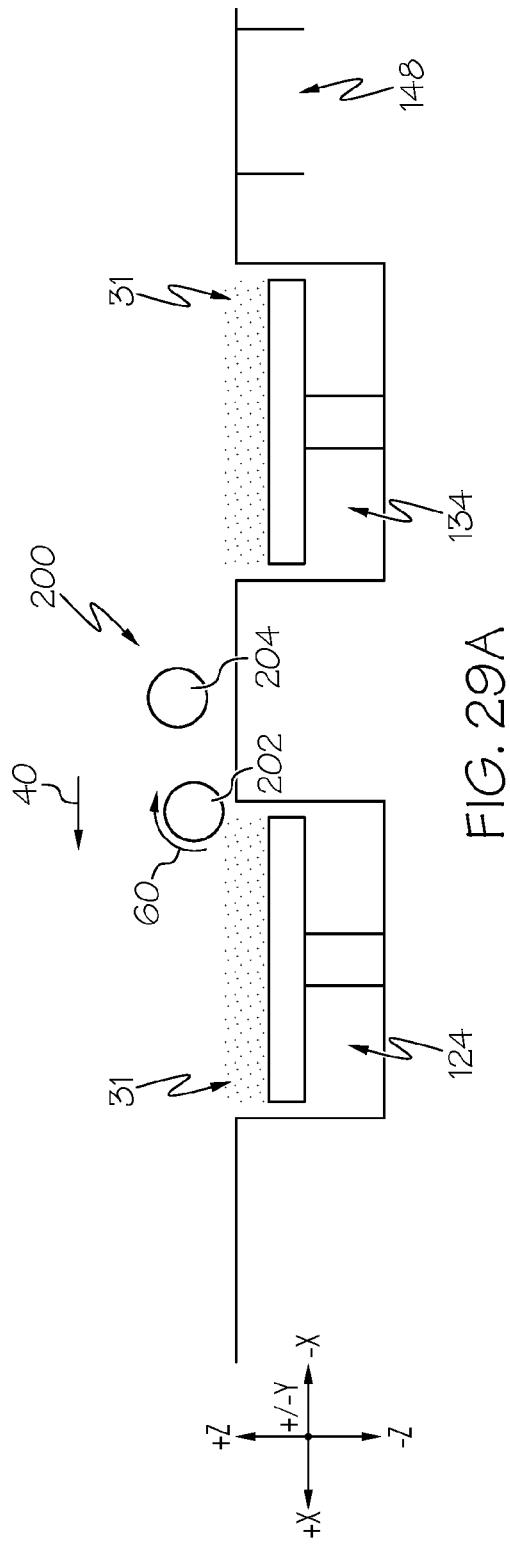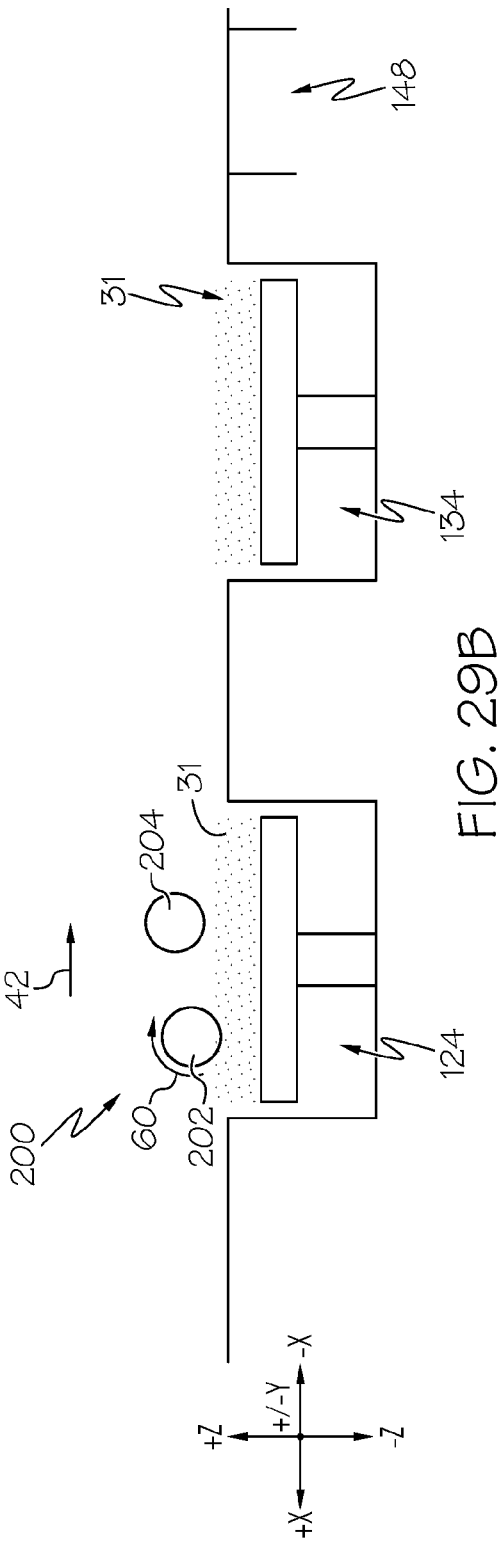

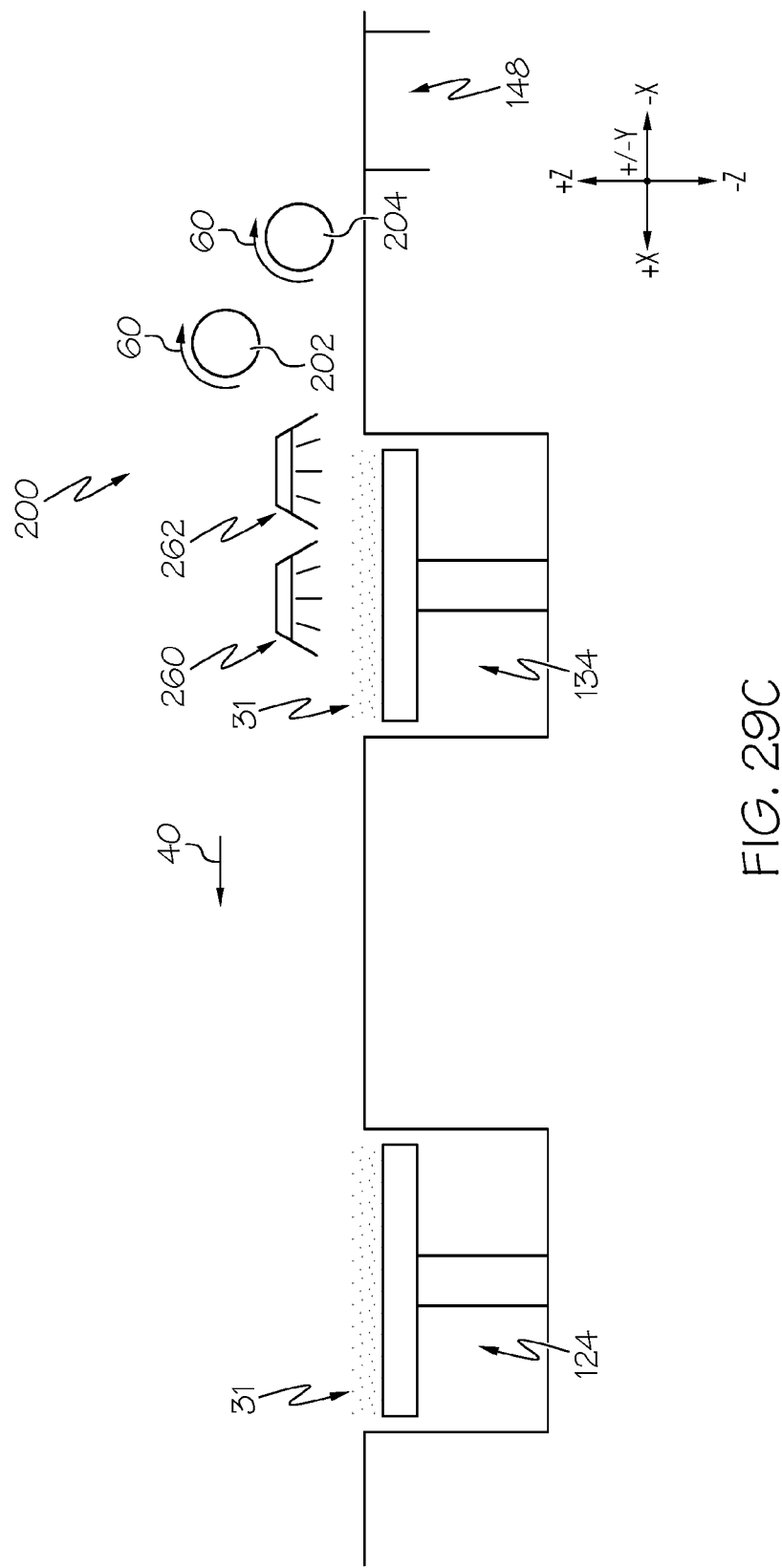

ADDITIVE MANUFACTURING RECOAT ASSEMBLIES INCLUDING A VACUUM AND METHODS FOR USING THE SAME

CROSS-REFERENCE TO RELATED APPLICATIONS

The present application is a National Phase Entry of International Application No. PCT/US2020/034204 filed May 22, 2020 entitled "Additive Manufacturing Recoat Assemblies Including a Vacuum and Methods for Using the Same" which claims the benefit of U.S. Provisional Patent Application Ser. No. 62/851,955 filed May 23, 2019, the contents of which are hereby incorporated by reference in their entirety.

BACKGROUND

Field

The present specification generally relates to additive manufacturing systems and, more specifically, to recoat assemblies for additive manufacturing systems and methods for using the same.

Technical Background

Additive manufacturing systems may be utilized to "build" an object from build material, such as organic or inorganic powders, in a layer-wise manner. Conventional additive manufacturing systems include various "recoat" apparatuses that are configured to sequentially distribute layers of build material, such that a binder material can be deposited and cured to "build" an object. However, conventional recoat apparatuses may inconsistently distribute build material, leading to variation in the objects built by the additive manufacturing system. Furthermore, in the event of breakage of components of conventional recoat apparatuses generally requires that the recoat apparatus be removed for repair, thereby increasing contributing to system downtime and increasing operating costs. Moreover, some conventional recoat apparatuses distribute build material by fluidizing the build material, and airborne build material may be dispersed to other components of the additive manufacturing system, and may interfere with and/or degrade the other components of the additive manufacturing system.

Accordingly, a need exists for alternative recoat assemblies for additive manufacturing systems.

SUMMARY

In one embodiment, a recoat assembly for an additive manufacturing system includes a base member that is movable in a lateral direction, a powder spreading member coupled to the base member, where the base member at least partially encapsulates the powder spreading member, and a vacuum in fluid communication with at least a portion of the base member.

In another embodiment, a method for forming an object includes moving a recoat assembly over a build material a coating direction, where the recoat assembly includes a powder spreading member, contacting the build material with the powder spreading member, causing at least a portion of the build material to become airborne, and drawing airborne build material out of the recoat assembly with a vacuum in fluid communication with the recoat assembly.

In yet another embodiment, additive manufacturing system includes a recoat assembly including a base member that is movable in a lateral direction, a powder spreading member coupled to the base member, where the base member at least partially encapsulates the powder spreading member, and a vacuum in fluid communication with at least a portion of the base member, an electronic control unit communicatively coupled to the vacuum, and a build area positioned below the recoat assembly.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 11A schematically depicts another section view of the recoat assembly of FIG. 6B, according to one or more embodiments shown and described herein;

FIG. 11D schematically depicts a section view of the recoat assembly of FIG. 11B, according to one or more embodiments shown and described herein;

FIG. 15 schematically depicts another embodiment of a layout of the rollers of the recoat assembly of FIG. 6B, according to one or more embodiments shown and described herein;

FIG. 16D schematically depicts an exploded view of a cleaning position adjustment assembly engaged with the cleaning member of FIG. 16C, according to one or more embodiments shown and described herein;

FIG. 17A schematically depicts a top view of the cleaning member and the rollers of the recoat assembly of FIG. 3, according to one or more embodiments shown and described herein;

FIG. 17B schematically depicts another top view of the rollers of the recoat assembly of FIG. 3 and the cleaning member, according to one or more embodiments shown and described herein;

FIG. 17C schematically depicts a side view of the rollers of the recoat assembly of FIG. 3 and the cleaning member, according to one or more embodiments shown and described herein;

FIG. 28 schematically depicts a recoat assembly moving build material to a build area, according to one or more embodiments shown and described herein;

FIG. 29A schematically depicts a recoat assembly moving build material to a build area, according to one or more embodiments shown and described herein;

FIG. 29B schematically depicts a recoat assembly compacting build material within the build area, according to one or more embodiments shown and described herein;

FIG. 29C schematically depicts a recoat assembly moving build material to a build area, according to one or more embodiments shown and described herein;

DETAILED DESCRIPTION

Figure 2A:
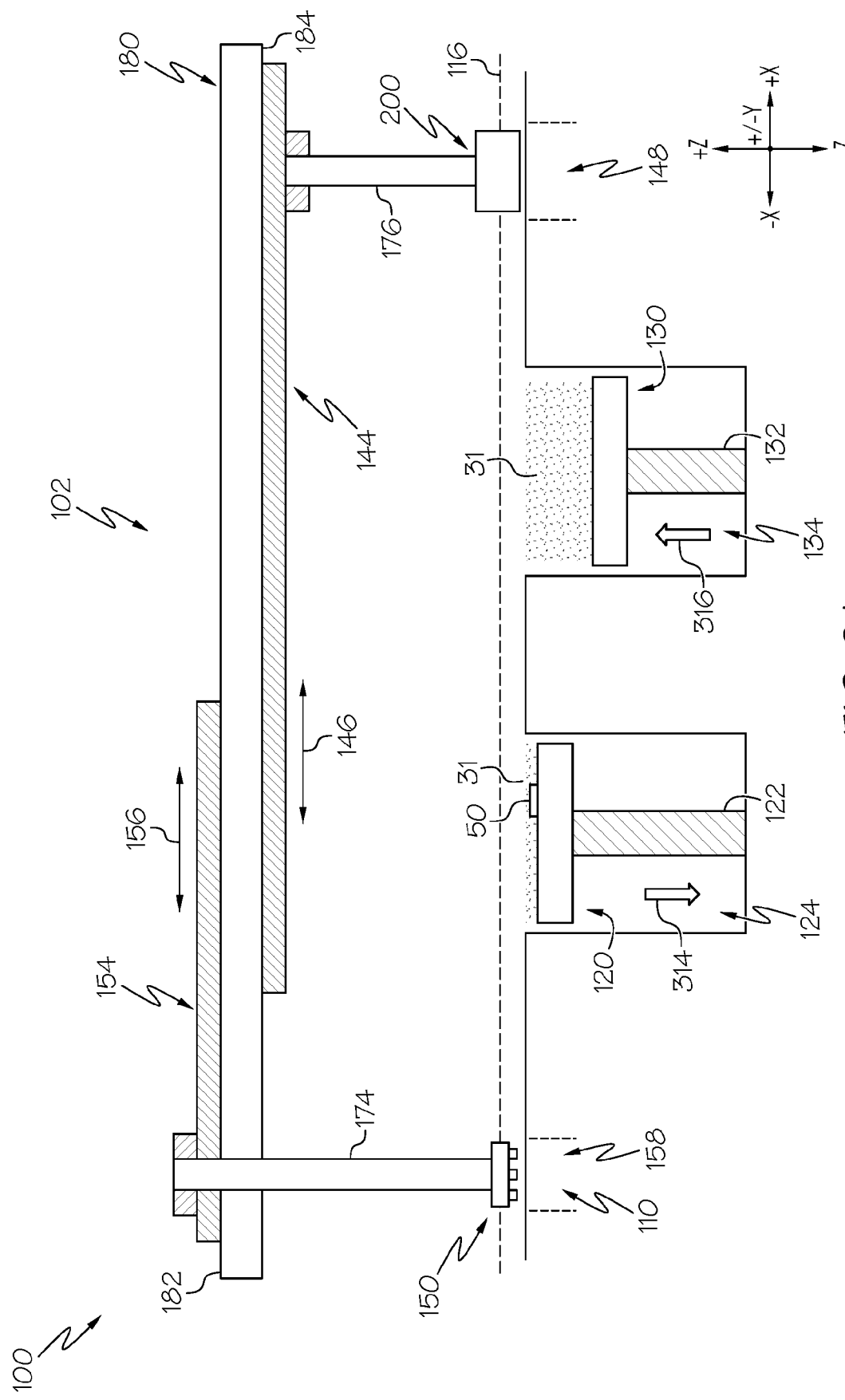
FIG. 2A schematically depicts an additive manufacturing system, according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. One embodiment of an additive manufacturing system 100 is schematically depicted in FIG. 2A. The additive manifesting system may generally include recoat assemblies for spreading build material in a build area. In embodiments described herein, recoat assemblies include one or more sensors that detect forces acting on the recoat assembly. By detecting forces acting on the recoat assembly, defects may be identified and one or more parameters related to the operation of the recoat assembly may be adjusted to optimize the performance of the recoat assembly. In some embodiments, recoat assemblies described herein may include multiple redundant components, such as rollers and energy sources, such that the recoat assembly may continue operation in the event of failure of one or more components of the recoat assemblies. In some embodiments, recoat assemblies described herein are in fluid communication with a vacuum that acts to collect and contain airborne build material. These and other embodiments of recoat assemblies for additive manufacturing systems, additive manufacturing systems comprising the recoat assemblies, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation unless otherwise expressly stated.

The phrase "communicatively coupled" is used herein to describe the interconnectivity of various components and means that the components are connected either through wires, optical fibers, or wirelessly such that electrical, optical, and/or electromagnetic signals may be exchanged between the components.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Embodiments described herein are generally directed to recoat assemblies for additive manufacturing systems. Additive manufacturing systems may generally "build" materials through successive deposition and binding of build material. In conventional additive manufacturing systems, deposition of build material is a difficult, dirty, time-consuming, and error-prone process. Embodiments described herein are directed to recoat assemblies that deposit build material in a consistent and configurable manner.

Figure 1:
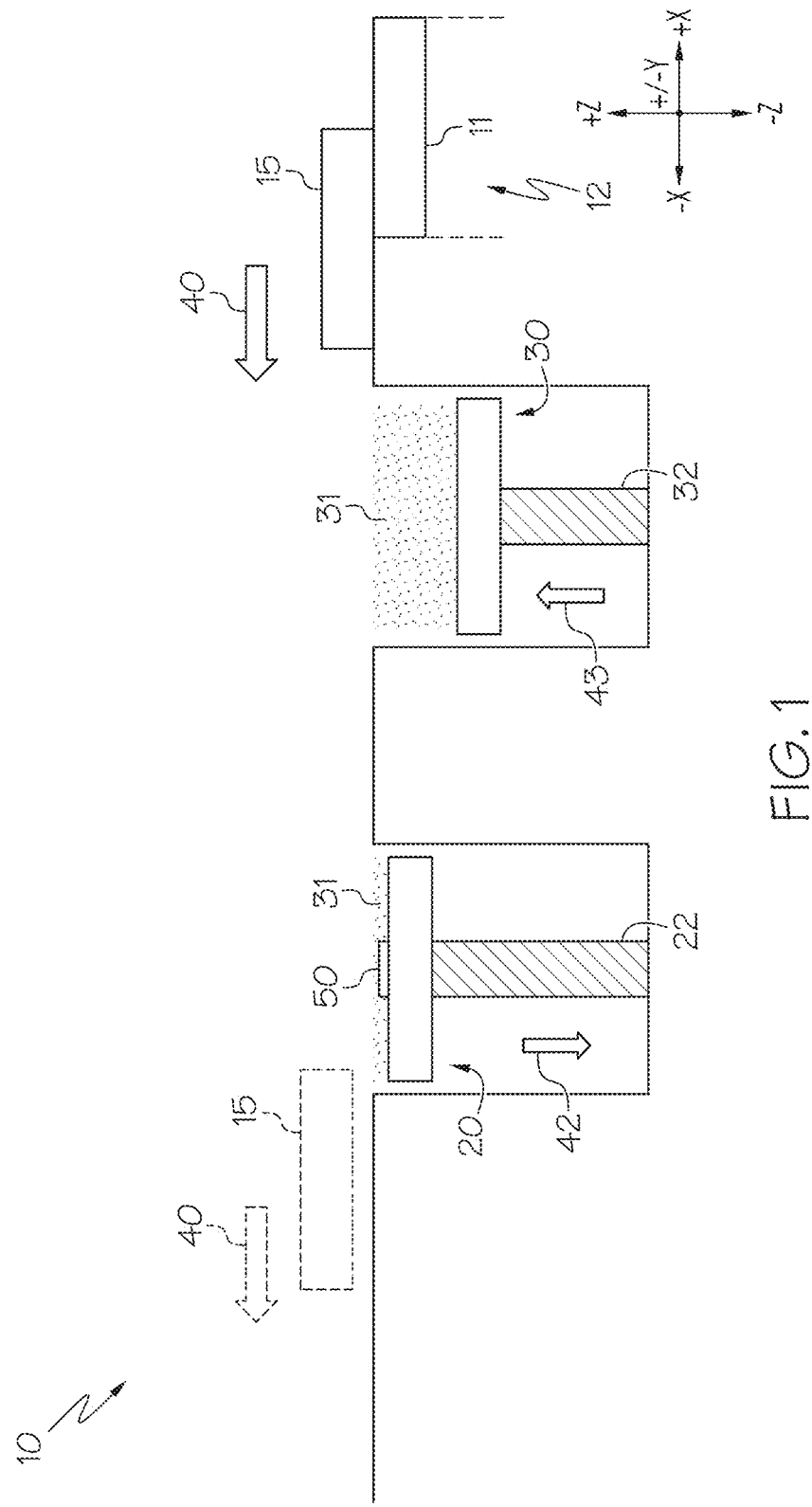
FIG. 1 schematically depicts a conventional additive manufacturing systems.

Referring now to FIG. 1, a conventional additive manufacturing system 10 is schematically depicted. The conventional additive manufacturing apparatus 10 includes a supply platform 30, a build platform 20, a cleaning station 11, and a build head 15. The supply platform 30 is coupled to a supply platform actuator 32. The supply platform actuator 32 is actuatable in the vertical direction (i.e., the +/−Z direction of the coordinate axes depicted in the figure) such that the supply platform 30 may be raised or lowered. The build platform 20 is located adjacent to the supply platform 30 and, like the supply platform 30, is coupled to an actuator, specifically a build platform actuator 22. The build platform actuator 22 is actuatable in the vertical direction such that the build platform 20 may be raised or lowered. The cleaning station 11 is located adjacent to the supply platform 30 opposite the build platform 20. That is, the supply platform 30 is located between the cleaning station 11 and the build platform 20 along the working axis of the conventional additive manufacturing apparatus 10 (i.e., an axis extending parallel to the +/−X axis of the coordinate axes depicted in the figure). The build head 15 may be traversed along the working axis of the conventional additive manufacturing apparatus 10 with an actuator (not depicted) such that the build head 15 passes from a home position 12 co-located with the cleaning station 11 over the supply platform 30, over the build platform 20, and back again, ultimately returning to the home position 12.

In operation, build material 31, such as organic or inorganic powder, is positioned on the supply platform 30. The supply platform 30 is actuated to present a layer of the build material 31 in the path of the build head 15. The build head 15 is then actuated along the working axis of the conventional additive manufacturing apparatus 10 from the home position 12 towards the build platform 20 in the direction indicated by arrows 40. As the build head 15 traverses the working axis over the supply platform 30 towards the build platform 20, the build head 15 distributes the layer of build material 31 in the path of the build head 15 from the supply platform 30 to the build platform 20. Thereafter, as the build head 15 continues along the working axis over the build platform 20, the build head 15 deposits a layer of binder material 50 in a predetermined pattern on the layer of build material 31 that has been distributed on the build platform 20. Optionally, after the binder material 50 is deposited, an energy source within the build head 15 is utilized to cure the deposited binder material 50. The build head 15 then returns to the home position 12 where at least a portion of the build head 15 is positioned over the cleaning station 11. While the build head 15 is in the home position 12, the build head 15 works in conjunction with the cleaning station 11 to provide cleaning and maintenance operations on the elements of the build head 15 which deposit the binder material 50 to ensure the elements are not fouled or otherwise clogged. This ensures that the build head is capable of depositing the binder material 50 in the desired pattern during a subsequent deposition pass. During this maintenance interval, the supply platform 30 is actuated in an upward vertical direction (i.e., in the +Z direction of the coordinate axes depicted in the figure) as indicated by arrow 43 to present a new layer of build material 31 in the path of the build head 15. The build platform 20 is actuated in the downward vertical direction (i.e., in the −Z direction of the coordinate axes depicted in the figure) as indicated by arrow 42 to prepare the build platform 20 to receive a new layer of build material 31 from the supply platform 30. The build head 15 is then actuated along the working axis of the conventional additive manufacturing apparatus 10 again to add another layer of build material 31 and binder material 50 to the build platform 20. This sequence of steps is repeated multiple times to build an object on the build platform 20 in a layer-wise manner.

Referring now to FIG. 2A, an embodiment of an additive manufacturing system 100 is schematically depicted. The system 100 includes a cleaning station 110, a build area 124, a supply platform 130, and an actuator assembly 102. The actuator assembly 102 comprises, among other elements, a recoat assembly 200 for distributing build material 31 and a print head 150 for depositing binder material 50. The actuator assembly 102 is constructed to facilitate traversing the recoat assembly 200 and the print head 150 over the working axis of the system 100 independent of one another. This allows for at least some steps of the additive manufacturing process to be performed simultaneously thereby reducing the overall cycle time of the additive manufacturing process to less than the sum of the cycle time for each individual step. In the embodiments of the system 100 described herein, the working axis 116 of the system 100 is parallel to the +/−X axis of the coordinate axes depicted in the figures. It should be understood that the components of the additive manufacturing apparatus 100 traversing the working axis 116, such as the recoat head 140, the print head 150, or the like, need not be centered on the working axis 116. However, in the embodiments described herein, at least two of the components of the additive manufacturing apparatus 100 are arranged with respect to the working axis 116 such that, as the components traverse the working axis, the components could occupy the same or an overlapping volume along the working axis if not properly controlled.

In the embodiments described herein, the cleaning station 110, the build platform 120, and the supply platform 130 are positioned in series along the working axis 116 of the system 100 between a print home position 158 of the print head 150 located proximate an end of the working axis 116 in the −X direction, and a recoat home position 148 of the recoat assembly 200 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build area 124, and the supply platform 130 are positioned therebetween. In the embodiments described herein, the build area 124 is positioned between the cleaning station 110 and the supply platform 130 along the working axis 116 of the system 100.

The cleaning station 110 is positioned proximate one end of the working axis 116 of the system 100 and is co-located with the print home position 158 where the print head 150 is located or "parked" before and after depositing binder material 50 on a layer of build material 31 positioned on the build area 124. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material on the print head 150, a wiping station for removing excess binder material from the print head 150, a jetting station for purging binder material and cleaning solution from the print head 150, a park station for maintaining moisture in the nozzles of the print head 150, or various combinations thereof. The print head 150 may be transitioned between the cleaning sections by the actuator assembly 102.

While reference is made herein to additive manufacturing systems including a print head 150 that dispenses a binder material 50, it should be understood that recoat assemblies 200 described herein may be utilized with other suitable additive powder-based additive manufacturing systems. For example, in some embodiments, instead of building objects with a cured binder 50 applied to build material 31, in some embodiments, a laser or other energy source may be applied to the build material 31 to fuse the build material 31.

In the embodiment depicted in FIG. 2A, the build area 124 comprises a receptacle including a build platform 120. The build platform 120 is coupled to a build platform actuator 122 to facilitate raising and lowering the build platform 120 relative to the working axis 116 of the system 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build area 124 located below the working axis 116 (i.e., in the −Z direction of the coordinate axes depicted in the figures) of the system 100. During operation of the system 100, the build platform 120 is retracted into the build area 124 by action of the build platform actuator 122 after each layer of binder material 50 is deposited on the build material 31 located on build platform 120. While the build area 124 described and depicted herein includes a receptacle, it should be understood that the build area 124 may include any suitable structure for supporting build material 31, and may for example include a mere surface supporting the build material 31.

The supply platform 130 is coupled to a supply platform actuator 132 to facilitate raising and lowering the supply platform 130 relative to the working axis 116 of the system 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the system 100. During operation of the system 100, the supply platform 130 is raised relative to the supply receptacle 134 and towards the working axis 116 of the system 100 by action of the supply platform actuator 132 after a layer of build material 31 is distributed from the supply platform 130 to the build platform 120, as will be described in further detail herein.

In embodiments, the actuator assembly 102 generally includes a recoat assembly transverse actuator 144, a print head actuator 154, a first guide 182, and a second guide 184. The recoat assembly transverse actuator 144 is operably coupled to the recoat assembly 200 and is operable to move the recoat assembly 200 relative to the build platform 120 to dispense build material 31 on the build platform 120, as described in greater detail herein. The print head actuator 154 is operably coupled to the print head 150 and is operable to move the print head 150 and is operable to move the print head 150 relative to the build platform 120 to dispense the binder material 50 on the build platform 120.

In the embodiments described herein, the first guide 182 and the second guide 184 extend in a horizontal direction (i.e., a direction parallel to the +/−X direction of the coordinate axes depicted in the figures) parallel to the working axis 116 of the system 100 and are spaced apart from one another in the vertical direction. When the actuator assembly 102 is positioned over the cleaning station 110, the build platform 120, and the supply platform 130 as depicted in FIG. 2A, the first guide 182 and the second guide 184 extend in a horizontal direction from at least the cleaning station 110 to beyond the supply platform 130.

In one embodiment, such as the embodiment of the actuator assembly 102 depicted in FIG. 2A, the first guide 182 and the second guide 184 are opposite sides of a rail 180 that extends in a horizontal direction and is oriented such that the first guide 182 is positioned above and spaced apart from the second guide 184. For example, in one embodiment, the rail 180 has an "I" configuration in vertical cross section (i.e., a cross section in the Y-Z plane of the coordinate axes depicted in the figures) with the upper and lower flanges of the "I" forming the first guide 182 and the second guide 184, respectively. However, it should be understood that other embodiments are contemplated and possible. For example and without limitation, the first guide 182 and the second guide 184 may be separate structures, such as separate rails, extending in the horizontal direction and spaced apart from one another in the vertical direction. In some embodiments, the first guide 182 and the second guide 184 may be positioned at the same height and spaced apart from one another on opposite sides of the rail 180. In embodiments, the first guide 182 and the second guide 184 are positioned in any suitable configuration, and may be collinear.

In the embodiments described herein, the recoat assembly transverse actuator 144 is coupled to one of the first guide 182 and the second guide 184 and the print head actuator 154 is coupled to the other of the first guide 182 and the second guide 184 such that the recoat assembly transverse actuator 144 and the print head actuator 154 are arranged in a "stacked" configuration. For example, in the embodiment of the actuator assembly 102 depicted in FIG. 2A, the recoat assembly transverse actuator 144 is coupled to the second guide 184 and the print head actuator 154 is coupled to the first guide 182. However, it should be understood that, in other embodiments (not depicted) the recoat assembly transverse actuator 144 may be coupled to the first guide 182 and the print head actuator 154 may be coupled to the second guide 184.

In the embodiments described herein, the recoat assembly transverse actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat assembly transverse actuator 144 and the print head actuator 154 are actuatable, respectively. The recoat motion axis 146 and the print motion axis 156 extend in a horizontal direction and are parallel with the working axis 116 of the system 100. In the embodiments described herein, the recoat motion axis 146 and the print motion axis 156 are parallel with one another and spaced apart from one another in the vertical direction due to the stacked configuration of the recoat assembly transverse actuator 144 and the print head actuator 154. In some embodiments, such as the embodiment of the actuator assembly 102 depicted in FIG. 2A, the recoat motion axis 146 and the print motion axis 156 are located in the same vertical plane (i.e., a plane parallel to the X-Z plane of the coordinate axes depicted in the figures). However, it should be understood that other embodiments are contemplated and possible, such as embodiments in which the recoat motion axis 146 and the print motion axis 156 are located in different vertical planes.

In the embodiments described herein, the recoat assembly transverse actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat assembly transverse actuator 144 and the print head actuator 154 are linear actuators manufactured by Aerotech® Inc. of Pittsburgh, Pennsylvania, such as the PRO225LM Mechanical Bearing, Linear Motor Stage.

In embodiments, the recoat head actuator 144 and the print head actuator 154 may each be a cohesive sub-system that is affixed to the rail 180, such as when the recoat head actuator 144 and the print head actuator 154 are PRO225LM Mechanical Bearing, Linear Motor Stages, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIG. 2A, the recoat assembly 200 is coupled to the recoat assembly transverse actuator 144 such that the recoat assembly 200 is positioned below (i.e., in the −Z direction of the coordinate axes depicted in the figures) the first guide 182 and the second guide 184. When the actuator assembly 102 is positioned over the cleaning station 110, the build platform 120, and the supply platform 130 as depicted in FIG. 2A, the recoat assembly 200 is situated on the working axis 116 of the system 100. Thus, bi-directional actuation of the recoat assembly transverse actuator 144 along the recoat motion axis 146 affects bi-directional motion of the recoat assembly 200 on the working axis 116 of the system 100. In the embodiment of the actuator assembly 102 depicted in FIG. 2A, the recoat assembly 200 is coupled to the recoat assembly transverse actuator 144 with support bracket 176 such that the recoat assembly 200 is positioned on the working axis 116 of the system 100 while still providing clearance between rail 180 of the actuator assembly 102 and the build platform 120 and the supply platform 130. In some embodiments described herein, the recoat assembly 200 may be fixed in directions orthogonal to the recoat motion axis 146 and the working axis 116 (i.e., fixed along the +/−Z axis and/or fixed along the +/−Y axis).

Similarly, the print head 150 is coupled to the print head actuator 154 such that the print head 150 is positioned below (i.e., in the −Z direction of the coordinate axes depicted in the figures) the first guide 182 and the second guide 184. When the actuator assembly 102 is positioned over the cleaning station 110, the build platform 120, and the supply platform 130 as depicted in FIG. 2A, the print head 150 is situated on the working axis 116 of the system 100. Thus, bi-directional actuation of the print head actuator 154 along the print motion axis 156 affects bi-directional motion of the print head 150 on the working axis 116 of the system 100. In the embodiment of the actuator assembly 102 depicted in FIG. 2A, the print head 150 is coupled to the print head actuator 154 with support bracket 174 such that the print head 150 is positioned on the working axis 116 of the system 100 while still providing clearance between rail 180 of the actuator assembly 102 and the build platform 120 and the supply platform 130. In some embodiments described herein, the print head 150 may be fixed in directions orthogonal to the print motion axis 156 and the working axis 116 (i.e., fixed along the +/−Z axis and/or fixed along the +/−Y axis).

While FIG. 2A schematically depicts an embodiment of an actuator assembly 102 which comprises a first guide 182 and a second guide 184 with the recoat assembly transverse actuator 144 and the print head actuator 154 mounted thereto, respectively, it should be understood that other embodiments are contemplated and possible, such as embodiments which comprise more than two guides and more than two actuators. It should also be understood that other embodiments are contemplated and possible, such as embodiments which comprise the print head and the recoat assembly 200 on the same actuator.

Figure 2B:
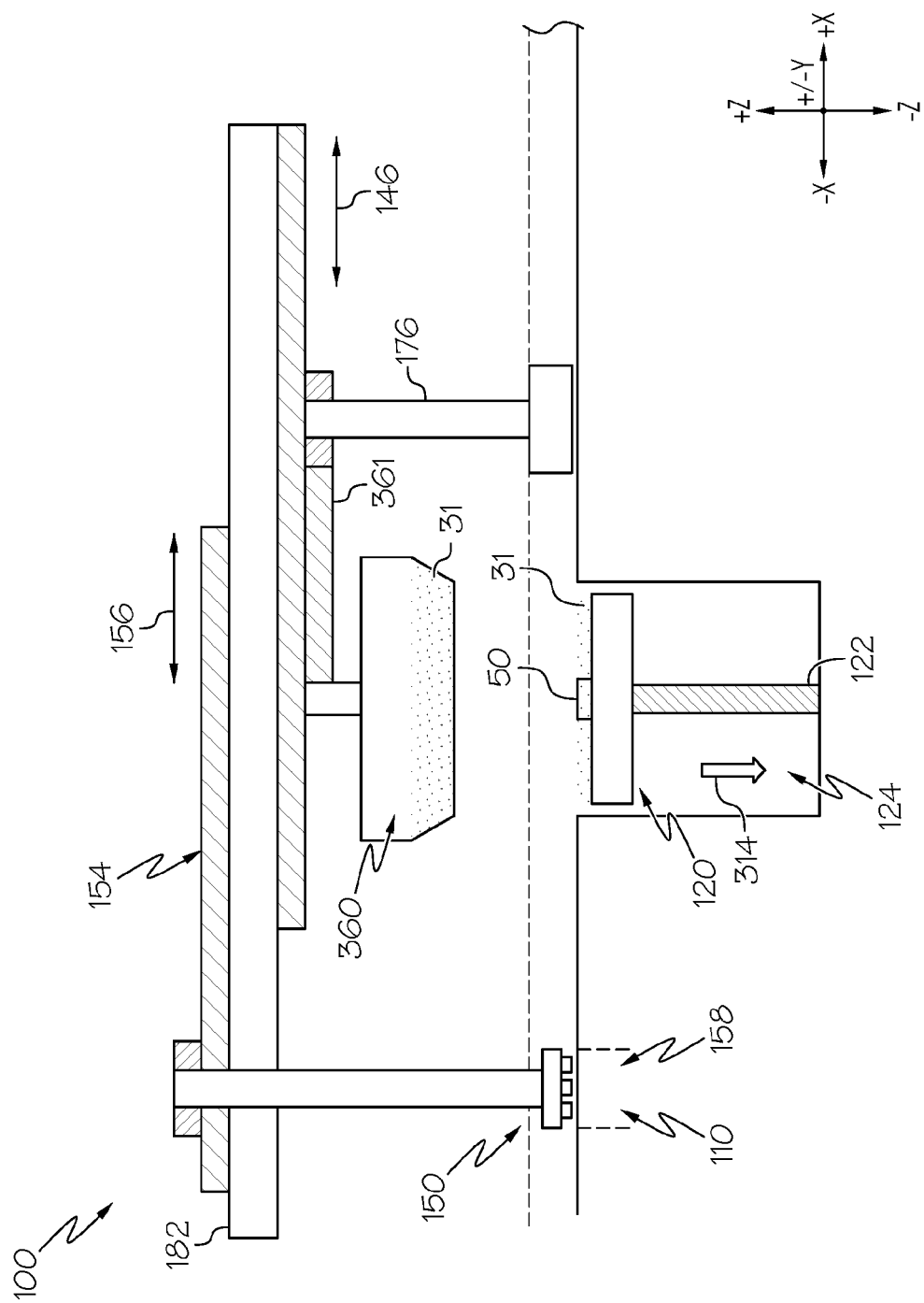
FIG. 2B schematically depicts another additive manufacturing system, according to one or more embodiments shown and described herein.

Referring to FIG. 2B, in some embodiments, the additive manufacturing system 100 comprises a cleaning station 110, and a build area 124, as described herein with respect to FIG. 2A. However, in the embodiment depicted in FIG. 2B, the additive manufacturing system does not include a supply receptacle. Instead, the system comprises a build material hopper 360 that is used to supply build material 31 to the build area 124. In this embodiment, the build material hopper 360 is coupled to the recoat assembly transverse actuator 144 such that the build material hopper 360 traverses along the recoat motion axis 146 with the with the recoat assembly 200. In the embodiment depicted in FIG. 2B, the build material hopper 360 is coupled to the support bracket 176 with, for example, bracket 361. However, it should be understood that the build material hopper 360 may be directly coupled to the support bracket 176 without an intermediate bracket. Alternatively, the build material hopper 360 may be coupled to the recoat assembly 200 either directly or with an intermediate bracket.

The build material hopper 360 may include an electrically actuated valve (not depicted) to release build material 31 onto the build area 124 as the build material hopper 360 traverses over the build area 124. In embodiments, the valve may be communicatively coupled to an electronic control unit 300 (FIG. 24) which executes computer readable and executable instructions to open and close the valve based on the location of the build material hopper 360 with respect to the build area. The build material 31 released onto the build area 124 is then distributed over the build area with the recoat assembly 200 as the recoat assembly 200 traverses over the build area 124.

Figure 2C:
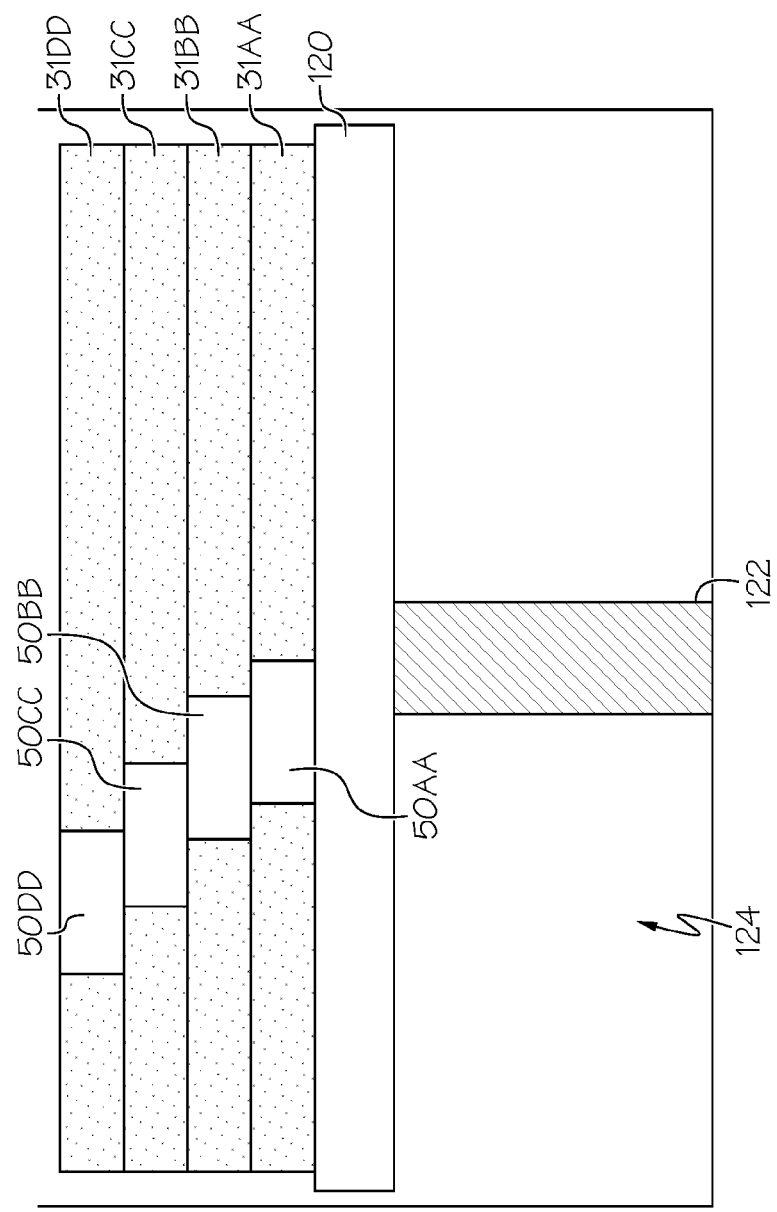
FIG. 2C schematically depicts an enlarged view of build material of an additive manufacturing system according to one or more embodiments shown and described herein.

Referring to FIG. 2C, to form an object layers of build material 31AA-31DD may be sequentially positioned on top of one another. In the example provided in FIG. 2C, sequential layers of binder 50AA-50CC are positioned on the layers of build material 31AA-31DD. By curing the layers of binder 50AA-50CC, a finished product may be formed.

Figure 3:
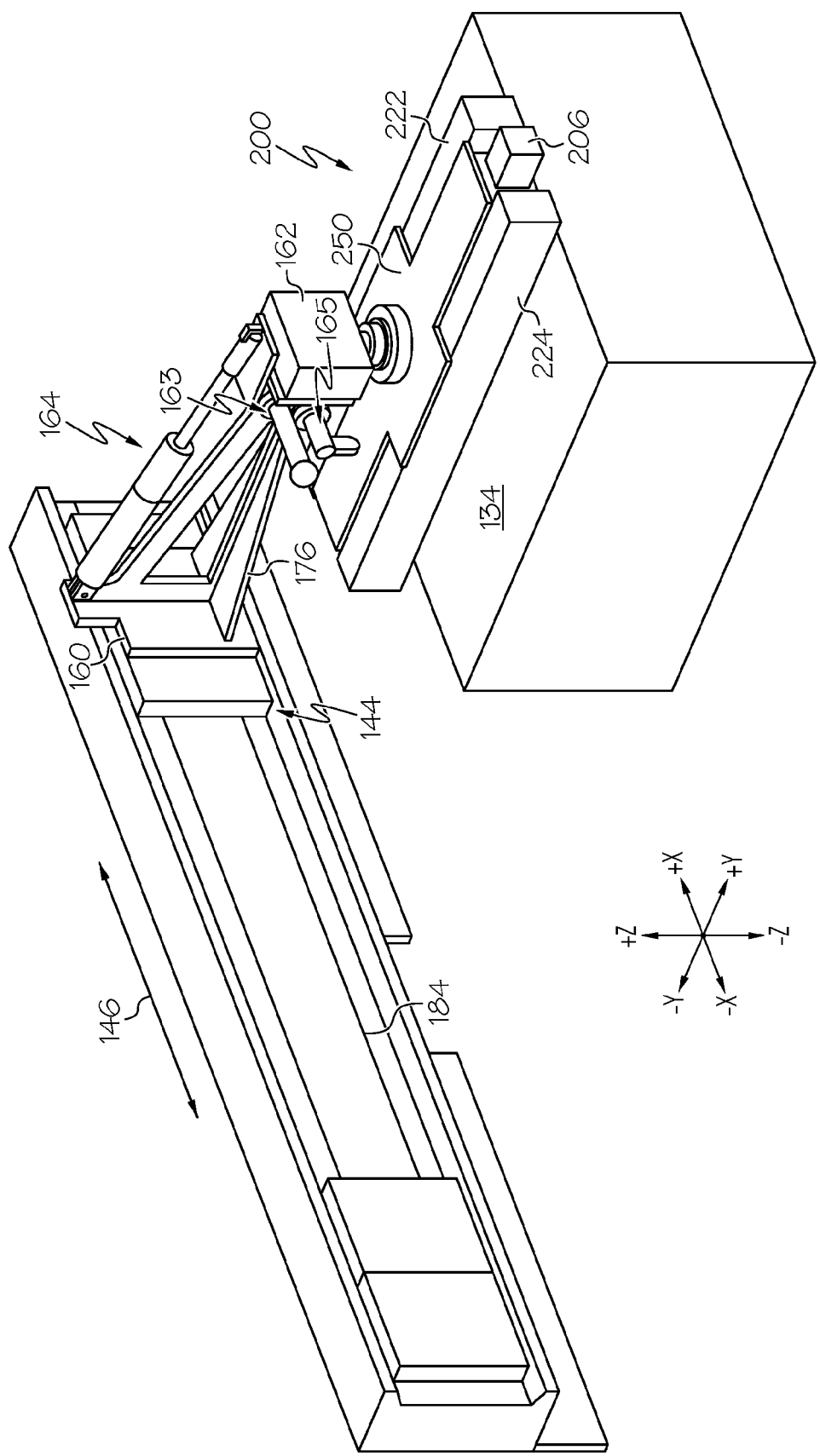
FIG. 3 schematically depicts an embodiment of a recoat assembly of the additive manufacturing system of FIG. 2A, according to one or more embodiments shown and described herein.

Referring to FIG. 3, a perspective view of one embodiment of the recoat assembly 200 is schematically depicted. In embodiments, the recoat assembly 200 may include one or more housings 222, 224 that at least partially encapsulate a portion of the recoat assembly 200. The recoat assembly 200 includes the recoat assembly transverse actuator 144 that moves the recoat assembly 200 in the lateral direction (i.e., in the X-direction as depicted). In some embodiments, the recoat assembly 200 further includes a recoat assembly vertical actuator 160 that moves the recoat assembly 200 in the vertical direction (i.e., in the Z-direction as depicted).

Figure 4:
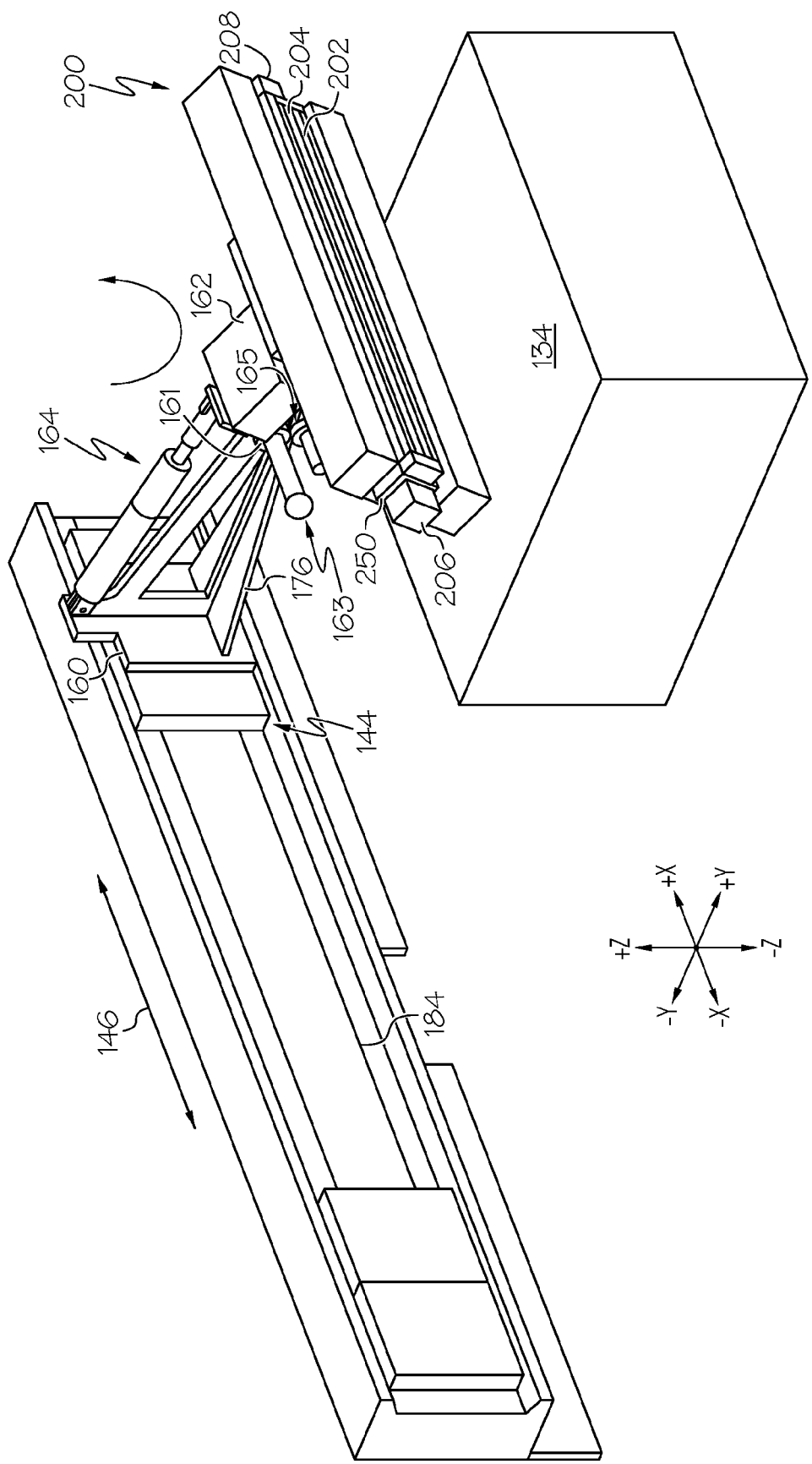
FIG. 4 schematically depicts another view of the recoat assembly of FIG. 3, according to one or more embodiments shown and described herein.

In some embodiments, the recoat assembly 200 includes a base member 250, and the recoat assembly transverse actuator 144 is coupled to the base member 250, moving the base member 250 in the lateral direction (i.e., in the X-direction as depicted). As referred to herein the base member 250 may include any suitable structure of the recoat assembly 200 coupled to the recoat assembly transverse actuator 144, and may include a housing, a plate, or the like. In the embodiment depicted in FIGS. 3 and 4, the recoat assembly 200 further includes at least one tilt actuator 164 that is operable to tilt the base member 250 of the recoat assembly 200 (e.g., about an axis extending in the X-direction as depicted in FIG. 4). As described in greater detail herein, in embodiments, the tilt actuator 164 may tilt the base member 250 of the recoat assembly 200. In embodiments, the tilt actuator 164 may also tilt the base member 250 to provide access to an underside of the recoat assembly 200 such that maintenance may be performed on the recoat assembly 200.

Figure 5:
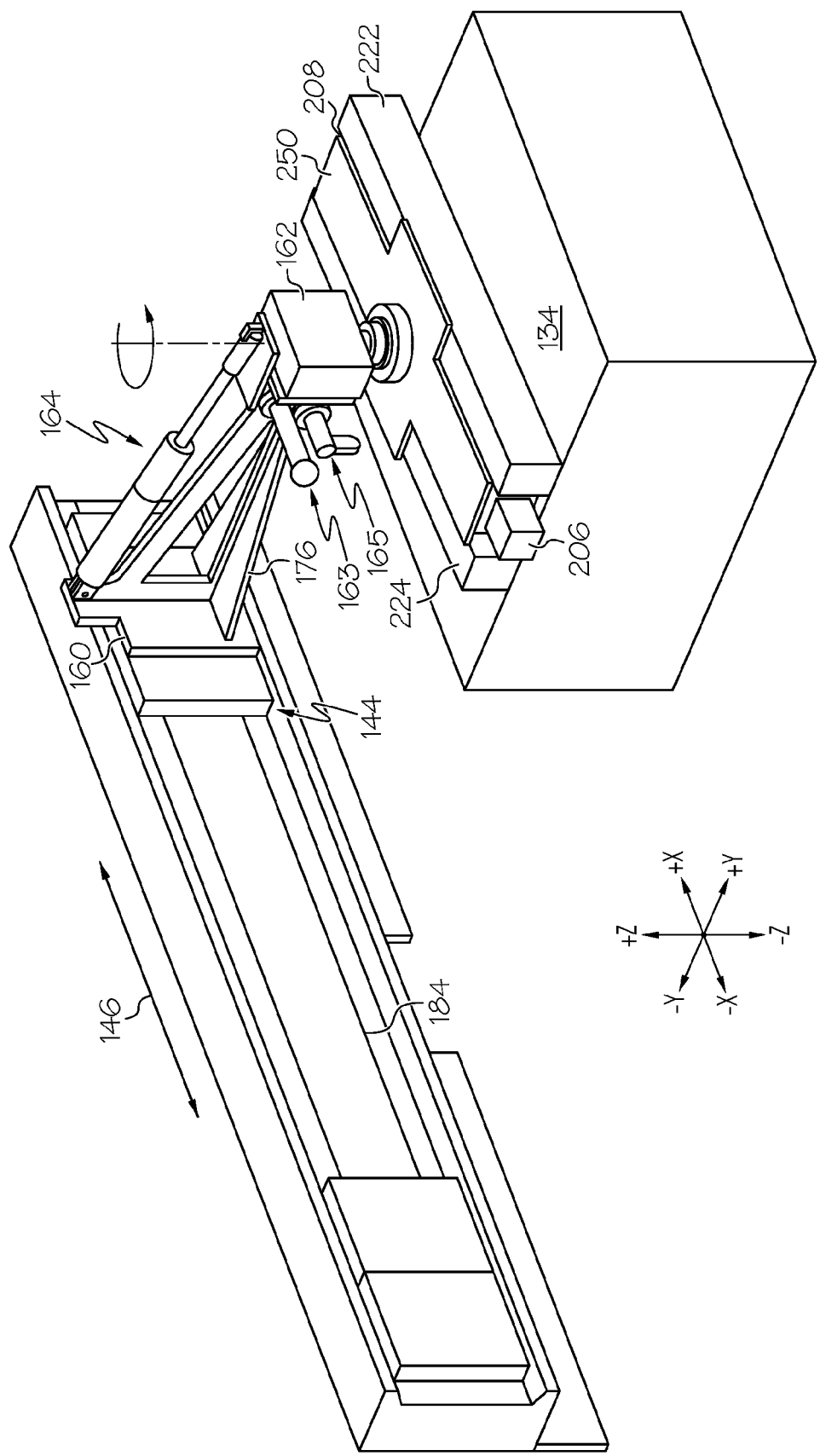
FIG. 5 schematically depicts another view of the recoat assembly of FIG. 3, according to one or more embodiments shown and described herein.

Referring to FIGS. 3 and 5, in some embodiments, the recoat assembly 200 further includes a base member rotational actuator 162 coupled to the base member 250. The base member rotational actuator 162 is operable to rotate the base member 250 about an axis extending in the vertical direction (e.g., in the Z-direction as depicted). In embodiments, the base member rotational actuator 162 and the tilt actuator 164 may include any suitable actuators, for example and without limitation, a worm drive actuator, a ball screw actuator, a pneumatic piston, a hydraulic piston, an electromechanical linear actuator, or the like.

Figure 6A:
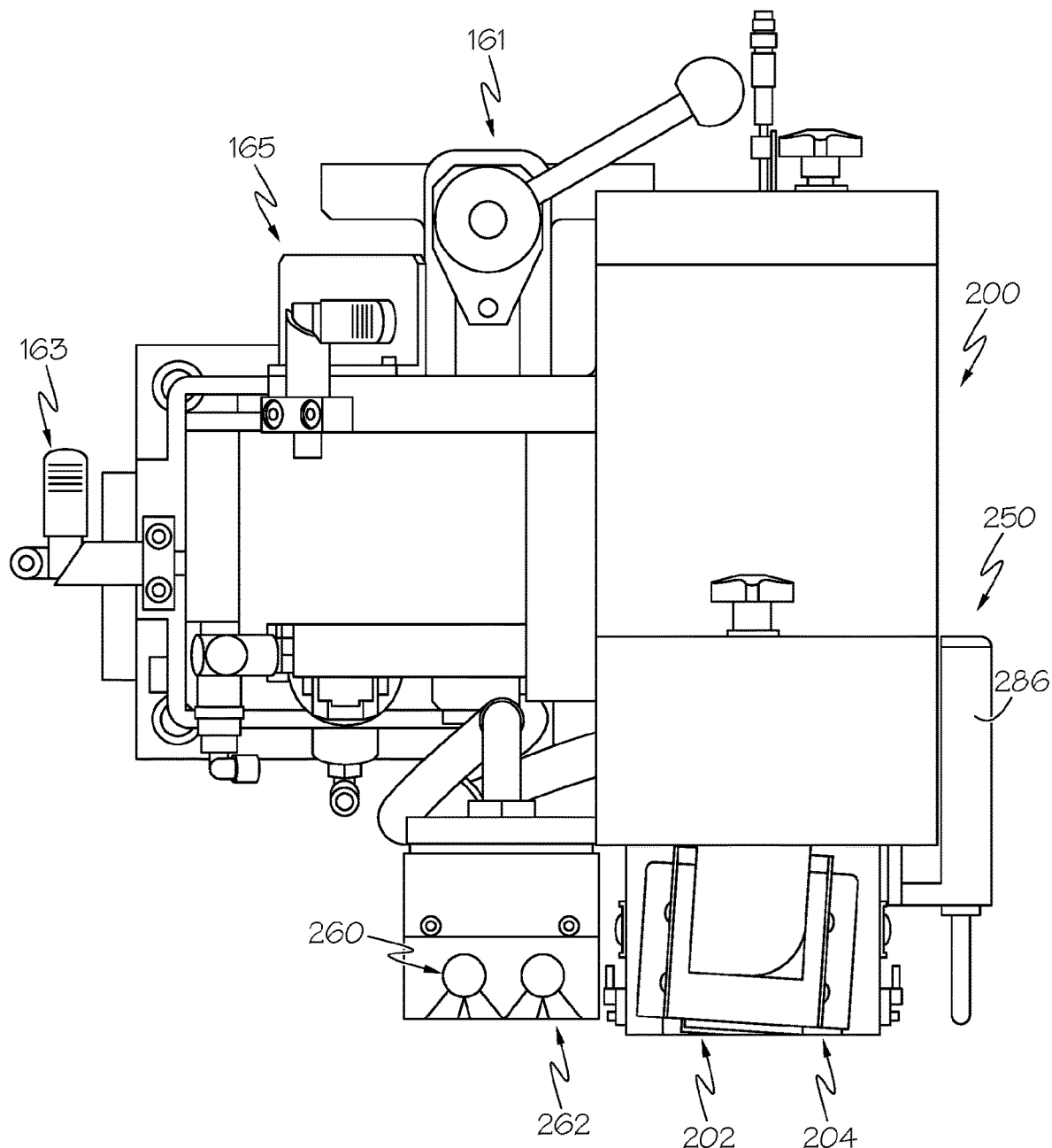
FIG. 6A schematically depicts another side view of a recoat assembly, according to one or more embodiments shown and described herein.

In some embodiments and referring to FIGS. 4 and 6A, the recoat assembly 200 may include a tilt locking member 161 that is selectively engageable with the base member 250. For example, the tilt locking member 161 may selectively restrict movement of the base member 250 about the X-axis shown in FIG. 4. By selectively restricting movement of the base member 250, the orientation of the base member 250 can be maintained without the application of force by the tilt actuator 164. In this way, the base member 250 can be maintained in a tilted position as shown in FIG. 4 while maintenance is performed on the recoat assembly 200 without requiring the application of energy to the tilt actuator 164. In some embodiments, the recoat assembly 200 further includes a first rotational locking member 163 and/or a second rotational locking member 165. The first rotational locking member 163 and/or the second rotational locking member 165 may selectively restrict movement of the base member 250 about the Z-axis depicted in FIG. 4. In embodiments, the recoat assembly 200 includes a powder spreading member, such as one or more rollers, that distribute build material 31 (FIG. 2A).

Figure 6B:
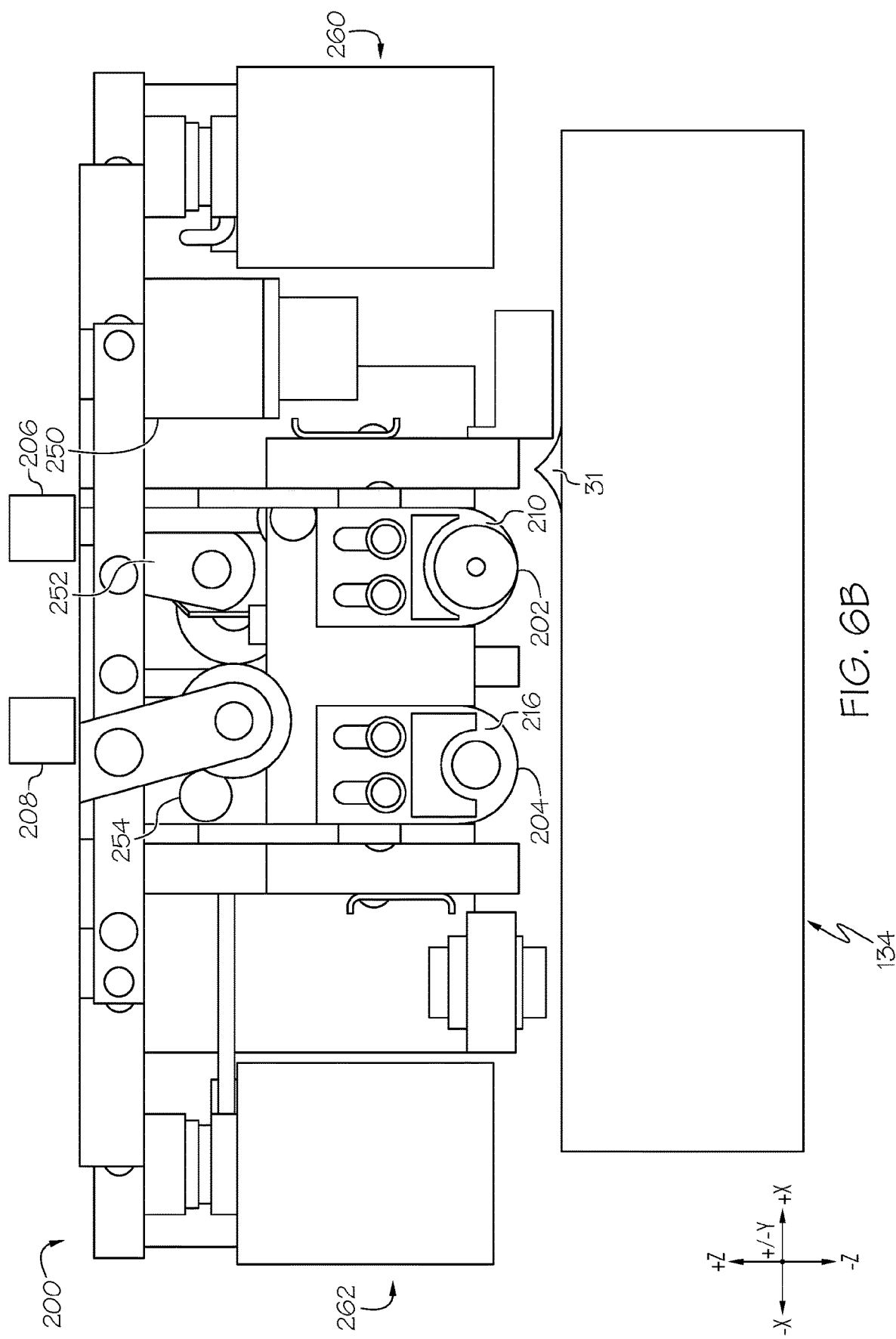
FIG. 6B schematically depicts a section view of a recoat assembly, according to one or more embodiments shown and described herein.
Figure 6C:
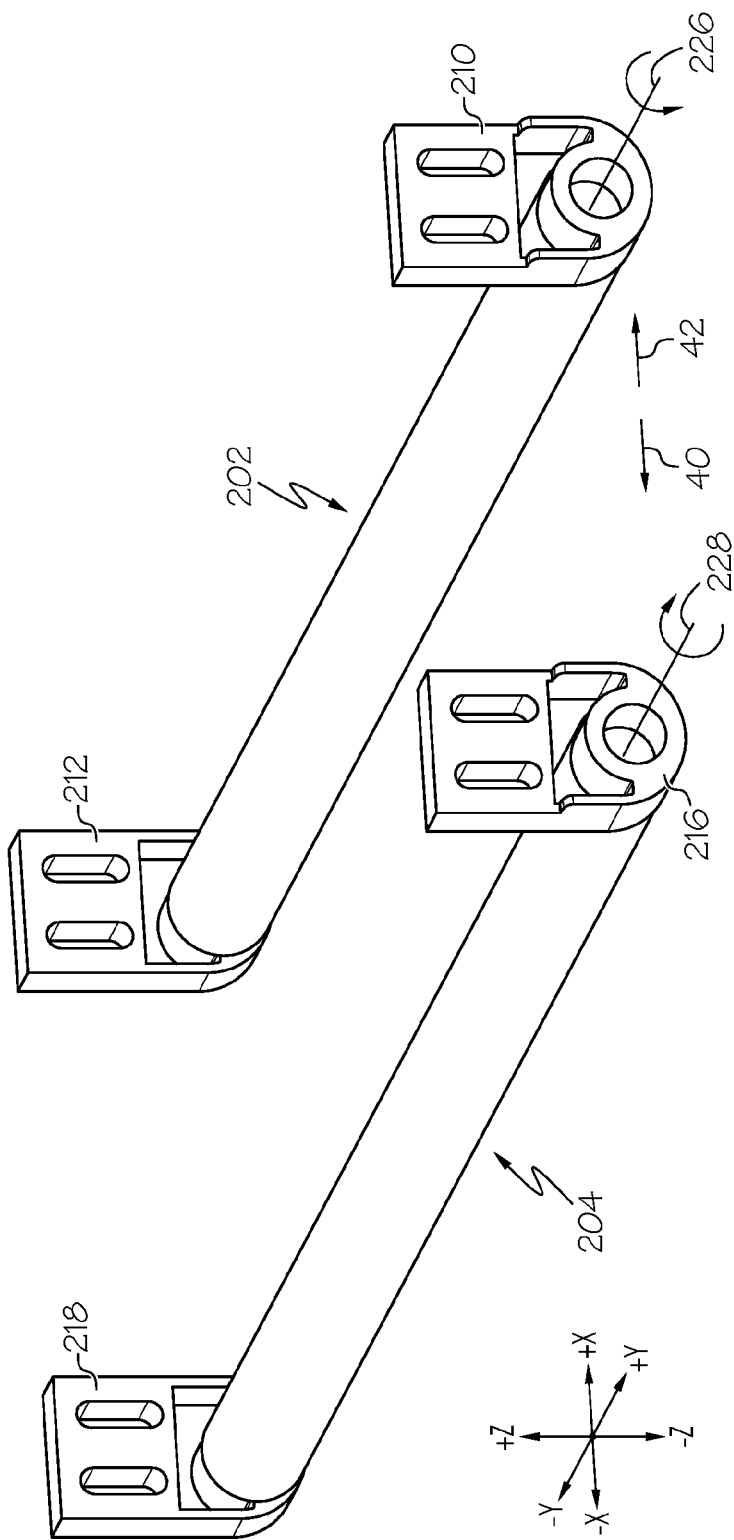
FIG. 6C schematically depicts rollers and roller supports of the recoat assembly of FIG. 6B shown in isolation, according to one or more embodiments shown and described herein.

For example and referring to FIGS. 6B and 6C, a side view of the recoat assembly 200 and a view of rollers 202, 204 of the recoat assembly 200 are depicted, respectively. In embodiments, the recoat assembly 200 includes a first roller support 210, a second roller support 212, and a first roller 202 disposed between and supported by the first roller support 210 and the second roller support 212. In the embodiment depicted in FIGS. 6B and 6C, the recoat assembly 200 further includes a third roller support 216, a fourth roller support 218, and a second roller 204 disposed between and supported by the third roller support 216 and the fourth roller support 218. In embodiments, the second roller 204 is positioned rearward of the first roller 202 (i.e., in the −X-direction as depicted). In these embodiments, the first roller 202 may generally be referred to as the "front" roller, and the second roller 204 may be referred to as the "rear" roller.

In embodiments, the recoat assembly 200 includes a roller vertical actuator 252 that is coupled to the first roller 202 and/or the second roller 204. The roller vertical actuator 252 is operable to move the first roller 202 and/or the second roller 204 with respect to the base member 250 in the vertical direction (i.e., in the Z-direction as depicted). In some embodiments, the vertical actuator 252 is coupled to the front roller 202 and the rear roller 204 such that the front roller 202 and the rear roller 204 are moveable with respect to the base member 250 independently of one another. In some embodiments, the roller vertical actuator 252 is a first roller vertical actuator 252 coupled to the first roller 202, and the recoat assembly 200 further includes a second roller vertical actuator 254 coupled to the second roller 204, such that the front roller 202 and the rear roller 204 are moveable with respect to the base member 250 independently of one another. The first and second roller vertical actuators 252, 254 may include any suitable actuators, for example and without limitation, pneumatic actuators, motors, hydraulic actuators, or the like.

Figure 11B:
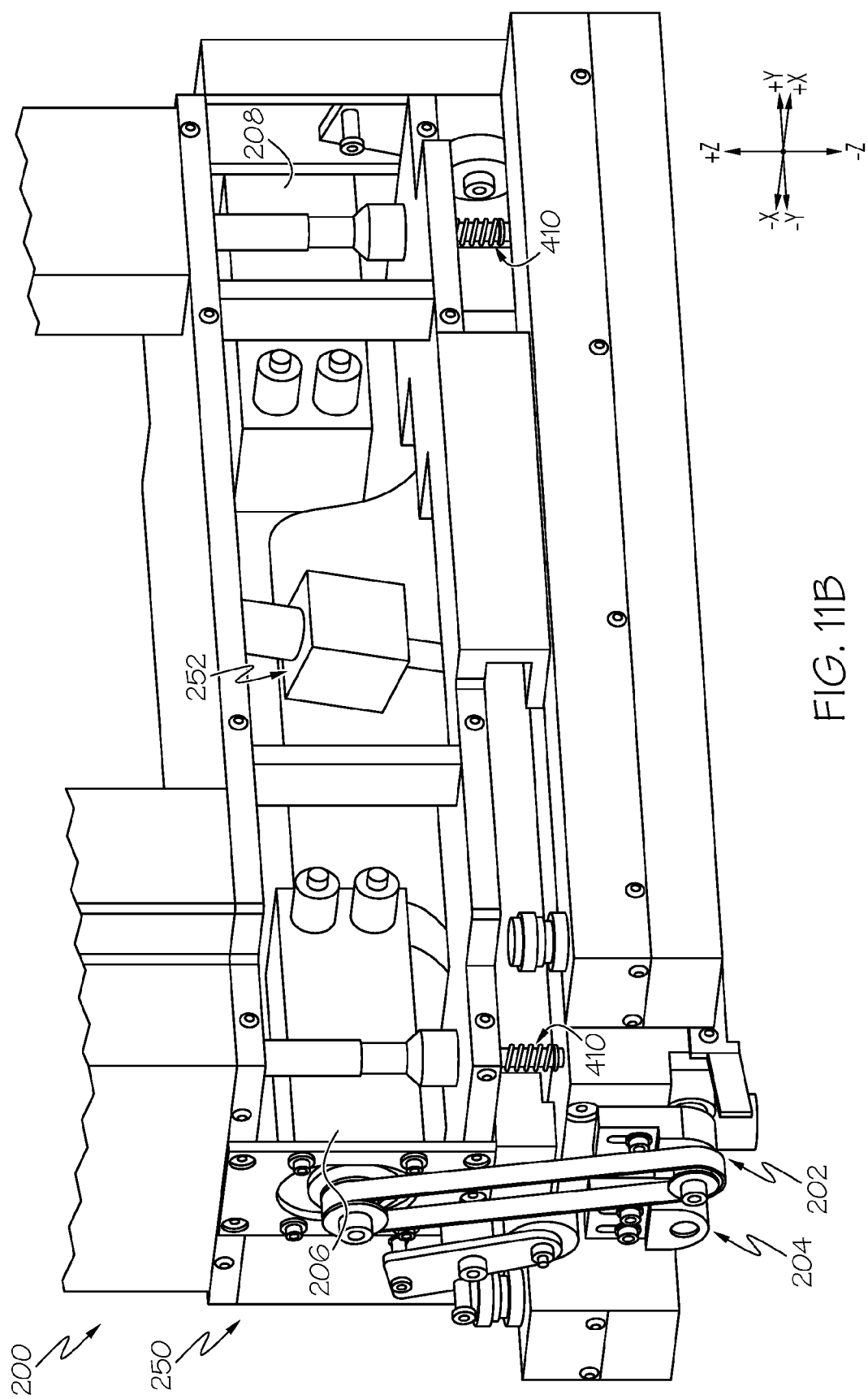
FIG. 11B schematically depicts a perspective view of a recoat assembly, according to one or more embodiments shown and described herein.

The recoat assembly 200 further includes a first rotational actuator 206 coupled to the first roller 202 as best shown in FIG. 11B. In some embodiments, the first rotational actuator 206 is spaced apart from the first roller 202, and may be coupled to the first roller 202 through a belt, a chain, or the like. In embodiments in which the recoat assembly 200 includes the second roller 204, the recoat assembly 200 may include a second rotational actuator 208, best shown in FIG. 11B, coupled to the second roller 204. In some embodiments, the second rotational actuator 208 is spaced apart from the second roller 204, and may be coupled to the second roller 204 through a belt, a chain, or the like. In some embodiments, the recoat assembly 200 may include a single rotational actuator coupled to both the first roller 202 and the second roller 204. In some embodiments, the first rotational actuator 206 is directly coupled to the first roller 202 and/or the second rotational actuator 208 is directly coupled to the second roller 204.

The first rotational actuator 206 is configured to rotate the rotate the first roller 202 about a first rotation axis 226. Similarly, the second rotational actuator 208 is configured to rotate the second roller 204 about a second rotation axis 228. In the embodiment depicted in FIG. 6C, the first rotation axis 226 and the second rotation axis 228 are generally parallel to one another and are spaced apart from one another in the X-direction as depicted. As described in greater detail herein, the first roller 202 and the second roller 204 may be rotated in a "rotation direction" (e.g., a clockwise direction from the perspective shown in FIG. 6C) and/or a "counter-rotation direction" that is the opposite of the rotation direction (e.g., a counter-clockwise direction from the perspective shown in FIG. 6C). The first and second roller 202, 204 can be rotated in the same direction or may be rotated in opposite directions from one another. The first and second rotational actuators 206, 208 may include any suitable actuator for inducing rotation of the first and second rollers 202, 204, such as and without limitation, alternating current (AC) or direct current (DC) brushless motors, linear motors, servo motors, stepper motors, pneumatic actuators, hydraulic actuators, or the like.

In embodiments, the recoat assembly 200 includes one or more sensors mechanically coupled to the roller supports 210, 212, 216, and/or 218, the one or more sensors configured to output a signal indicative of forces incident on the roller supports 210, 212, 216, and/or 218 via the first roller 202 and/or the second roller 204.

Figure 7B:
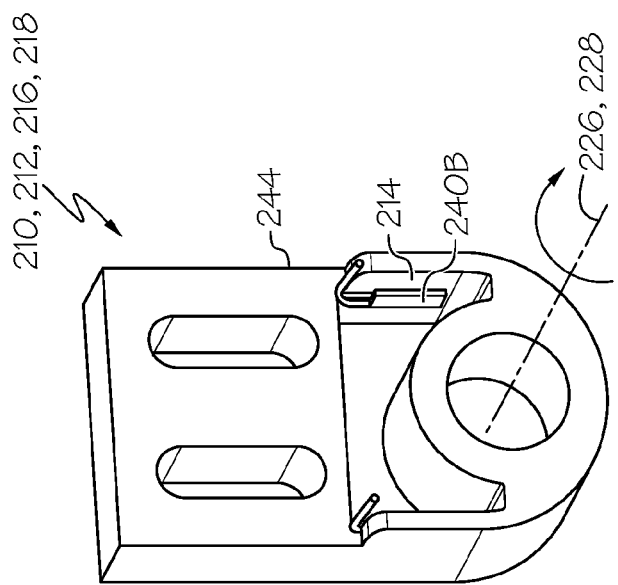
FIG. 7B schematically depicts another view of the roller support of FIG. 7A, according to one or more embodiments shown and described herein.
Figure 7C:
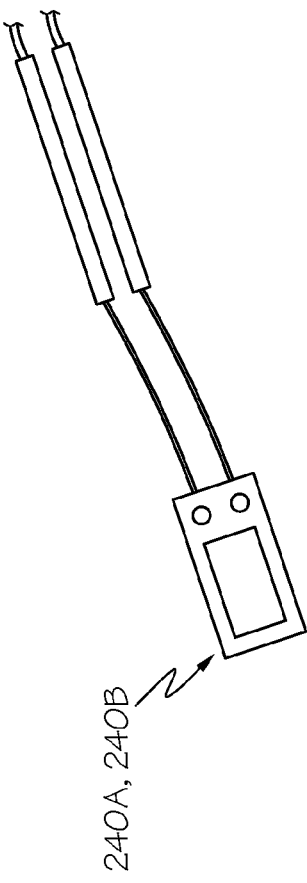
FIG. 7C schematically depicts a strain gauge for use with the roller support of FIG. 7A, according to one or more embodiments shown and described herein.
Figure 7A:
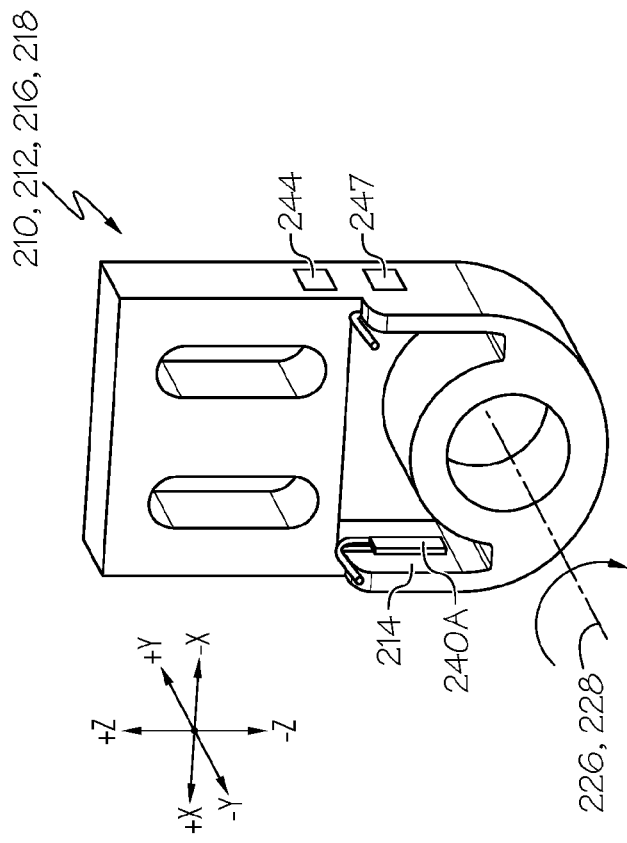
FIG. 7A schematically depicts a roller support of FIG. 6C in isolation, according to one or more embodiments shown and described herein.

For example and referring to FIGS. 7A-7C, in embodiments, a strain gauge 240A is mechanically coupled to the first roller support 210. In some embodiments, the strain gauge 240A is a first strain gauge 240A, and a second strain gauge 240B is mechanically coupled to the first roller support 210. While reference is made herein to the strain gauges 240A, 240B being mechanically coupled to the first roller support 210, it should be understood that one or more strain gauges may be coupled to any or all of the first, second, third, and fourth roller supports 210, 212, 216, 218.

In embodiments, the roller supports 210, 212, 216, and/or 218 define one or more flexures 214 to which the strain gauges 240A, 240B are coupled. The strain gauges 240A, 240B are configured to detect elastic deformation of the flexures 214, which may generally correlate to forces acting on the roller supports 210, 212, 216, and/or 218. In the depicted embodiment, the flexures 214 are walls of a cavity extending through the roller supports 210, 212, 216, and/or 218, however, it should be understood that the flexures 214 may include any suitable portion of the roller supports 210, 212, 216, and/or 218 that elastically deform such that strain of the flexures 214 may be determined.

In embodiments, the strain gauges 240A, 240B are oriented in order to measure a strain. For example, in the embodiment depicted in FIGS. 7A and 7B, the strain gauges 240A, 240B are oriented in the vertical direction (i.e., in the Z-direction as depicted and transverse to the first rotation axis 226), and measure a strain in a resultant vector at some angle between the horizontal (X-axis) and the vertical (Z-axis) direction. By measuring strain in the resultant vector direction, normal forces, i.e., forces acting on the roller supports 210, 212, 216, and/or 218 in a direction transverse to a coating direction, can be determined. For example, forces normal to the X-direction and Z-direction may be imparted on the roller supports 210, 212, 216, and/or 218 by build material 31 (FIG. 2A) distributed by the recoat assembly 200, and/or by cured binder 50 (FIG. 2A), as the recoat assembly 200 moves build material 31 over build area 124 to cover the build material 31 (FIG. 2) and/or cured binder 50 with a layer of build material 31. One or more parameters of the operation of the recoat assembly 200 may be changed to reduce normal forces acting on the roller supports 210, 212, 216, and/or 218 to maintain the structural integrity of build material 31 bound by the cured binder 50 (FIG. 2C) positioned beneath build material 31, as described in greater detail herein.

Figure 8:
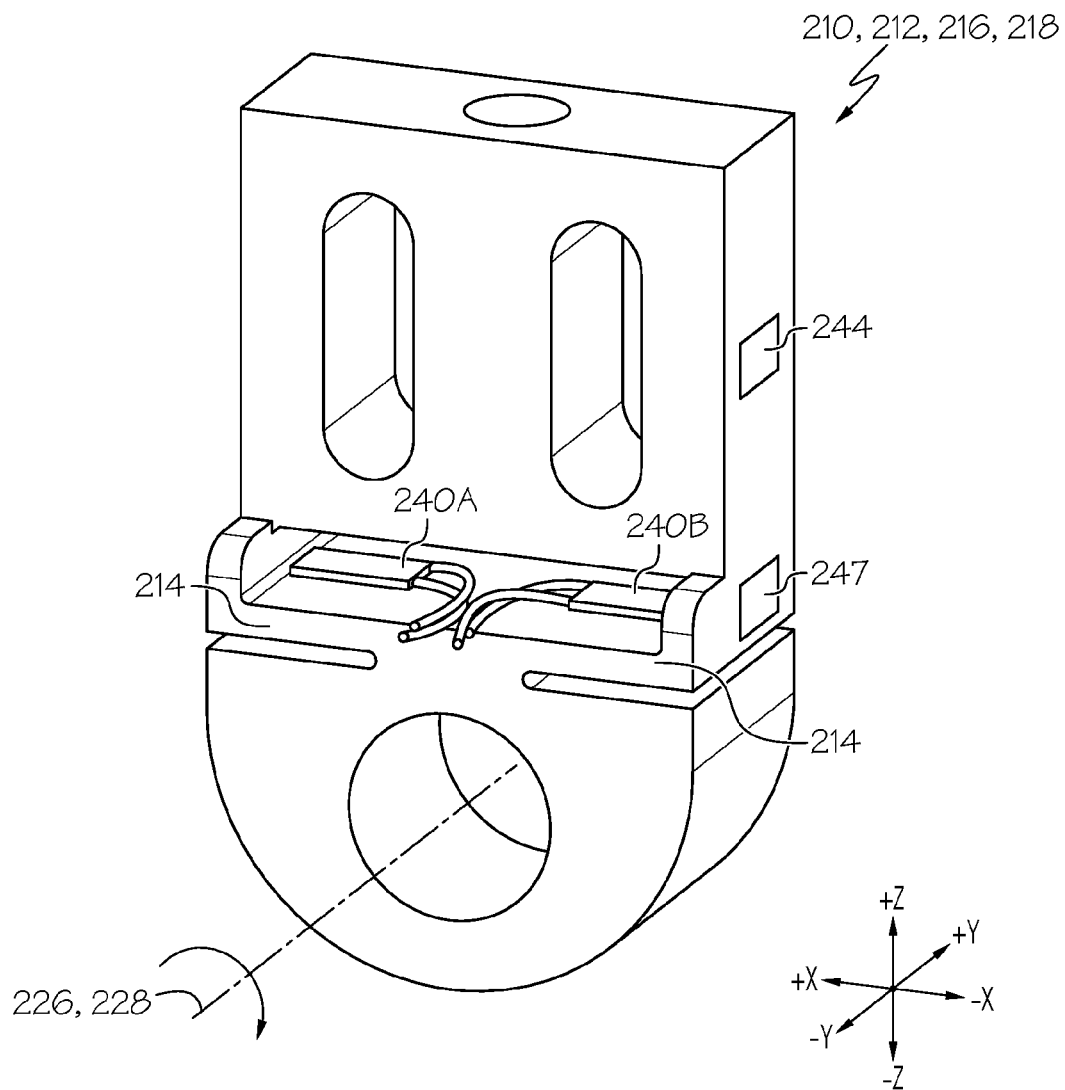
FIG. 8 schematically depicts another roller support in isolation, according to one or more embodiments shown and described herein.

Referring to FIG. 8, in some embodiments, one or both of the strain gauges 240A, 240B are oriented in a horizontal direction (i.e., in the X-direction as depicted and transverse to the first rotation axis 226), and may measure a strain in a resultant vector at some angle between the horizontal (X-axis) and the vertical (Z-axis) direction. In some embodiments, the strain gauges 240A, 240B may be oriented in the horizontal direction on the first and second roller supports 210, 212, while the strain gauges 240A, 240B may be oriented in the vertical direction, as depicted in FIGS. 7A-7B, on the third and fourth roller supports 216, 218. By measuring strain in the horizontal direction (i.e., in the X-direction as depicted), shear forces, i.e., forces acting on the roller supports 210, 212, 216, and/or 218 in a direction corresponding to a coating direction, can be determined. For example, shear forces may be imparted on the roller supports 210, 212, 216, and/or 218 by build material 31 (FIG. 2A) distributed by the recoat assembly 200, and/or by build material 31 bound by cured binder 50 (FIG. 2A) as the recoat assembly 200 moves to the build area 124 to cover a previous layer the build material 31 bound by cured binder 50 and/or the build material 31 with another layer of build material 31. One or more parameters of the operation of the recoat assembly 200 may be changed to reduce shear forces acting on the roller supports 210, 212, 216, and/or 218 to maintain the structural integrity of the build material 31 bound by cured binder 50 (FIG. 2A), as described in greater detail herein. As described in greater detail herein, determined forces can also be utilized in open-loop (i.e., feed-forward) control of the recoat assembly 200 and/or closed-loop (i.e., feedback) control of the recoat assembly 200. For example, in embodiments, determined forces may be compared to a lookup table of desired forces, and one or more parameters of the operation of the recoat assembly 200 may be changed based on the comparison of the determined forces as compared to the desired forces. In embodiments, the forces acting on the roller supports 210, 212, 216, and/or 218 may depend on any of a number of factors, including but not limited to, a layer thickness of the build material 31 (FIG. 2A), a traverse speed of the recoat assembly 200 (FIG. 2A), the direction and rotational speed of the first and/or second roller 202, 204 (FIG. 6C), on the type/composition of build material 31 (FIG. 2A), the particle size of the build material 31 (FIG. 2A), the type/composition of the binder 50 (FIG. 2A), the volume (or saturation) of binder material 50 (FIG. 2A), on if and how the binder is partially or fully cured in situ, on the geometry of the component being built, etc.

In some embodiments, information related to a current layer of the object being built and/or a prior layer may be utilized to generate an expected force or pressure curve to be experienced as the recoat assembly 200 traverses the build area 124. In some embodiments, a geometry of the current layer of the object being built or a geometry of the immediately preceding layer that was built may be used to determine an expected pressure or force profile (e.g., shear forces expected to be experienced as the recoat assembly 200 traverses the build area 124 to distribute material for the current layer, normal forces expected to be experienced as the recoat assembly 200 traverses the build area 124 to distribute material for the current layer and/or any other type of expected force to be experienced as the recoat assembly 200 traverses the build area 124 to distribute material for the current layer), output signals from the one or more sensors coupled to the roller supports (e.g., one or more strain gauges and/or one or more load cells) may be used to calculate a measured force or pressure as the recoat assembly 200 traverses the build area 124 to distribute material for the current layer, a comparison between the expected pressure or measured force profile and the measured force or pressure may be made, and an action may be taken in response to the comparison. In some embodiments, a lookup table containing expected force or pressure information may be previously generated, such as based on calibration force measurements generated under various conditions (e.g., size of build area coated with binder, recoat traverse speed, recoat roller rotation speed, layer thickness, recoat roller geometry coating, and the like). For example, in some embodiments, when an expected pressure or force deviates from a measured pressure or force during spreading of material for a current layer by the recoat assembly 200, the printing recoat process may be determined to be defective. The extent of force deviation may be used to determine a type of defect (e.g., a powder defect, a recoat roller defect, insufficient binder cure, a jetting defect, or the like). When a deviation beyond a given threshold is determined to have occurred, a corrective action may be taken, such as to adjust a recoat traverse speed for the current layer, adjust a roller rotation speed for the current layer, adjust a recoat traverse speed for one or more subsequent layers, adjust a roller rotation speed for one or more subsequent layers, adjust a height of one or more rollers for the current layer and/or for one or more subsequent layers, etc. Such measurements, comparisons, and control actions may be implemented by the electronic control unit 300 executing one or more instructions stored in its memory component.

In some embodiments, the one or more sensors mechanically coupled to the roller supports 210, 212, 216, and/or 218 may include a load cell.

Figure 9B:
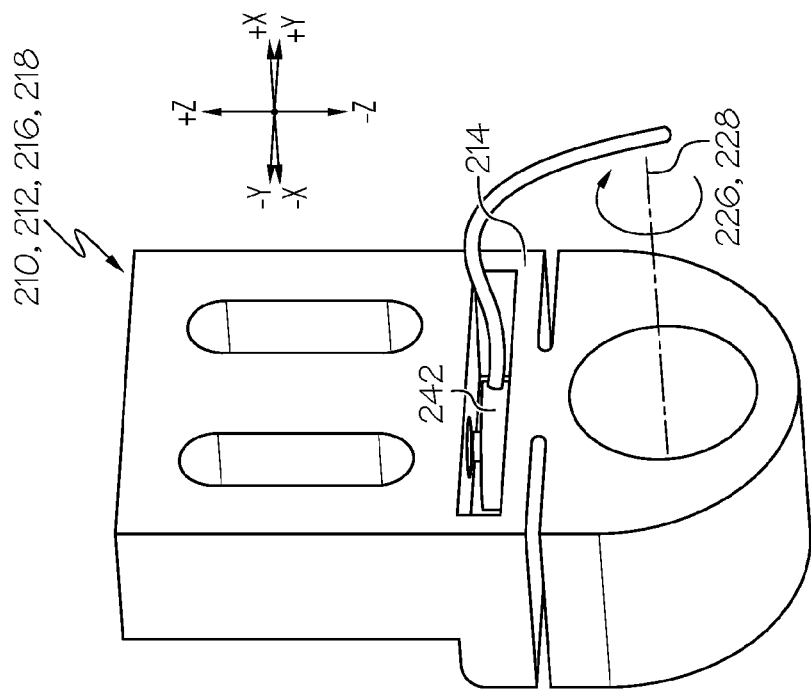
FIG. 9B schematically depicts another view of the roller support of FIG. 9A, according to one or more embodiments shown and described herein.
Figure 9A:
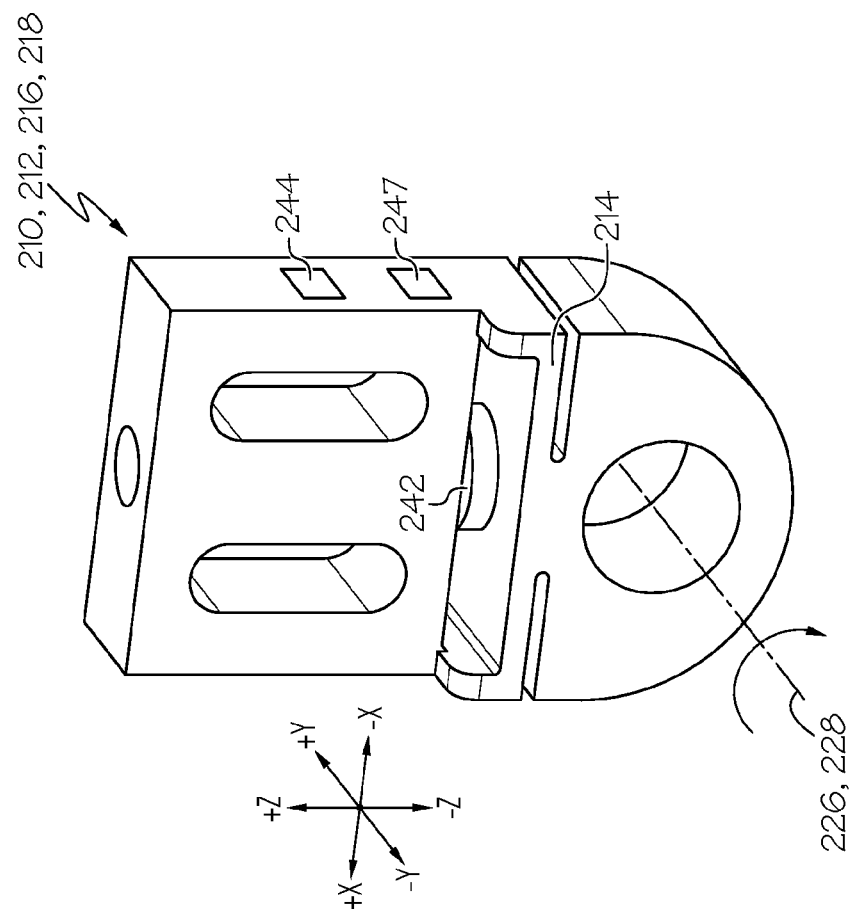
FIG. 9A schematically depicts another roller support in isolation, according to one or more embodiments shown and described herein.
Figure 9C:
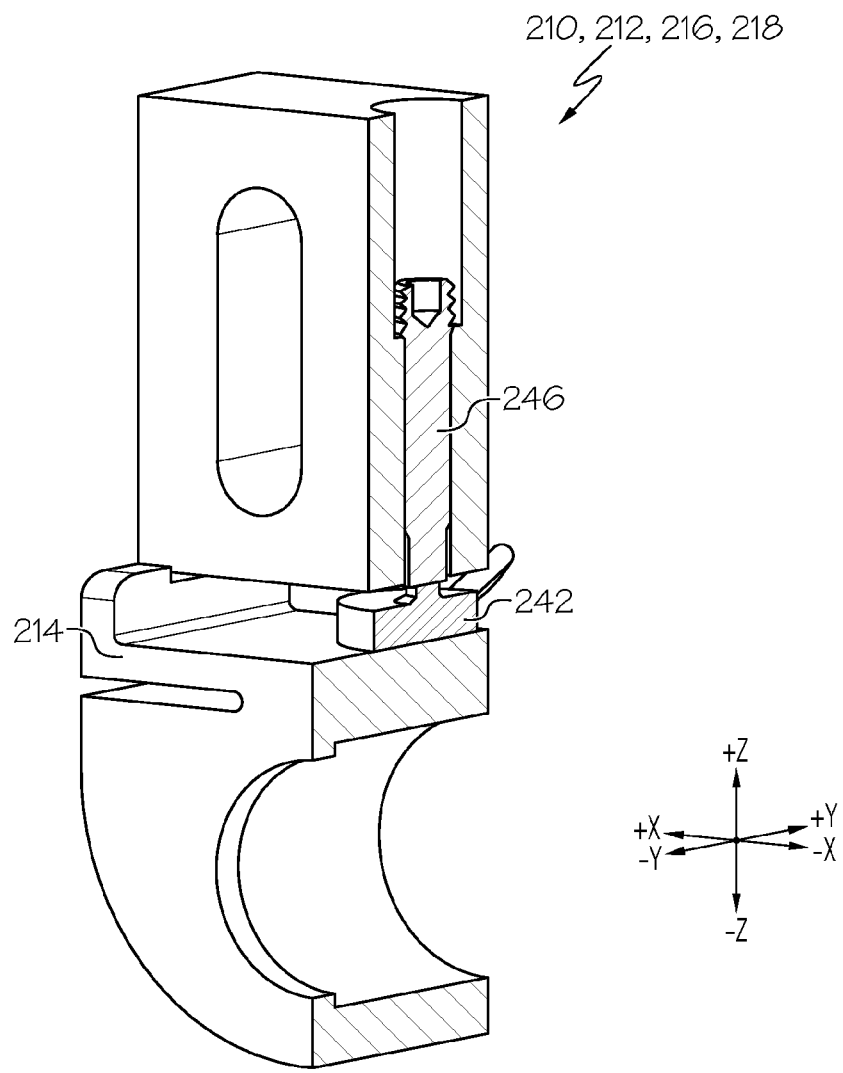
FIG. 9C schematically depicts a section view of the roller support of FIG. 9A, according to one or more embodiments shown and described herein.
Figure 9D:
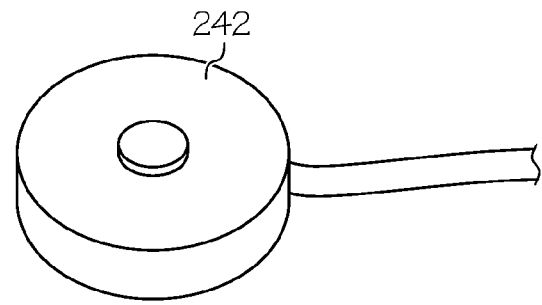
FIG. 9D schematically depicts a load cell for use with the roller support of FIG. 9A, according to one or more embodiments shown and described herein.

For example and referring to FIGS. 9A-9D, in embodiments a load cell 242 is mechanically coupled to the first roller support 210, and is configured to measure a force in the vertical direction (i.e., in the Z-direction as depicted and transverse to the first rotation axis 226). As shown in FIG. 9C, in some embodiments, a set screw 246 may engage the load cell 242 to calibrate the load cell 242, for example, by applying a known amount of force to the load cell 242.

Figure 10:
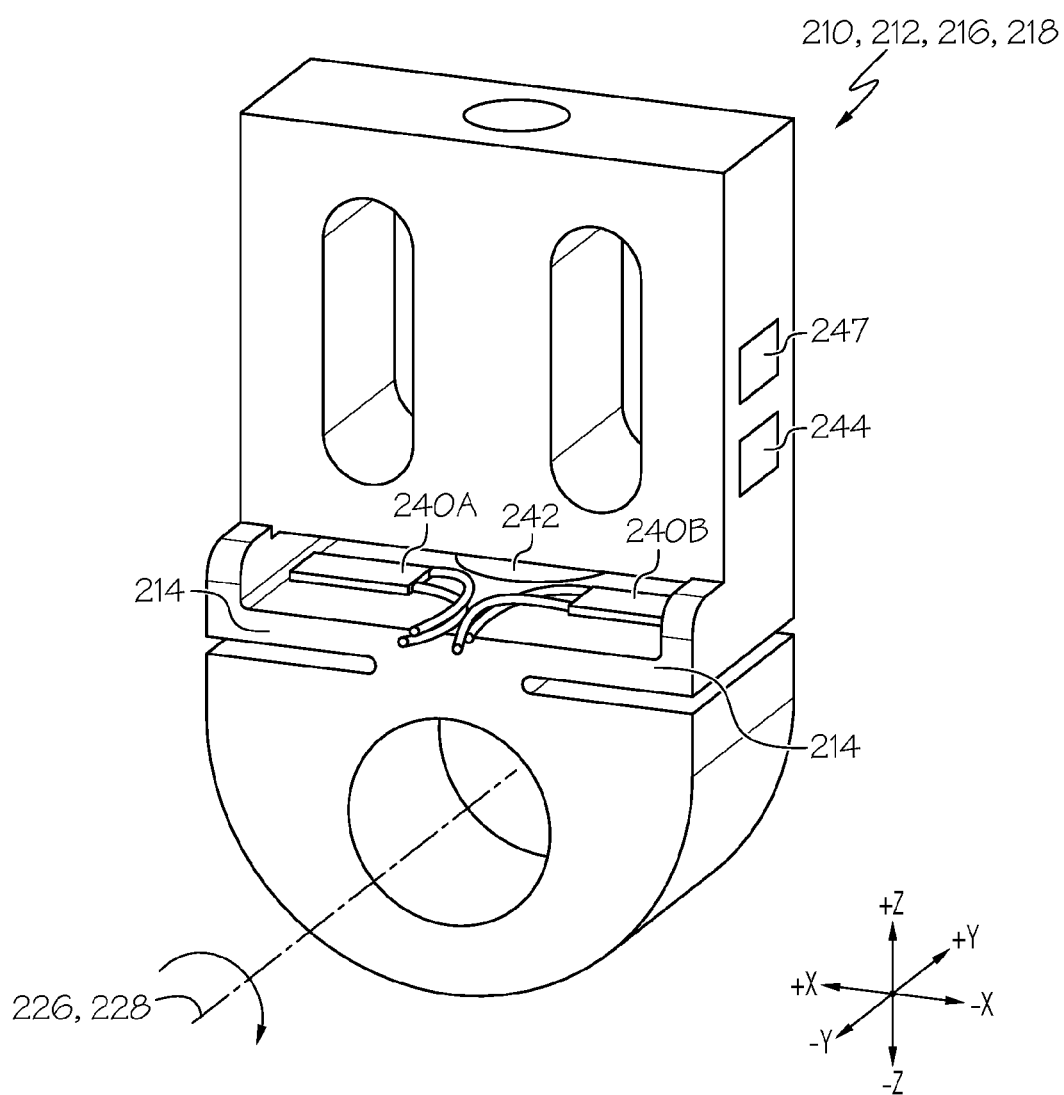
FIG. 10 schematically depicts a roller support coupled to a load cell and at least one strain gauge, according to one or more embodiments shown and described herein.

Referring to FIG. 10, in some embodiments, the first roller support 210 may include both the load cell 242 and the strain gauges 240A, 240B. While in the embodiment depicted in FIG. 10, the strain gauges 240A, 240B are oriented in the horizontal direction, it should be understood that one or both of the strain gauges 240A, 240B may be oriented in the vertical direction.

In some embodiments, an accelerometer 244 is coupled to the first roller support 210. While in the embodiment depicted in FIG. 10, the load cell 242, the strain gauges 240A, 240B, and the accelerometer 244 are coupled to the first roller support 210, it should be understood that in some embodiments, only the accelerometer 244 may be mechanically coupled to the first roller support 210. In some embodiments, the accelerometer 244 is coupled to the first roller support 210 along with any combination of the load cell 242, the strain gauge 240A, and/or the strain gauge 240B. Furthermore, the accelerometer 244 may be coupled to any of the roller supports 210, 212, 216, and/or 218.

In some embodiments, a roller support temperature sensor 247 is coupled to the first roller support 210. The roller support temperature sensor 247 is operable to detect a temperature of the roller support 210, which may be utilized to calibrate and/or compensate for a load cell reading from the load cell 242. While in the embodiment depicted in FIG. 10, the load cell 242, the strain gauges 240A, 240B, the accelerometer 244, and the roller support temperature sensor 247 are coupled to the first roller support 210, it should be understood that in some embodiments, only the roller support temperature sensor 247 may be mechanically coupled to the first roller support 210. In some embodiments, the roller support temperature sensor 247 is coupled to the first roller support 210 along with any combination of the load cell 242, the strain gauge 240A, the strain gauge 240B, and/or the accelerometer 244. Furthermore, the roller support temperature sensor 247 may be coupled to any of the roller supports 210, 212, 216, and/or 218.

Figure 11C:
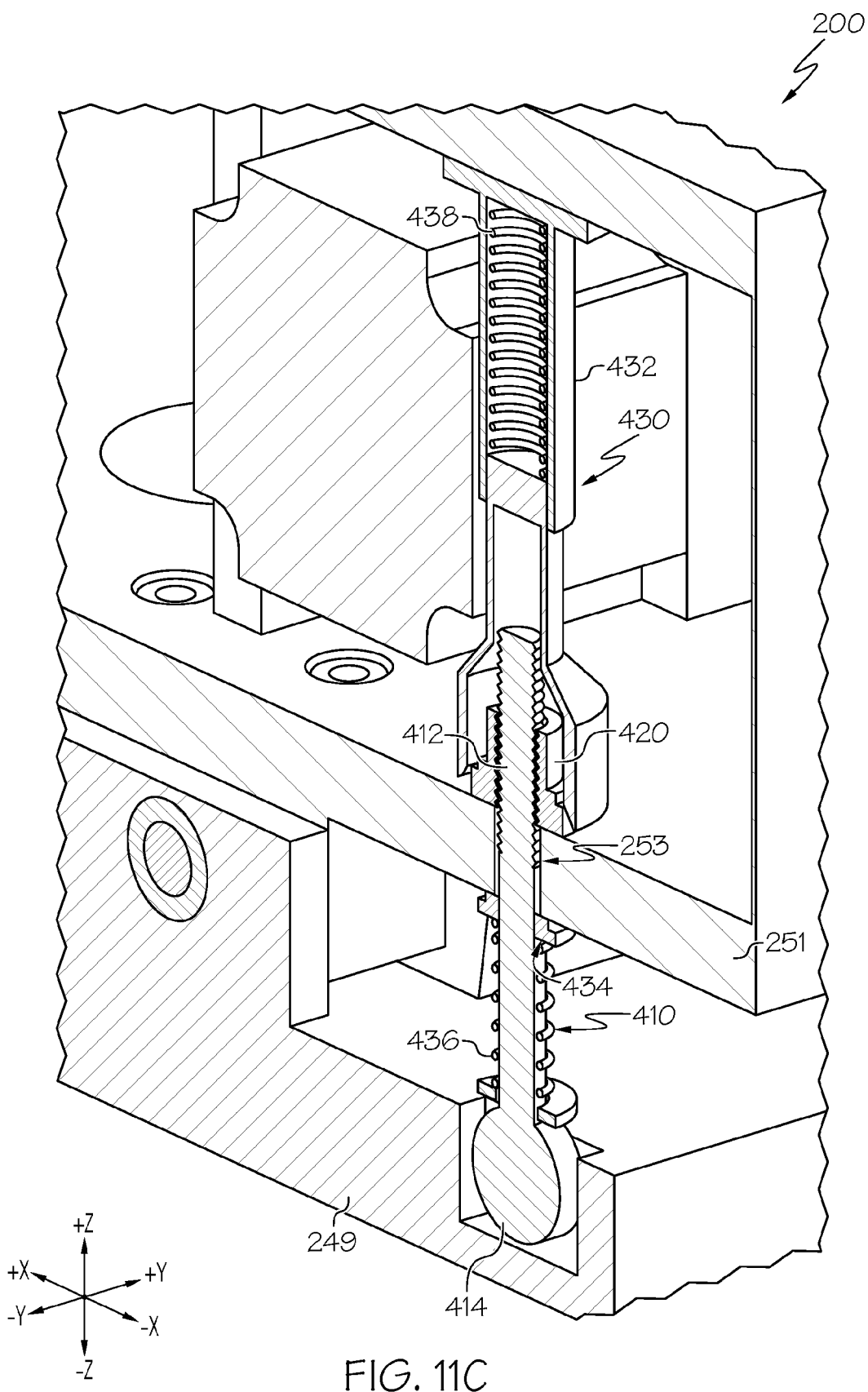
FIG. 11C schematically depicts a perspective section view of the recoat assembly of FIG. 11B, according to one or more embodiments shown and described herein.

Referring to FIG. 11A, in some embodiments, the recoat assembly 200 generally includes a front energy source 260 coupled to the base member 250 and positioned forward of the front roller 202 (i.e., in the +X-direction as depicted). The recoat assembly 200, in the embodiment depicted in FIG. 11A, further includes a rear energy source 262 coupled to the base member 250 and positioned rearward of the rear roller 204 (i.e., in the −X-direction as depicted). The front energy source 260 generally emits energy forward of the front roller 202, and the rear energy source 262 emits energy rearward of the rear roller 204. In embodiments, the front and rear energy sources 260, 262 may generally emit electromagnetic radiation, such as infrared radiation, ultraviolet radiation, or the like. In some embodiments, the front and rear energy sources 260, 262 may emit energy, which may act to heat build material 31 (FIG. 2A) and/or cure binder material 50 (FIG. 2A) on the build material 31, as described in greater detail herein. While in the embodiment depicted in FIG. 11A, the front energy source 260 is positioned forward of the front roller 202 and the rear energy source 262 is positioned rearward of the rear roller 204, it should be understood that this is merely an example. For example in some embodiments, the front energy source 260 and the rear energy source 262 may both be positioned forward of the front roller 202, as shown in FIG. 6A, or the front energy source 260 and the rear energy source 262 may both be positioned rearward of the front roller 202 and the rear roller 204. By including multiple energy sources (e.g., the front energy source 260 and the rear energy source 262), energy can be applied to build material 31 (FIG. 1A) over a comparatively longer period of time as compared to the application of energy via a single energy source. In this way, over-cure of build material 31 bound by cured binder 50 can be minimized. While in the embodiment depicted in FIG. 11A, a front energy source 262 and a rear energy source 262 are depicted, it should be understood that embodiments described herein can include any suitable number of energy sources positioned in any suitable manner forward and rearward of the front roller 202 and the rear roller 204. Referring to FIGS. 11B-11D, in some embodiments, the recoat assembly 200 includes one or more hard stops 410 coupled to the base member 250. While a single hard stop 410 is shown in the section views depicted in FIGS. 11C and 11D, it should be understood that each of the hard stops 410 may be identical. Moreover, although in the embodiment depicted in FIG. 11B the recoat assembly 200 includes two hard stops 410, it should be understood that the recoat assembly 200 may include a single hard stop 410 or any suitable number of hard stops 410.

The hard stops 410 may assist in limiting movement of the first roller 202 and/or the second roller 204 about the Y-axis as depicted, for example, as a result of actuation of the roller vertical actuator 252. For example and referring particularly to FIGS. 11A, 11C, and 21, in some embodiments, the roller vertical actuator 252 is coupled to a pivoting portion 249 of the base member 250 that is movable with respect to a stationary portion 251 of the base member 250 about the Y-axis as depicted. The first roller 202 and the second roller 204 may be coupled to the pivoting portion 249, such that movement of the pivoting portion 249 about the Y-axis results in movement of the first roller 202 and/or the second roller 204 about the Y-axis as depicted.

In embodiments, the hard stop 410 includes a coupling portion 414 that is coupled to the pivoting portion 249 of the base member 250, and a post portion 412 that is movably engaged with the stationary portion 251 of the base member 250. For example, the post portion 412 of the hard stop 410 may be movable with respect to the stationary portion 251 in a vertical direction (e.g., in the Z-direction as depicted). Movement of the post portion 412 of the hard stop 410 in the vertical direction (e.g., in the Z-direction as depicted) may be restricted. For example, a nut 420 may be adjustably engaged with the post portion 412, and may restrict movement of the post portion 412 with respect to the stationary portion 251 of the base member 250. Because the coupling portion 414 of the hard stop 410 is coupled to the pivoting portion 249 of the base member 250, restriction of the movement of the post portion 412 of the hard stop 410 with respect to the stationary portion 251 thereby restricts movement of the pivoting portion 249 with respect to the stationary portion 251 in the vertical direction (e.g., in the Z-direction as depicted). In some embodiments, the nut 420 is adjustable on the post portion 412 in the Z-direction as depicted. By moving the nut 420 along the post portion 412 in the Z-direction, the freedom of movement of the pivoting portion 249 of the base member 250, and accordingly the first roller 202 and/or the second roller 204, with respect to the stationary portion 251 of the base member 250 can be adjusted. Through the hard stop 410, movement of the pivoting portion 249 of the base member 250, and accordingly the first roller 202 and/or the second roller 204, via actuation of the roller vertical actuator 250 can be precisely tuned as desired. While in the embodiment depicted in FIGS. 11C and 11D the hard stop 410 includes the nut 420 that limits movement of the hard stop 410, it should be understood that this is merely an example. For example, in some embodiments, the movement of the hard stop 410 may be limited by a manual micrometer, one or more motors, or the like. For example and as best shown in FIG. 16B, in some embodiments, the recoat assembly may include multiple hard stops 410 that limit movement of the first roller 202 and the second roller about the Y-axis as depicted. The hard stops 410 may include micrometers for moving a position of the hard stops 410. In some embodiments, the hard stops 410 may further include a load cell for detecting a position of the hard stop 410.

In some embodiments, the post portion 412 of the hard stop 410 extends through an aperture 253 extending through the stationary portion 251 of the base member 250. In some embodiments, the recoat assembly 200 includes a dust shield 430 that at least partially encapsulates the aperture 253 and/or at least a portion of the hard stop 410. For example in the embodiment depicted in FIGS. 11C and 11D, the dust shield 430 includes an upper portion 432 that at least partially covers an upper opening of the aperture 253 and the post portion 414 of the hard stop 410, and a lower portion 434 that at least partially covers a lower opening of the aperture 253. The dust shield 430 may further include a lower biasing member 436 that biases the lower portion 434 of the dust shield 430 into engagement with the aperture 253. The dust shield 430 may further include an upper biasing member 438 that biases the upper portion 432 of the dust shield 430 into engagement with the aperture 253. By at least partially enclosing the aperture 253, the dust shield 430 may assist in preventing build material 31 (FIG. 1) from entering the aperture 253 and interfering with movement of the post portion 412 of the hard stop 410 through the aperture 253. Further, in embodiments, the lower biasing member 436 and/or the upper biasing member 438 may at least partially offset tension resulting from a connection between the first rotational actuator 206 and the first roller 202 and/or between the second rotational actuator 208 and the second roller 204. For example, as shown in FIG. 11B, the first rotational actuator 206 may be coupled to the first roller 202 via a belt. Similarly, the second rotational actuator 208 may be coupled to the second roller 204 via a belt. Tension in the belts may cause movement of the first roller 202 and/or the second roller 204 in the Z-direction as depicted. This movement may be opposed by the lower biasing member 436 and/or the upper biasing member 438, thereby stabilizing the position of the first roller 202 and/or the second roller 204 in the Z-direction as depicted.

Figure 11E:
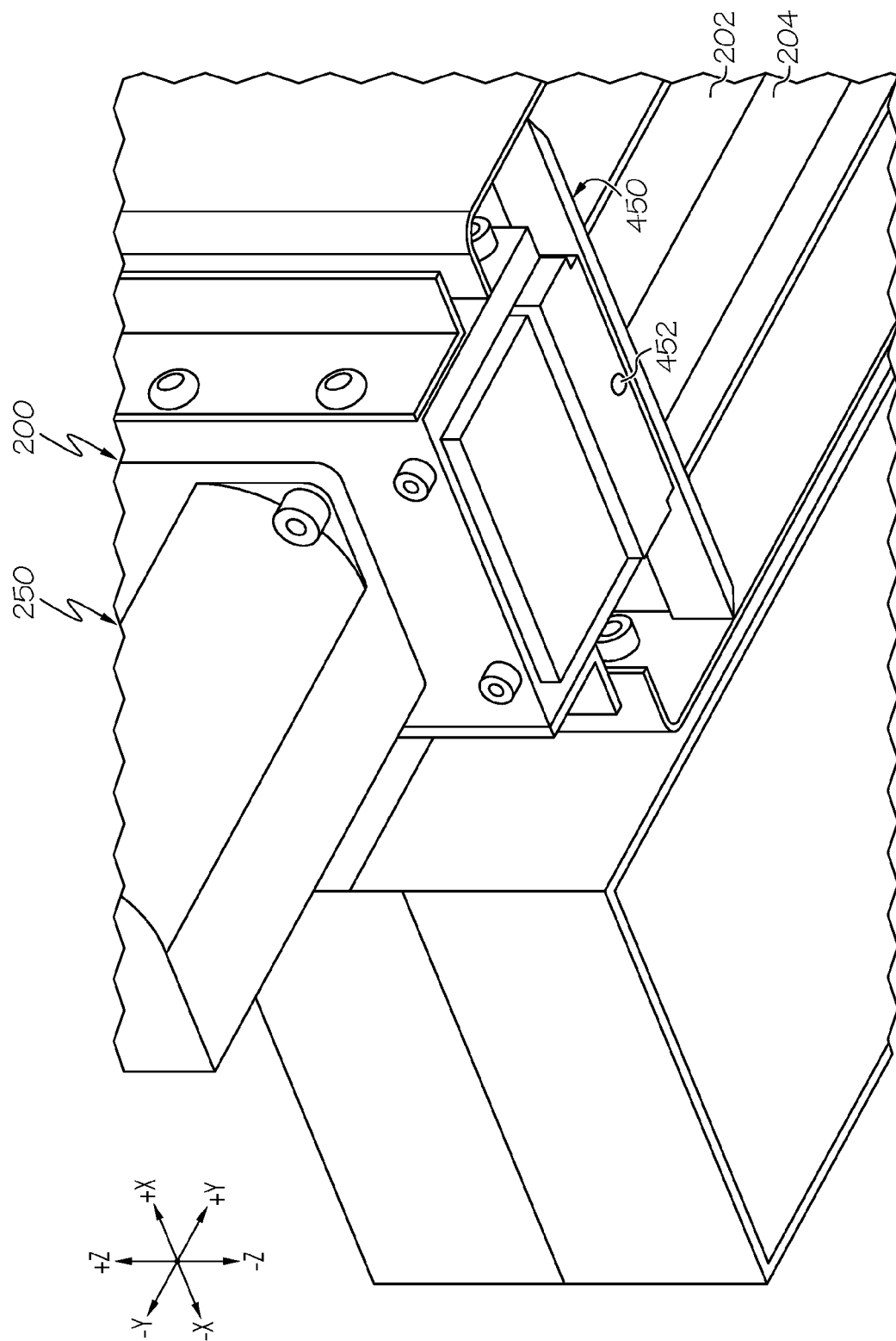
FIG. 11E schematically depicts a bottom perspective view of a recoat assembly, according to one or more embodiments shown and described herein.

Referring to FIG. 11E, a lower perspective view of the recoat assembly 200 is schematically depicted. In some embodiments, the recoat assembly 200 includes a powder guide 450 pivotally coupled to the base member 250 of the recoat assembly 200 at a pivot point 452. The powder guide 450 may be pivotable with respect to the base member 250 about the Y-axis as depicted. By pivoting with respect to the base member 250 about the Y-axis, the powder guide 450 may maintain contact with the build platform 20 (FIG. 1) and/or the supply platform 30 (FIG. 1) as the rollers 202, 204 move in the Z-direction as depicted. The powder guide 450 may assist in restricting the flow of build material 31 (FIG. 1) in the Y-direction away from recoat assembly 200.

Figure 12:
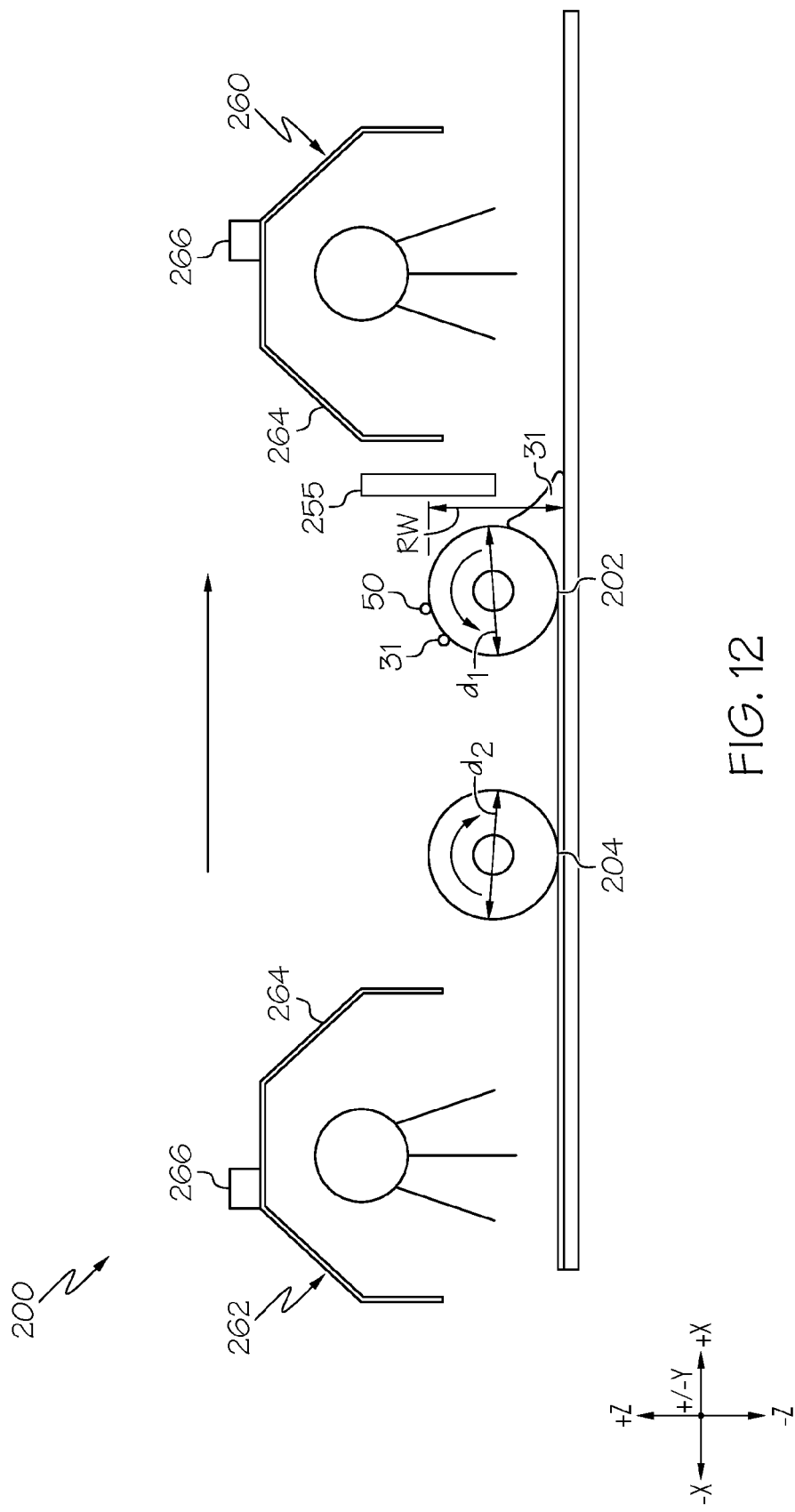
FIG. 12 schematically depicts rollers and energy sources of the recoat assembly of FIG. 6B, according to one or more embodiments shown and described herein.

Referring to FIGS. 11A and 12, in some embodiments, the front energy source 260 and the rear energy source 262 are each positioned at least partially within an energy source housing 264. The energy source housings 264 can, in some embodiments, focus energy emitted by the front energy source 260 and the rear energy source 262, and may include a reflective interior surface or the like.

In some embodiments, the recoat assembly 200 includes one or more housing temperature sensors 266. In the embodiment depicted in FIG. 12, the recoat assembly 200 includes a housing temperature sensor 266 coupled to the energy source housing 264 of the front energy source 260, and a housing temperature sensor 266 coupled to the energy source housing 264 of the front energy source 262. In embodiments, the housing temperature sensors 266 are configured to detect a temperature of the respective front and rear energy sources 260, 262 and/or the energy source housings 264. The energy emitted by the front and rear energy sources 260, 262 may be controlled based at least in part on the detected temperature of the front and rear energy sources 260, 262 and/or the energy source housings 264, so as to prevent damage to the front and rear energy sources 260, 262 and/or the energy source housings 264 and/or to ensure that appropriate energy is applied to the build material 31.

In some embodiments, the recoat assembly 200 includes one or more housing engagement members 257 positioned at outboard ends of the recoat assembly 200 and engaged with a housing of the additive manufacturing system 100. The housing engagement members 257 are generally configured to engage and "plow" or "scrape" build material 31 off of the sides of the additive manufacturing system 100. In embodiments, the housing engagement members 257 may include any structure suitable, such as brushes, blades, or the like.

Referring to FIG. 12, a side view of the recoat assembly 200 is schematically depicted. In embodiments, the front roller 202 has a front roller diameter d1, and the rear roller 204 has a rear roller diameter d2. In some embodiments, the front roller diameter d1 is different from the rear roller diameter d2 For example, in some embodiments, the front roller diameter d1 is less than the rear roller diameter d2. In embodiments, the front roller diameter d1 is between 20 millimeters and 25 millimeters, inclusive of the endpoints. In some embodiments, the front roller diameter d1 is between 10 millimeters and 40 millimeters, inclusive of the endpoints. In some embodiments, the front roller diameter d1 is less than about 22.23 millimeters. As described in greater detail herein, a relatively small diameter may assist the front roller 202 in fluidizing build material 31 to distribute the build material 31. In embodiments, the rear roller diameter d2 is between 35 millimeters and 40 millimeters, inclusive of the endpoints. In embodiments, the rear roller diameter d2 is between 20 millimeters and 60 millimeters, inclusive of the endpoints. In some embodiments, the rear roller diameter d2 is greater than about 38.1 millimeters. As described in greater detail herein, a relatively large diameter may assist the rear roller 204 in compacting build material 31.

In some embodiments, the recoat assembly 200 includes a powder engaging member 255 coupled to the base member 250 (FIG. 11A) and positioned forward of the front roller 202. In embodiments, the powder engaging member 255 is positioned at a height evaluated in the vertical direction (i.e., in the Z-direction as depicted) that is within a roller window Rw defined by the front roller 202. The powder engaging member 255 may be a "doctor" blade that generally acts to plow and clear build material 31 forward of the front roller 202, thereby minimizing a height of build material 31 contacted by the front roller 202. While in the depicted embodiment, the recoat assembly 200 includes the powder engaging member 255 and the front and rear rollers 202, 204, it should be understood that in some embodiments, the recoat assembly 200 may include only the powder engaging member 255 to spread build material 31. While in the embodiment depicted in FIG. 12, the powder engaging member 255 is positioned forward of the front roller 202, embodiments described herein may include a single or multiple powder engaging members positioned forward of the front roller 202 and/or rearward of the rear roller 204.

In some embodiments, the recoat assembly 200 includes multiple front rollers 202 and/or multiple rear rollers 204.

Figure 13:
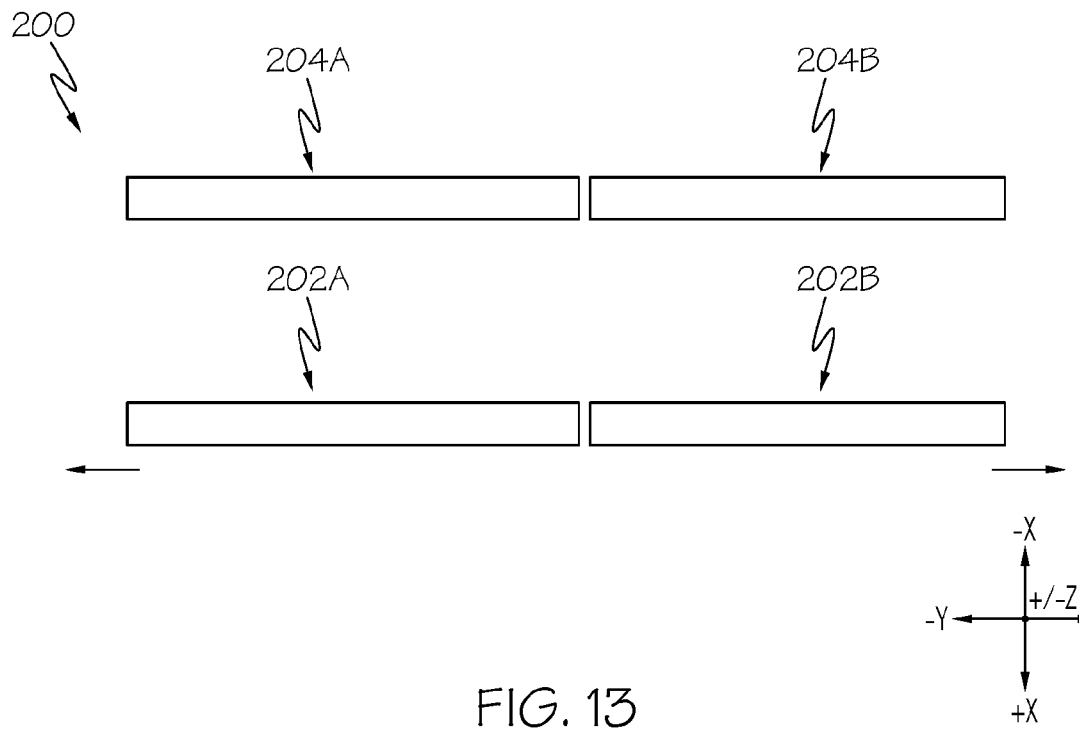
FIG. 13 schematically depicts one embodiment of a layout of the rollers of the recoat assembly of FIG. 6B, according to one or more embodiments shown and described herein.

For example and referring to FIG. 13, a top view of one configuration of front rollers 202A, 202B and rear rollers 204A, 204B is schematically depicted. In the embodiment depicted in FIG. 13, the recoat assembly 200 includes a first front roller 202A and a second front roller 202B that is spaced apart from the first front roller 202A in the lateral direction (i.e., in the Y-direction as depicted). In the embodiment depicted in FIG. 13, the recoat assembly 200 further includes a first rear roller 204A and a second rear roller 204B spaced apart from the first rear roller 204A in the lateral direction (i.e., in the Y-direction as depicted). While the embodiment depicted in FIG. 13 includes the two front rollers 202A, 202B and two rear rollers 204A, 204B, it should be understood that the recoat assembly 200 may include any suitable number of front rollers spaced apart from one another in the lateral direction (i.e., in the Y-direction as depicted), and any suitable number of rear rollers spaced apart from one another in the lateral direction. In some embodiments, the recoat assembly 200 may include the two front rollers 202A, 202B, and a single rear roller, or the two rear rollers 204A, 204B with a single front roller. By including multiple front rollers 202A, 202B, aligned with one another in the lateral direction (i.e., in the Y-direction as depicted), and/or by including multiple rear rollers 204A, 204B aligned with one another in the lateral direction, the recoat assembly 200 may extend a greater distance in the lateral direction, as compared to recoat assemblies including a single front roller and a single rear roller. As an example and without being bound by theory, the longer a roller extends in the lateral direction (i.e., in the Y-direction as depicted), the more susceptible the roller may be to elastic and/or inelastic deformation due to forces acting on the roller. Accordingly, the width of recoat assemblies including a single front roller and a single rear roller may be effectively limited, which may limit the size of objects that may be built by the additive manufacturing system 100. However, by including multiple front rollers 202A, 202B, aligned with one another in the lateral direction (i.e., in the Y-direction as depicted), and/or by including multiple rear rollers 204A, 204B aligned with one another in the lateral direction, the recoat assembly 200 may extend a greater distance in the lateral direction.

Figure 14:
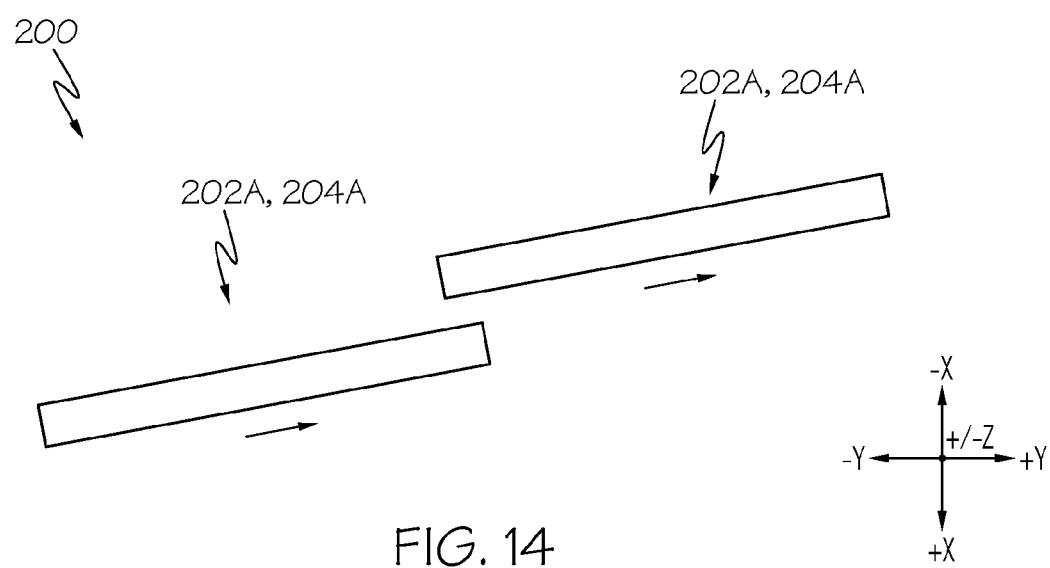
FIG. 14 schematically depicts another embodiment of a layout of the rollers of the recoat assembly of FIG. 6B, according to one or more embodiments shown and described herein.

Referring to FIG. 14, in some embodiments, the front rollers 202A, 202B overlap one another in the lateral direction (i.e., in the Y-direction as depicted). In embodiments in which the recoat assembly 200 includes the two rear rollers 204A, 204B, the two rear rollers may similarly overlap one another in the lateral direction (i.e., in the Y-direction as depicted). By overlapping the front rollers 202A, 202B and/or the rear rollers 204A, 204B in the lateral direction (i.e., in the Y-direction as depicted), the front rollers 202A, 202B and/or the rear rollers 204A, 204B may prevent build material 31 (FIG. 12) from passing between adjacent front rollers 202A, 202B and/or adjacent rear rollers 204A, 204B.

Referring to FIG. 15, in some embodiments, rollers are positioned to extend across gaps defined by adjacent rollers. For example, in the embodiment depicted in FIG. 15, the recoat assembly 200 includes three front rollers 202A, 202B, and 202C, wherein adjacent front rollers 202A, 202B define a gap G1 positioned between the rollers 202A, 202B in the lateral direction (i.e., in the Y-direction as depicted), and adjacent front rollers 202B, 202C define a gap G2 positioned between the rollers 202B, 202C in the lateral direction. The recoat assembly 200 includes a rear roller 204A extending between the adjacent front rollers 202A, 202B, and rear roller 204B extending between the adjacent front rollers 202B, 202C. In particular, the rear roller 204A extends across the gap G1 between the adjacent front rollers 202A, 202B, and the rear roller 204B extends across the gap G2 between the adjacent front rollers 202B, 202C. By extending across the gaps G1, G2, the rear rollers 204A, 204B may engage build material 31 (FIG. 12) that passes through the gaps G1, G2.

Figure 16A:
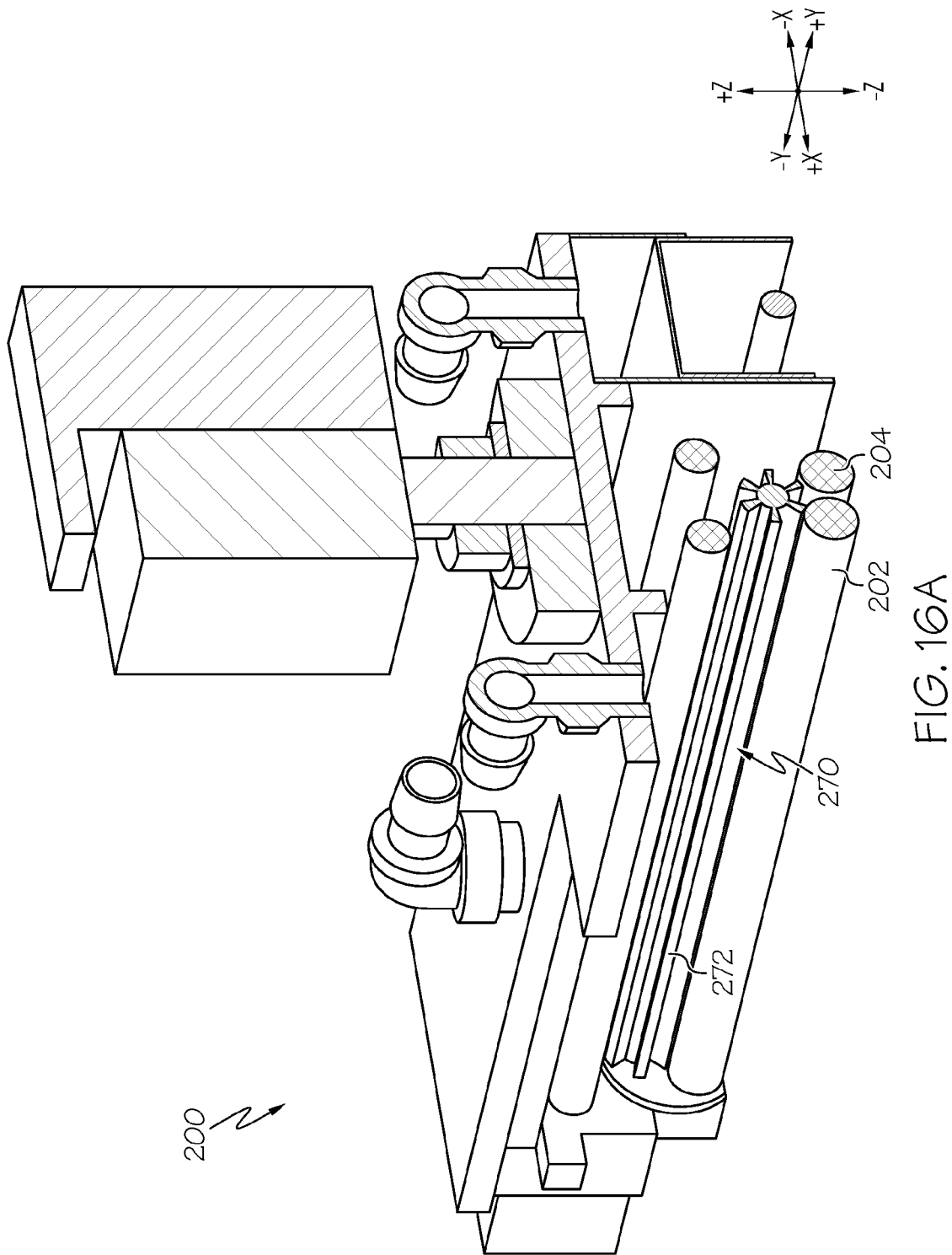
FIG. 16A schematically depicts a perspective view of a recoat assembly including a cleaning member, according to one or more embodiments shown and described herein.
Figure 16B:
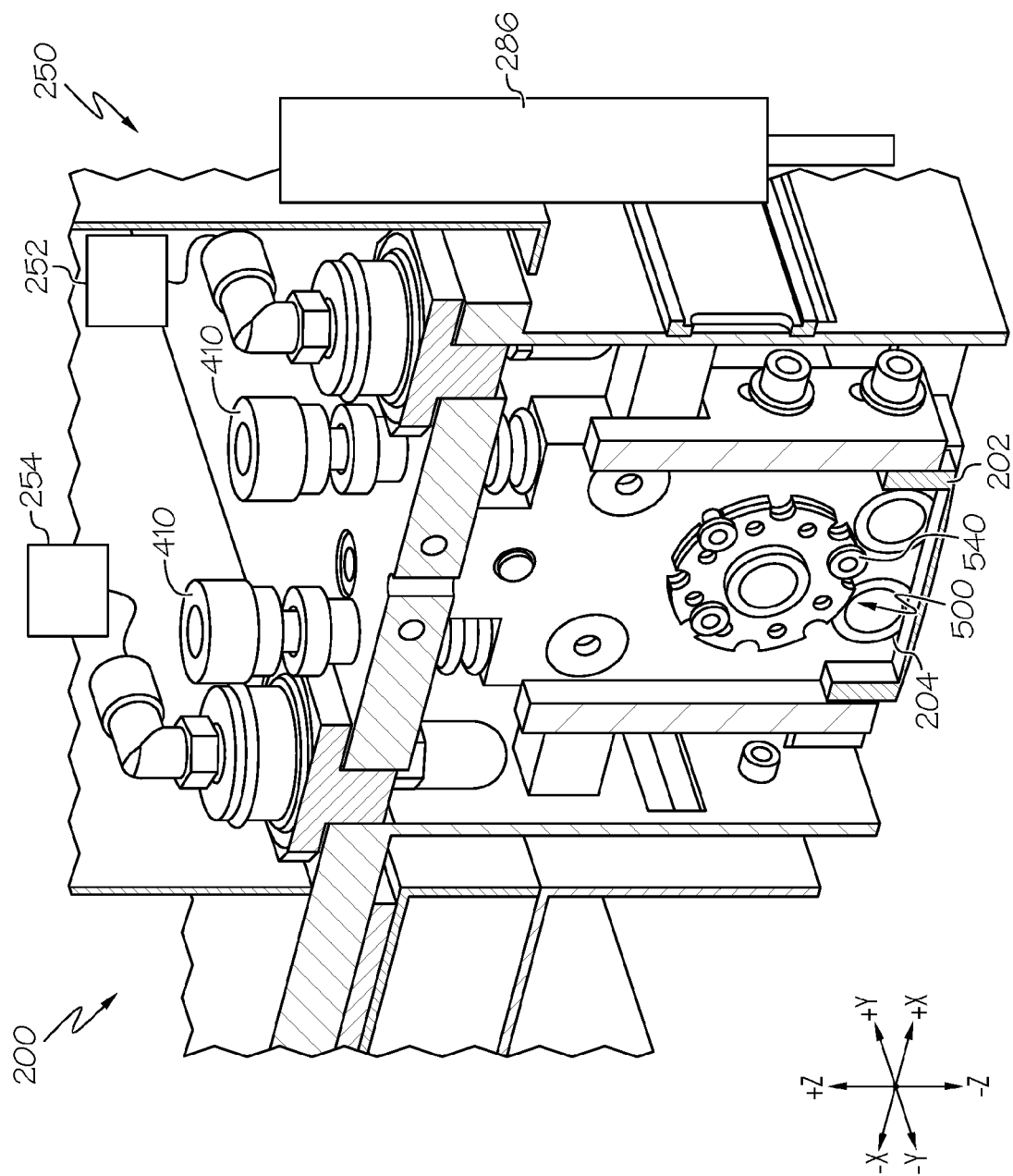
FIG. 16B schematically depicts a perspective view of a recoat assembly including a cleaning member, according to one or more embodiments shown and described herein.

Referring to FIG. 16A, in some embodiments, the recoat assembly 200 includes a cleaning member 270. In embodiments, the cleaning member 270 that is selectively engageable with at least one roller. For example, in the embodiment depicted in FIG. 16A, the cleaning member 270 is positioned between and engaged with the first roller 202 and the second roller 204. In the embodiment depicted in FIG. 16A, the cleaning member 270 generally engages both the first roller 202 and the second roller 204 along the length of the first roller 202 and the second roller 204 evaluated in the lateral direction (i.e., in the Y-direction as depicted) and generally removes build material 31 (FIG. 12) and/or cured binder 50 (FIG. 12) that may remain attached to the first roller 202 and the second roller 204 as the first roller 202 and the second roller 204 rotate. In some embodiments, the cleaning member 270 is a cleaning roller including grooves 272 or brush that is configured to rotate while engaged with the first roller 202 and the second roller 204. In some embodiments, the cleaning member 270 may include a blade or the like that removes build material 31 (FIG. 12) from the first roller 202 and the second roller 204. While in the embodiment depicted in FIG. 16A the cleaning member 270 is simultaneously engaged with the first roller 202 and the second roller 204, it should be understood that the cleaning member 270 may in some embodiments be engaged solely with either the first roller 202 or the second roller 204. Moreover, while the embodiment depicted in FIG. 16A depicts a single cleaning member 270, it should be understood that in embodiments, the recoat assembly 200 may include multiple cleaning members 270.

Figure 16C:
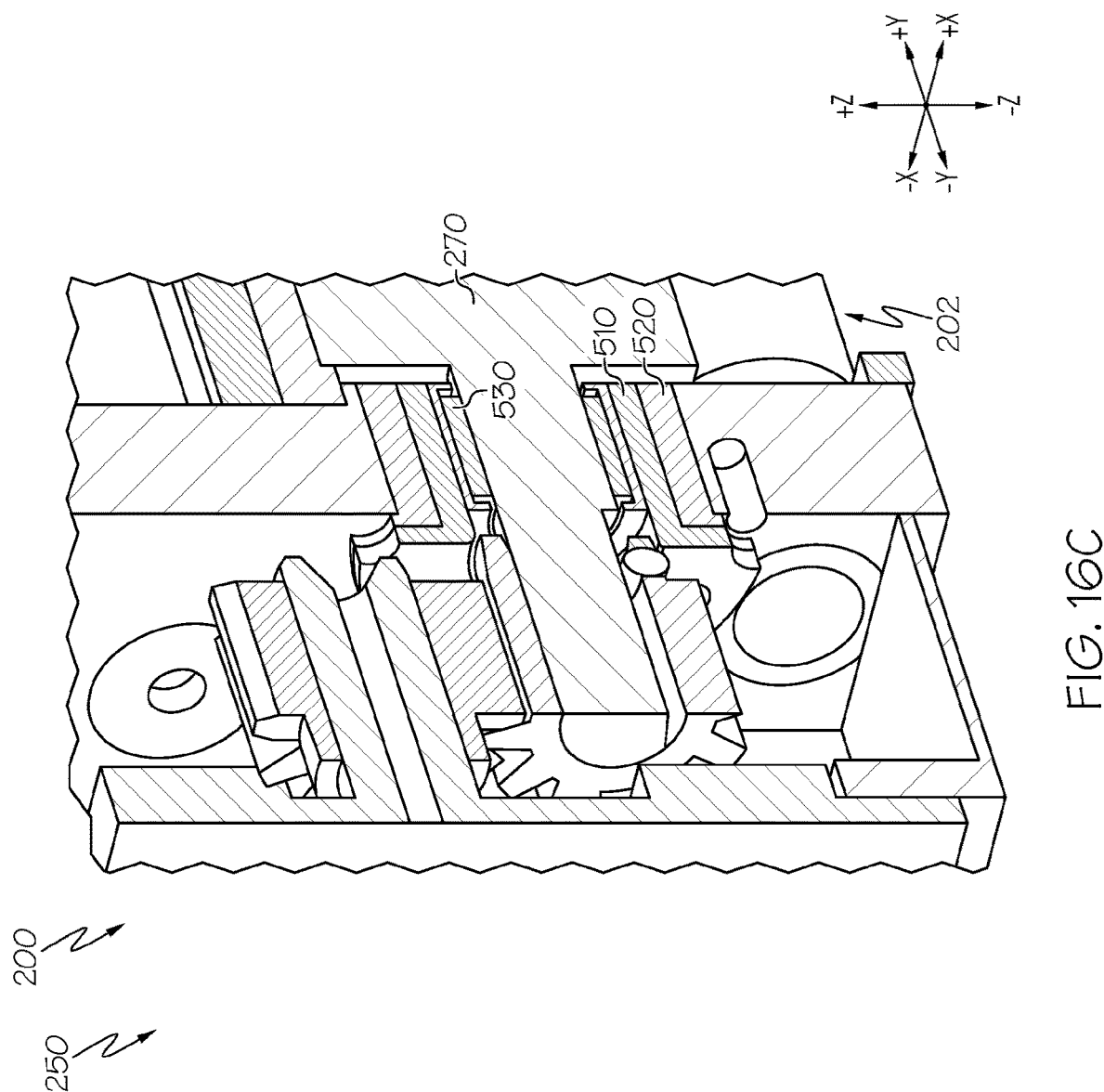
FIG. 16C schematically depicts a perspective section view of the recoat assembly of FIG. 16B, according to one or more embodiments shown and described herein.

In some embodiments, the position of the cleaning member 270 can be adjusted with respect to the first roller 202 and/or the second roller 204. For example and referring to FIGS. 16B, 16C, and 16D, in some embodiments, the recoat assembly 200 includes a cleaning position adjustment assembly 500. In some embodiments, the cleaning position adjustment assembly 500 includes a first rotational member 510 and a second rotational member 520. As best shown in FIG. 16D, in some embodiments, the first rotational member 510 includes a first notched flange 512 and a first eccentric tube 514. The second rotational member 520 includes a second notched flange 522 and a second eccentric tube 524. In embodiments, the first eccentric tube 514 is insertable within the second eccentric tube 524, as shown in FIG. 16C. The cleaning position adjustment assembly 500 may further include a bearing 530 that is insertable within the first eccentric tube 514, and the cleaning member 270 is engaged with the bearing 530.

By rotating the first rotational member 510 and/or the second rotational member 520 with respect to one another, the position of the cleaning member 270 with respect to the base member 250, and accordingly the first roller 202 and the second roller 204, may be adjusted. For example, the position of the second rotational member 520 with respect to the base member 250 may be generally fixed. As the first rotational member 510 and the second rotational member 520 rotate with respect to one another, the eccentricity of the first eccentric tube 514 and the second eccentric tube 524 move the cleaning member 270 with respect to the base member 250, and accordingly with respect to the first roller 202 and the second roller 204. In this way, a user, such as a technician, can adjust the position of the cleaning member 270 with respect to the first roller 202 and the second roller 204. In some embodiments, the cleaning position adjustment assembly 500 further includes one or more pins 540 that are insertable into the base member 250 through notches of the first notched flange 512 and the second notched flange 522. The one or more pins 540 restrict rotational movement of the first rotational member 510 and the second rotational member 520 with respect to one another, and with respect to the base member 250. The one or more pins 540 may be positioned into the base member 250 through notches of the first notched flange 512 and the second notched flange 522, for example by a technician, once the cleaning member 270 is positioned as desired. In some embodiments, the first rotational member 510 and/or the second rotational member 520 may be rotated with respect to one another and/or retained in position by an actuator or the like.

Referring to FIGS. 17A-17C, top views and a side view of the cleaning member 270 engaged with the first and second rollers 202, 204 are schematically depicted. As shown in FIG. 17A, in some embodiments, such as embodiments in which the first roller 202 and the second roller 204 are offset from one another in the lateral direction (i.e., in the Y-direction as depicted), the cleaning member 270 may extend along the length of both the first roller 202 and the second roller 204 in the lateral direction. As shown in FIG. 17B, the cleaning member 270 may similarly extend along the length of both the first roller 202 and the second roller 204 in the lateral direction (i.e., in the Y-direction as depicted) in embodiments in which the first roller 202 and the second roller 204 are aligned with one another. In embodiments, as depicted in FIG. 17C, the cleaning member 270 is generally positioned above the first roller 202 and the second roller 204 in the vertical direction (i.e., in the Z-direction as depicted).

Figure 18A:
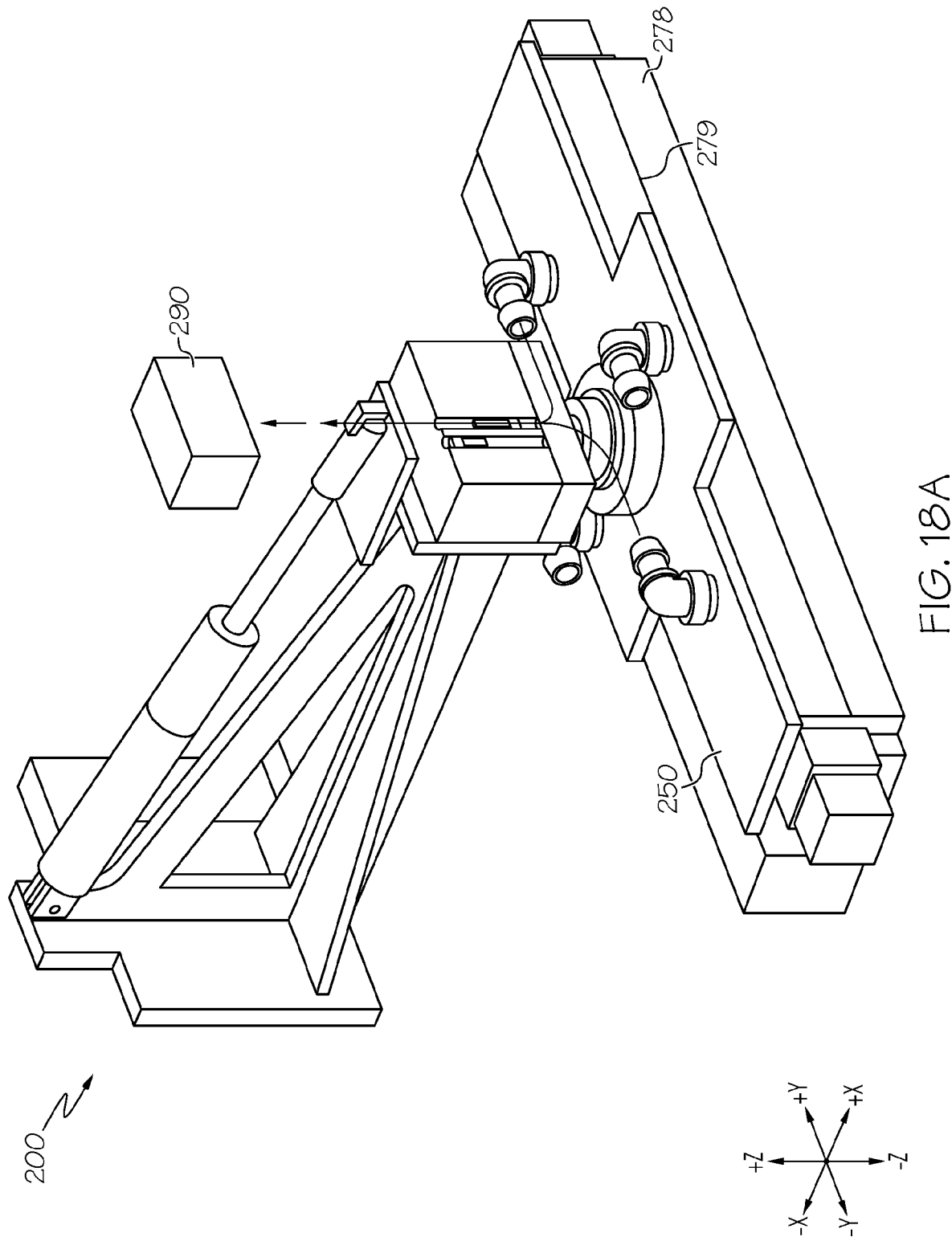
FIG. 18A schematically depicts a perspective view of a secondary containment housing and a vacuum of the recoat assembly of FIG. 3, according to one or more embodiments shown and described herein.
Figure 18B:
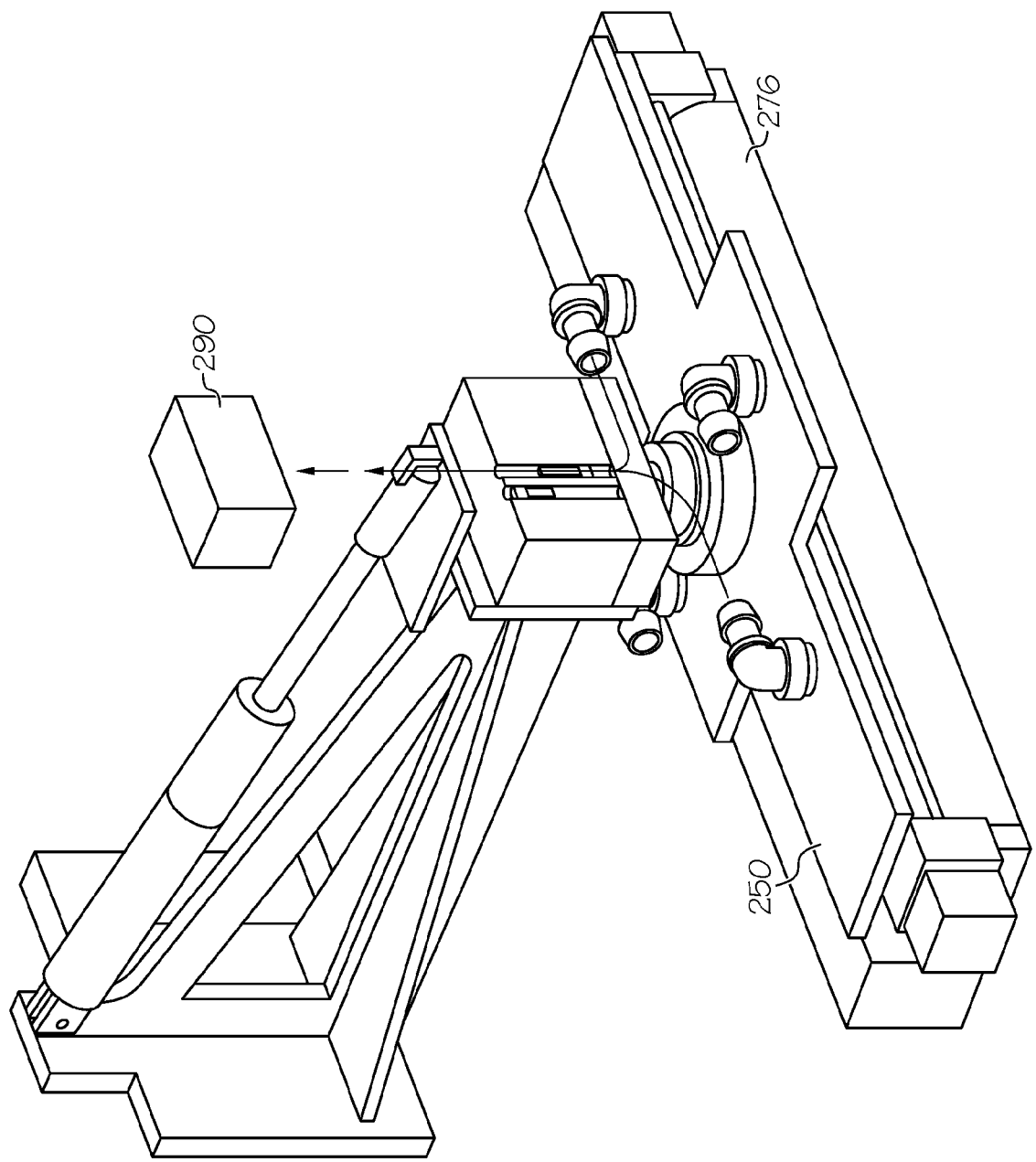
FIG. 18B schematically depicts a perspective view of a primary containment housing and a vacuum of the recoat assembly of FIG. 3, according to one or more embodiments shown and described herein.

Referring to FIGS. 11A, 18A, 18B, and 22 in some embodiments, the recoat assembly 200 is in fluid communication with a vacuum 290. In particular, in embodiments, the vacuum 290 is in fluid communication with at least a portion of the base member 250 of the recoat assembly 200. The vacuum 290 is generally operable to draw airborne build material 31 (FIG. 12) out of the recoat assembly 200 and/or control the flow of aerosolized build material 31 within the additive manufacturing system 100 (FIG. 2A). In particular, as the rollers 202, 204 (FIG. 19) fluidize build material 31 (FIG. 17C), some build material 31 will become airborne, unless controlled, may foul components of the additive manufacturing system 100. The vacuum 290, in embodiments, may include any suitable device for applying a negative and/or a positive pressure to the recoat assembly 200, such as a pump or the like. As depicted in FIG. 18A, the base member 250 generally includes a secondary containment housing 278. In some embodiments, the primary containment housing 276 and/or the secondary containment housing 278 may include one or more adjustable openings 279 that can be adjustably opened and closed to selectively restrict the flow of air and/or build material through the primary containment housing 276 and/or the secondary containment housing 278. For example and as shown in FIGS. 11A and 23, the primary containment housing includes a first adjustable opening 279 and a second adjustable opening 279'. The recoat assembly 200 may further include a first movable cover 269 that can selectively cover the first adjustable opening 279. For example, the first moveable cover 269 may be movable in the Z-direction as depicted to selectively widen or narrow the first adjustable opening 279 (evaluated in the Z-direction as depicted). Similarly, the recoat assembly 200 may include a second movable cover 269' that can selectively cover the second adjustable opening 279'. For example, the second moveable cover 269' may be movable in the Z-direction as depicted to selectively widen or narrow the second adjustable opening 279' (evaluated in the Z-direction as depicted) independently of the first adjustable opening 279. By widening or narrowing the first and/or second adjustable openings 279, 279', airflow into the primary containment housing 276 can be tuned as desired to direct flow of airborne build material 31. FIG. 18B shows the base member 250 with the secondary containment housing 278 removed, and depicts a primary containment housing 276 of the base member 250.

Without being bound by theory, airborne build material 31 may include particles that are smaller than the average particle size of the build material 31 that does not become airborne. Accordingly, by drawing airborne build material 31 of smaller size out of the recoat assembly 200, the mean particle size of the build material 31 in the supply receptacle 134 (FIG. 2A) and/or the build area 124 (FIGS. 2A, 2B) may increase. Accordingly, in some embodiments, build material 31 including smaller particles, such as the build material 31 drawn from the recoat assembly 200, may be periodically re-introduced to the supply receptacle 134 (FIG. 2A) and/or the build material hopper 360 (FIG. 2A) to maintain a relatively consistent particle size of the build material 31.

Figure 19:
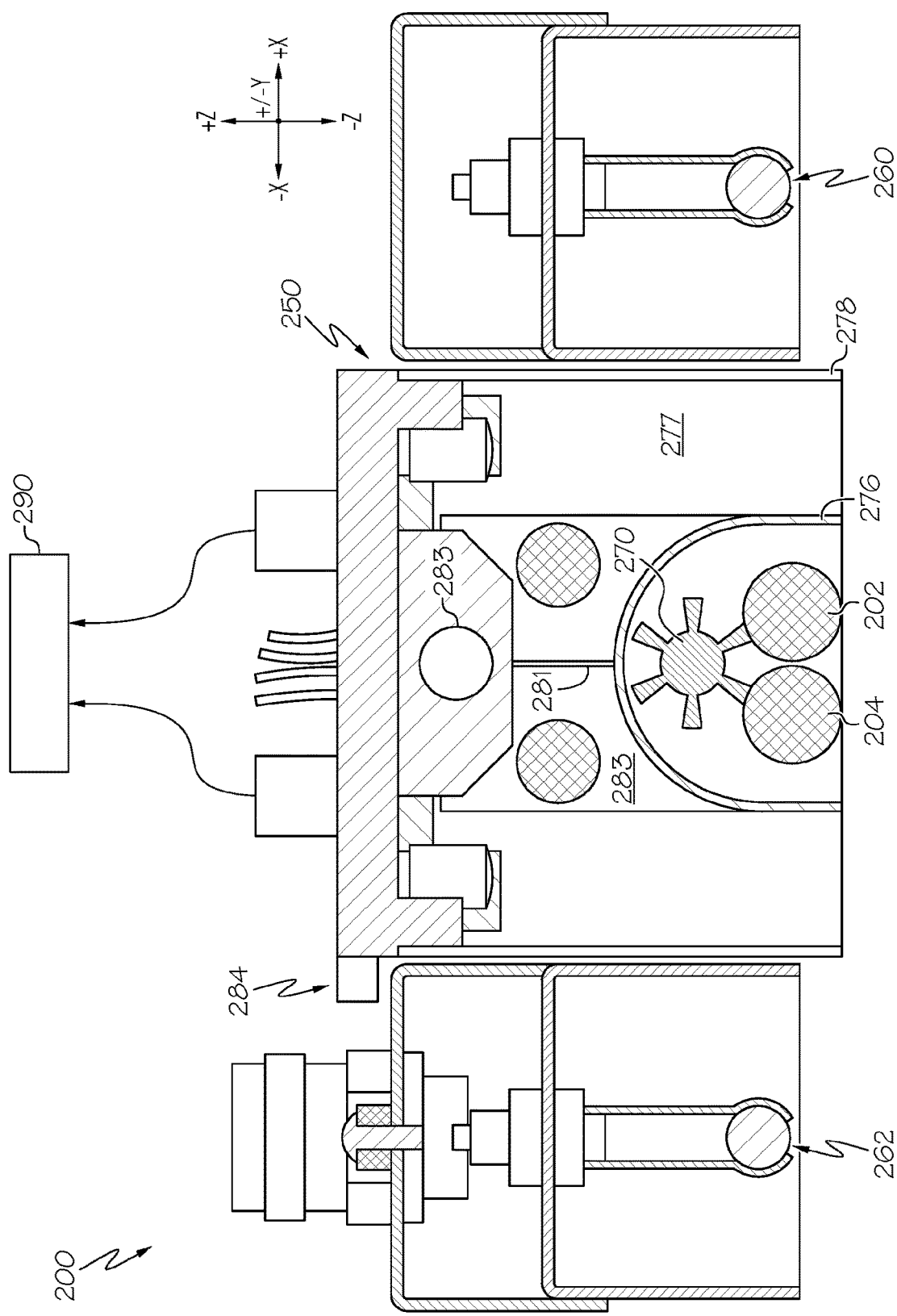
FIG. 19 schematically depicts a section view of the vacuum and the recoat assembly of FIG. 3, according to one or more embodiments shown and described herein.

Referring to FIG. 19, a section view of the base member 250 is depicted. In embodiments, the primary containment housing 276 at least partially encapsulates the powder spreading member (e.g., the first and second rollers 202, 204 and/or the powder engaging member 255 (FIG. 12)). The secondary containment housing 278 is spaced apart from the primary containment housing 276 and at least partially encapsulates the primary containment housing 276. The primary containment housing 276 and the secondary containment housing 278 generally define an intermediate cavity 277 that is disposed between the primary containment housing 276 and the secondary containment housing 278. In embodiments, the vacuum 290 is in fluid communication with the intermediate cavity 277, and is operable to draw airborne build material 31 from the intermediate cavity 277. In some embodiments, the intermediate cavity 277 is a forward intermediate cavity 277, and the secondary containment housing 278 and the primary containment housing 276 define a rear intermediate cavity 283 separated from the forward intermediate cavity 277 by a bulkhead 281. By separating the forward intermediate cavity 277 and the rear intermediate cavity 283, different vacuum pressures may be applied to the forward intermediate cavity 277 and the rear intermediate cavity 283. For example, the rear intermediate cavity 283 may pass over generally settled build material 31, and accordingly, it may be desirable to apply less vacuum pressure at the rear intermediate cavity 283 to avoid disturbing the settled build material 31.

Figure 20:
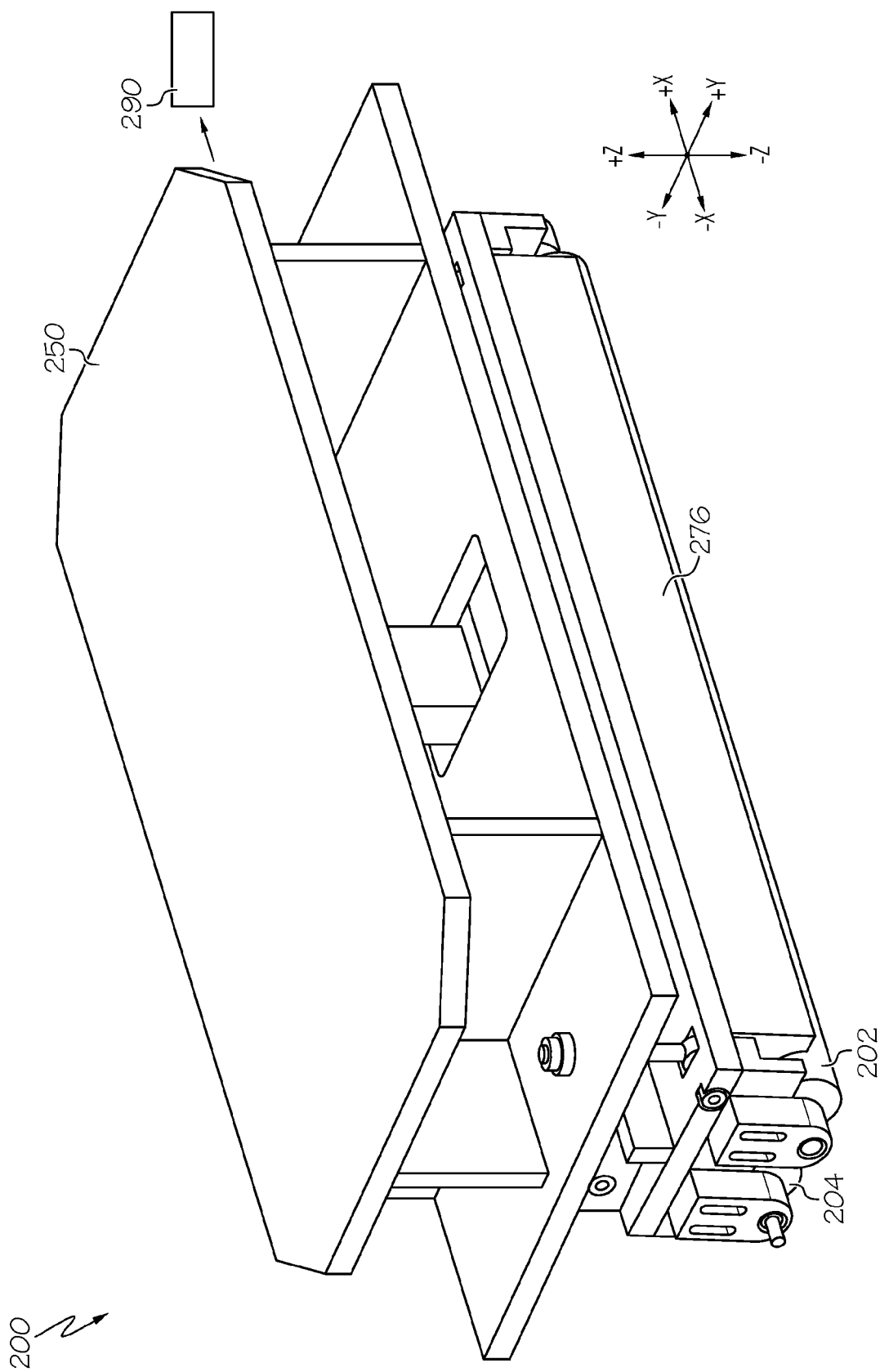
FIG. 20 schematically depicts a perspective view of another recoat assembly, according to one or more embodiments shown and described herein.
Figure 21:
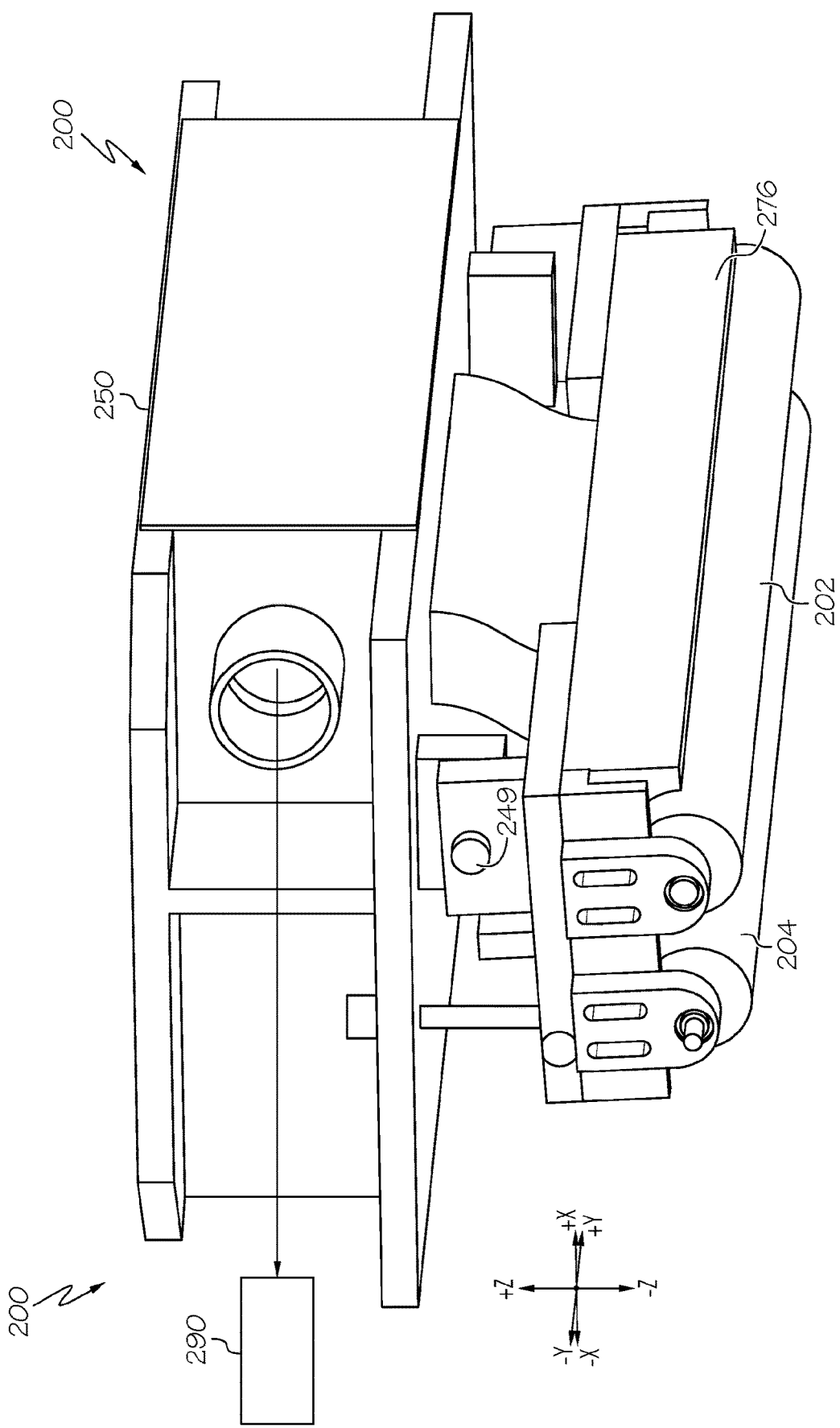
FIG. 21 schematically depicts another perspective view of the recoat assembly of FIG. 20, according to one or more embodiments shown and described herein.

In some embodiments, the recoat assembly 200 further includes an agitation device 284 coupled to the base member 250. The agitation device 284 is operable to vibrate components of the recoat assembly 200, such as the base member 250, the first roller 202, and/or the second roller 204 to dislodge build material 31 (FIG. 12) that may be attached to the base member 250 and/or the first roller 202 and the second roller 204. Referring to FIGS. 20 and 21, in some embodiments the base member 250 may include only the primary containment housing 276 at least partially enclosing the powder spreading member (e.g., the first roller 202 and/or the second roller 204). In these embodiments, the vacuum 290 is in fluid communication with the primary containment housing 276.

Figure 22:
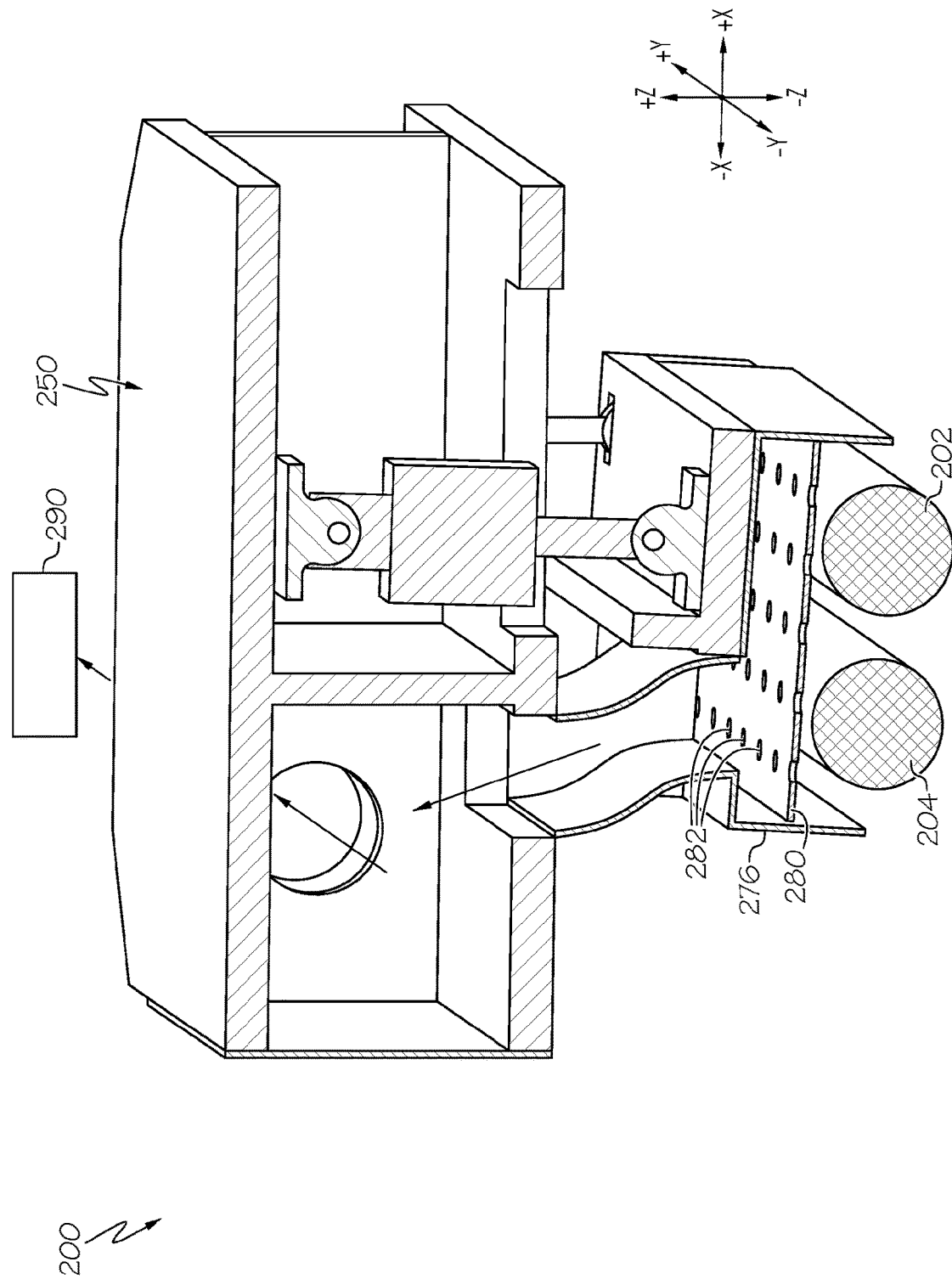
FIG. 22 schematically depicts a section view of the recoat assembly of FIG. 20, according to one or more embodiments shown and described herein.
Figure 23:
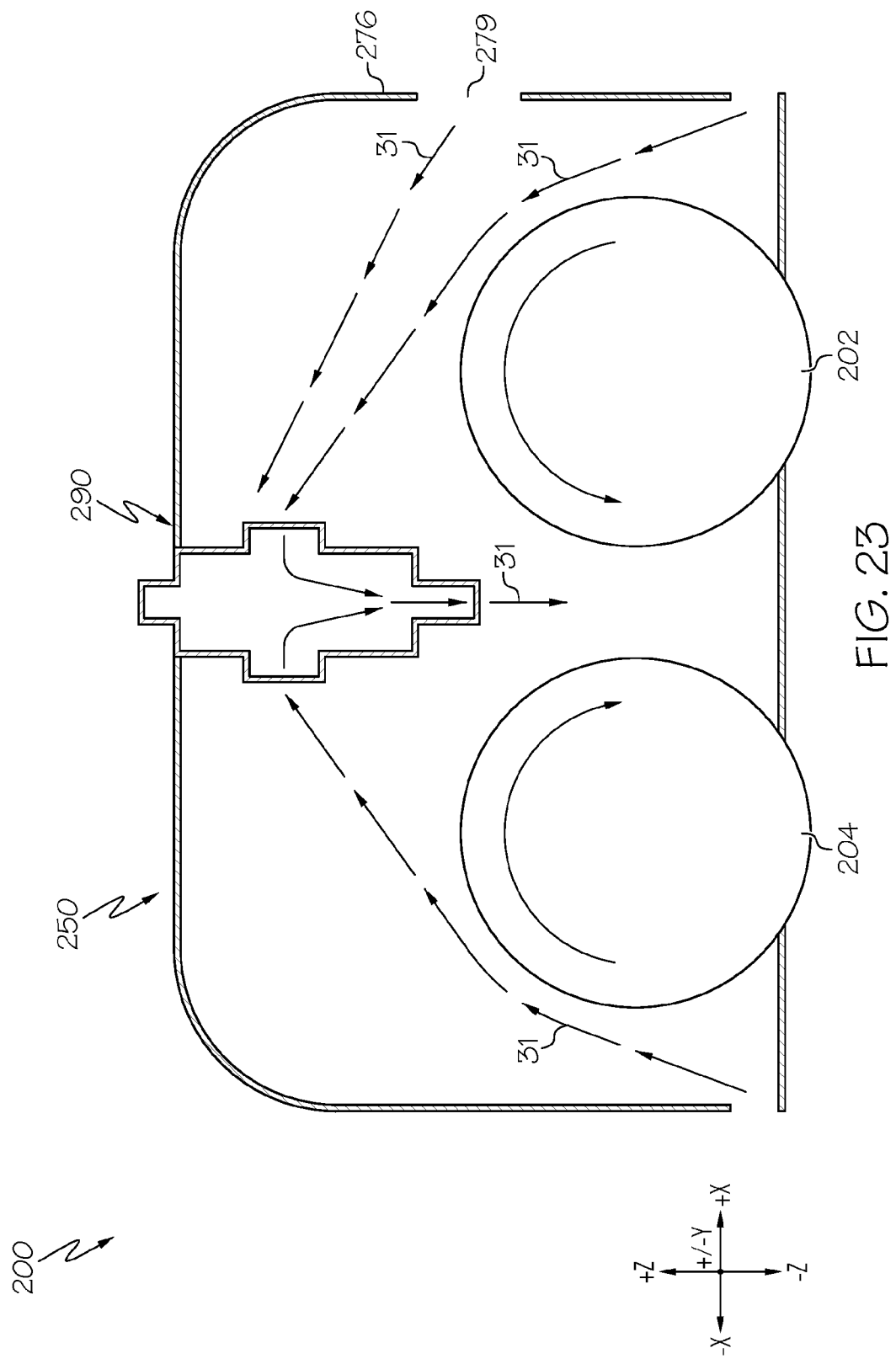
FIG. 23 schematically depicts another section view of a recoat assembly, according to one or more embodiments shown and described herein.

Referring to FIG. 22, a section view of the base member 250 is schematically depicted. As shown in FIG. 22, the vacuum 290 is in fluid communication with the primary containment housing 276, and generally operates to draw airborne build material 31 (FIG. 12). In some embodiments, the recoat assembly 200 includes a diffuser plate 280 positioned between the vacuum 290 and the powder spreading member (e.g., the first roller 202 and/or the second roller 204). The diffuser plate 280 generally includes a plurality of apertures 282 extending therethrough. The diffuser plate 280 may generally assist in distributing the negative pressure applied to the primary containment housing 276 by the vacuum 290.

Referring to FIG. 23, in some embodiments, the vacuum 290 is operable to draw airborne build material 31 from the recoat assembly 200, and is further operable to direct the collected build material 31 beneath the recoat assembly 200 in the vertical direction (i.e., in the Z-direction as depicted). In the embodiment depicted in FIG. 23, the vacuum 290 is positioned within the primary containment housing 276 and is positioned between the first roller 202 and the second roller 204. The vacuum 290 generally acts to draw in and collect airborne build material 31 and subsequently deposit the collected build material 31 below the recoat assembly 200. In the embodiment depicted in FIG. 23, the vacuum 290 is positioned between the first roller 202 and the second roller 204, and the vacuum 290 deposits the collected build material 31 between the first roller 202 and the second roller 204. In some embodiments, the vacuum 290 may be positioned outside of the recoat assembly 200 and may redeposit the collected build material 31 at any suitable location beneath the recoat assembly 200.

Figure 24:
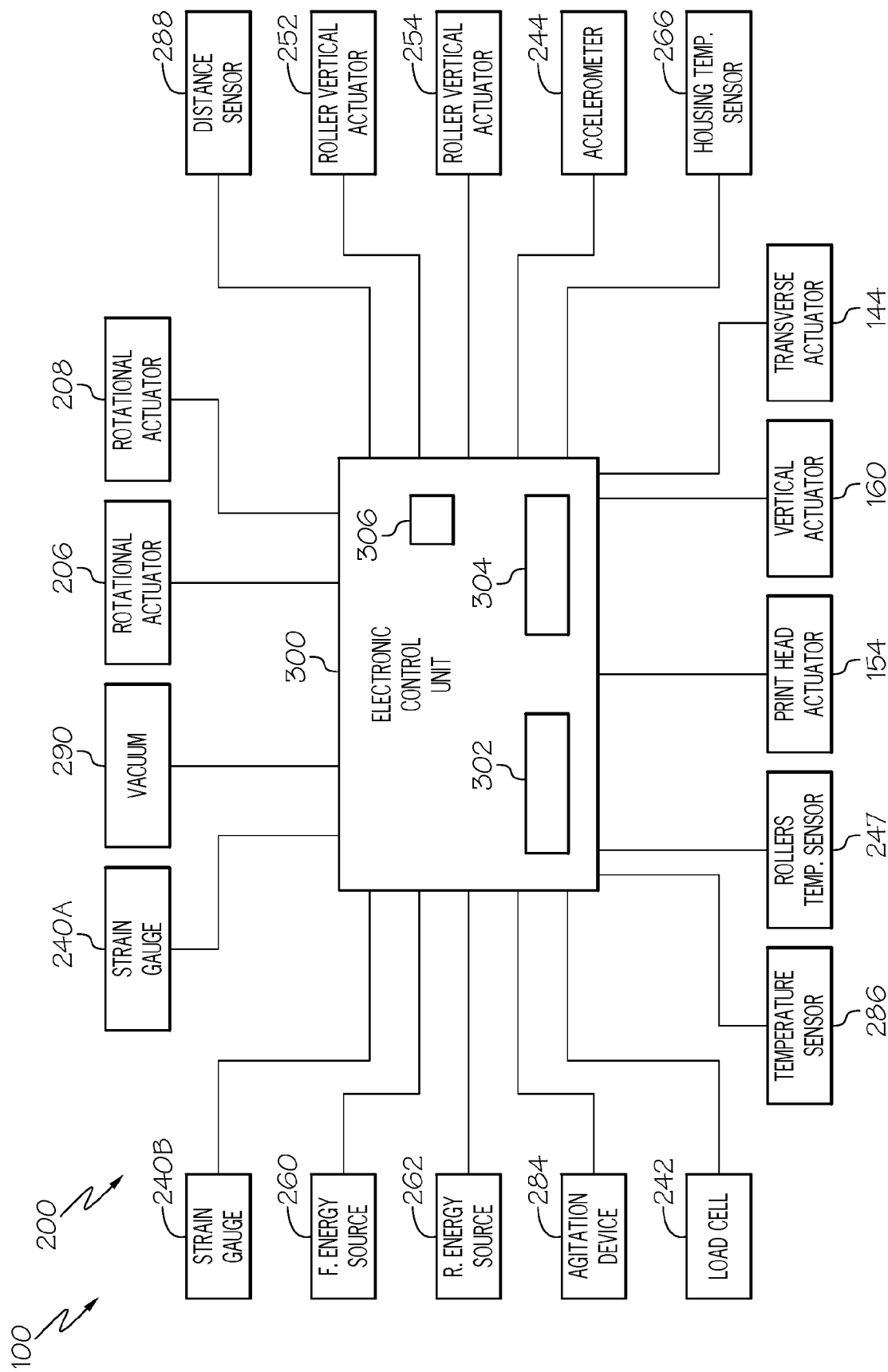
FIG. 24 schematically depicts a control diagram of the additive manufacturing system according to one or more embodiments shown and described herein.

Referring to FIG. 24, a control diagram for the additive manufacturing system 100 is schematically depicted. In embodiments, the strain gauges 240A, 240B, the load cell 242, and the accelerometer 244 are communicatively coupled to an electronic control unit 300. The first and second rotational actuators 206, 208, the recoat assembly transverse actuator 144, the recoat assembly vertical actuator 160, and the print head actuator 154 are communicatively coupled to the electronic control unit 300, in embodiments. The electronic control unit 300 is also communicatively coupled to the roller vertical actuators 252, 254, the front and rear energy source 260, 262, the agitation device 284, the one or more housing temperature sensors 266, and the vacuum 290. In some embodiments, a temperature sensor 286 and a distance sensor 288, and the roller support temperature sensor 247 are also communicatively coupled to the electronic control unit 300 as shown in FIG. 24.

In some embodiments, the electronic control unit 300 includes a current sensor 306. The current sensor 306 generally senses a current driving the recoat assembly transverse actuator 144, the first rotational actuator 206, the second rotational actuator 208, the vertical actuator 160, and/or the print head actuator 154. In embodiments in which the recoat assembly transverse actuator 144, the first rotational actuator 206, the second rotational actuator 208, the vertical actuator 160, and/or the print head actuator 154 are electrically actuated, the current sensor 306 senses current driving the recoat assembly transverse actuator 144, the first rotational actuator 206, the second rotational actuator 208, the vertical actuator 160, and/or the print head actuator 154. While in the embodiment depicted in FIG. 24, the current sensor 306 is depicted as being a component of the electronic control unit 300, it should be understood that the current sensor 306 may be a separate component communicatively coupled to the electronic control unit 300. Furthermore, while in the embodiment depicted in FIG. 24, a single current sensor 306 is depicted, it should be understood that the additive manufacturing system 100 may include any suitable number of current sensors 306 associated with the recoat assembly transverse actuator 144, the first rotational actuator 206, the second rotational actuator 208, the vertical actuator 160, and/or the print head actuator 154.

In embodiments, the electronic control unit 300 generally includes a processor 302 and a memory component 304. The memory component 304 may be configured as volatile and/or nonvolatile memory, and as such may include random access memory (including SRAM, DRAM, and/or other types of RAM), flash memory, secure digital (SD) memory, registers, compact discs (CD), digital versatile discs (DVD), bernoulli cartridges, and/or other types of non-transitory computer-readable mediums. The processor 302 may include any processing component operable to receive and execute instructions (such as from the memory component 304). In embodiments, the electronic control unit 300 may store one or more operating parameters for operating the additive manufacturing system 100, as described in greater detail herein.

Methods for operating the recoat assembly 200 will now be described with reference to the appended drawings.

Figure 25:
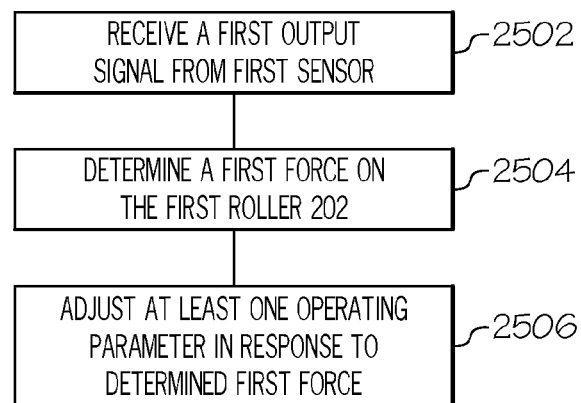
FIG. 25 is a flowchart for adjusting an operating parameter of the additive manufacturing system, according to one or more embodiments shown and described herein.

Referring collectively to FIGS. 24 and 25, an example method of operating the recoat assembly 200 is schematically depicted. In a first step 2502, the electronic control unit 300 receives a first output signal of a first sensor. In embodiments, the first sensor is mechanically coupled to and in contact with the first roller support 210 (FIG. 6B), and may include any of the first strain gauge 240A, the second strain gauge 240B, the load cell 242, and/or the accelerometer 244. The first sensor, in embodiments, outputs the first output signal, which is indicative of a first force incident on the first roller 202 (FIG. 6B). In a second step 2504, the electronic control unit 300 determines the first force on the first roller 202 (FIG. 6B) based on the first output signal of the first sensor. At step 2506, the electronic control unit 300 adjusts at least one operating parameter of the additive manufacturing system 100 (FIG. 2A) in response to the determined first force.

As noted above, in embodiments, the electronic control unit 300 may include one or more parameters for operating the additive manufacturing system 100 (FIG. 2A). By adjusting at least one operating parameter in response to determined forces acting on the first roller 202 (FIG. 6B), the electronic control unit 300 may actively adjust operation of the additive manufacturing system 100. As one example, in embodiments, the at least one parameter of the additive manufacturing system 100 (FIG. 2A) includes a speed with which the recoat assembly transverse actuator 144 moves the recoat assembly 200 (FIG. 2A) relative to the build area 124 (FIGS. 2A, 2B). In embodiments, upon determining a force acting on the first roller 202 below a configurable threshold, the electronic control unit 300 may direct the recoat assembly transverse actuator 144 to increase the speed at which the recoat assembly 200 (FIG. 2A) moves relative to the build area 124 (FIGS. 2A, 2B). For example, the determination of comparatively low force or forces acting on the first roller 202 may be indicative that the speed at which the recoat assembly 200 (FIG. 2A) is moved may be increased without detrimentally affecting the first roller 202. By contrast, upon detecting a force acting on the first roller 202 exceeding a configurable threshold, the electronic control unit 300 may direct the recoat assembly transverse actuator 144 to decrease the speed at which the recoat assembly 200 (FIG. 2A) moves relative to the build area 124 (FIGS. 2A, 2B). For example, the determination of comparatively high force or forces acting on the first roller 202 may be indicative that the speed at which the recoat assembly 200 (FIG. 2A) should be decreased to reduce the forces acting on the first roller 202.

In some embodiments, the at least one parameter is a height of the first roller 202 (FIG. 6B) evaluated in the vertical direction (e.g., in the Z-direction as depicted in FIG. 6B). In embodiments, upon determining a force acting on the first roller 202 below a configurable threshold, the electronic control unit 300 may direct the vertical actuator 160 to lower the recoat assembly 200 relative to the build area 124 (FIGS. 2A, 2B). For example, the determination of comparatively low force or forces acting on the first roller 202 may be indicative that the height at which the recoat assembly 200 (FIG. 2A) may be lowered to engage an additional volume of build material 31 (FIG. 2A). By contrast, upon detecting a force acting on the first roller 202 exceeding a configurable threshold, the electronic control unit 300 may direct the vertical actuator 160 to raise the recoat assembly 200 relative to the build area 124 (FIGS. 2A, 2B). For example, the determination of comparatively high force or forces acting on the first roller 202 may be indicative that the first roller 202 should be raised so as to engage a reduced volume of build material 31 (FIG. 2A).

In some embodiments, the at least one parameter of the additive manufacturing system 100 comprises a speed at which the print head actuator 154 moves the print head 150 (FIG. 2A). In embodiments, upon determining a force acting on the first roller 202 below a configurable threshold, the electronic control unit 300 may direct the print head actuator 154 to increase the speed at which the print head actuator 154 moves the print head 150 (FIG. 2A) relative to the build area 124 (FIGS. 2A, 2B). For example, the determination of comparatively low force or forces acting on the first roller 202 may be indicative that the speed at which first roller 202 (FIG. 2A) moves with respect to the build area 124 (FIGS. 2A, 2B) may be increased, and the speed at which the print head actuator 154 moves the print head 150 may be similarly increased, and/or a volume of binder 50 (FIG. 1A) can be increased. By contrast, upon detecting a force acting on the first roller 202 exceeding a configurable threshold, the electronic control unit 300 may direct the print head actuator 154 to decrease the speed at which the print head 150 (FIG. 2A) moves with respect to the build area 124 (FIGS. 2A, 2B). For example, the determination of comparatively high force or forces acting on the first roller 202 may be indicative that the speed at which first roller 202 (FIG. 2A) moves with respect to the build area 124 (FIGS. 2A, 2B) should be decreased, and the speed at which the print head actuator 154 moves the print head 150 should similarly be decreased, and/or a volume of binder 50 (FIG. 1A) can be decreased.

In some embodiments, the electronic control unit 300 is configured to adjust the at least one operating parameter of the additive manufacturing system 100 based on sensed current from the current sensor 306. For example, in embodiments, the current sensor 306 may detect current from the first rotational actuator 206 and/or the second rotational actuator 208. Detection of a current below a configurable threshold may be generally indicative of relatively low forces acting on the first roller 202 and/or the second roller 204. By contrast, detection of a current above a configurable threshold may be generally indicative of relatively high forces acting on the first roller 202 and/or the second roller 204. In some embodiments, the current sensor 306 may sense a current driving the transverse actuator 144 that moves the recoat assembly 200 relative to the build area 124. Similar to the first and second rotational actuators 206, 208, detection of a current below a configurable threshold may be generally indicative of relatively low forces acting on the first roller 202 and/or the second roller 204. By contrast, detection of a current above a configurable threshold may be generally indicative of relatively high forces acting on the first roller 202 and/or the second roller 204.

Referring to FIGS. 2A, 2B, 24, and 26, another method for adjusting at least one operating parameter of the additive manufacturing system 100 is depicted. In a first step 2602, the method comprises distributing a layer of a build material 31 on the build area with the recoat assembly 200. In a second step 2604, the method comprises receiving a first output signal from a first sensor as the layer of the build material 31 is distributed on the build area 124 with the recoat assembly 200. As described above, in embodiments, the first sensor is mechanically coupled to and in contact with the first roller support 210 (FIG. 6B), and may include any of the first strain gauge 240A, the load cell 242, and/or the accelerometer 244. The first sensor, in embodiments, outputs the first output signal, which is indicative of a first force incident on the first roller 202 (FIG. 6B).

At step 2604, the method comprises determining the first force on the first roller 202 based on the first output signal of the first sensor). In some embodiments, a lookup table containing expected force or pressure information may be previously generated, such as based on calibration force measurements generated under various conditions (e.g., size of build area coated with binder, recoat traverse speed, recoat roller rotation speed, recoat roller direction, layer thickness, recoat roller geometry coating, and the like). In some embodiments, information related to a current layer of the object being built and/or a prior layer may be utilized to generate an expected force or pressure curve to be experienced as the recoat assembly 200 traverses the build area 124. In some embodiments, a geometry of the current layer of the object being built or a geometry of the immediately preceding layer that was built may be used to determine an expected pressure or force profile (e.g., shear forces expected to be experienced as the recoat assembly 200 traverses the build area 124 to distribute material for the current layer, normal forces expected to be experienced as the recoat assembly 200 traverses the build area 124 to distribute material for the current layer and/or any other type of expected force to be experienced as the recoat assembly 200 traverses the build area 124 to distribute material for the current layer), a comparison between the expected pressure or measured force profile and the measured force or pressure may be made, and an action may be taken in response to the comparison.

At step 2608, the method comprises adjusting the at least one operating parameter of the additive manufacturing system 100 in response to the determined first force. For example, in some embodiments, the at least one operating parameter of the additive manufacturing system 100 is adjusted based on a comparison of an expected force on the first roller 202 to the first force on the first roller 202 determined based on the first output signal of the first sensor. In embodiments, when a deviation beyond a given threshold is determined to have occurred, a corrective action may be taken, such as to adjust a recoat traverse speed for the current layer, adjust a roller rotation speed for the current layer, adjust a recoat traverse speed for one or more subsequent layers, adjust a roller rotation speed for one or more subsequent layers, adjust a height of one or more rollers for the current layer and/or for one or more subsequent layers, etc.

In some embodiments, when an expected pressure or force deviates from a measured pressure or force during spreading of material for a current layer by the recoat assembly 200, the layer recoat process may be determined to be defective. The extent of force deviation may be used to determine a type of defect (e.g., a powder defect, a recoat roller defect, insufficient binder cure, a jetting defect, or the like.

In embodiments, each of steps 2602-2608 may be performed, for example, by the electronic control unit 300. As noted above, in embodiments, the electronic control unit 300 may include one or more parameters for operating the additive manufacturing system 100. By adjusting at least one operating parameter in response to determined forces acting on the first roller 202 (FIG. 6B), the electronic control unit 300 may actively adjust operation of the additive manufacturing system 100. As one example, in embodiments, the at least one parameter of the additive manufacturing system 100 includes a speed with which the recoat assembly transverse actuator 144 moves the recoat assembly 200 relative to the build area 124, as outlined above.

In some embodiments, the at least one parameter is a speed of rotation of the first rotational actuator 206. In embodiments, upon determining a force acting on the first roller 202 below a configurable threshold, the electronic control unit 300 may direct the first rotational actuator 206 to decrease the speed at which the first rotational actuator 206 rotates the first roller 202. For example, the determination of comparatively low force or forces acting on the first roller 202 may be indicative that the speed at which the first rotational actuator 206 may be reduced while still being sufficient to fluidize the build material 31. By contrast, upon detecting a force acting on the first roller 202 exceeding a configurable threshold, the electronic control unit 300 may direct may direct the first rotational actuator 206 to increase the speed at which the first rotational actuator 206 rotates the first roller 202. For example, the determination of comparatively high force or forces acting on the first roller 202 may be indicative that the speed at which the first rotational actuator 206 is rotating the first roller 202 is insufficient to fluidize the build material 31 as desired.

In some embodiments, the at least one parameter is a target thickness of a subsequent layer of build material 31 and/or the layer of build material 31 being distributed. In embodiments, upon determining a force acting on the first roller 202 below a configurable threshold, the electronic control unit 300 may direct the recoat assembly 200 to increase a target thickness of a subsequent layer of build material 31, for example by changing the height of the recoat assembly 200. For example, the determination of comparatively low force or forces acting on the first roller 202 may be indicative that the thickness of the layer of build material 31 distributed by the recoat assembly 200 may be increased. By contrast, upon detecting a force acting on the first roller 202 exceeding a configurable threshold, the electronic control unit 300 may direct the recoat assembly 200 to decrease a target thickness of a subsequent layer of build material 31, for example by changing the height of the recoat assembly 200. For example, the determination of comparatively high force or forces acting on the first roller 202 may be indicative that the thickness of the layer of build material 31 distributed by the recoat assembly 200 should be decreased.

Figure 26:
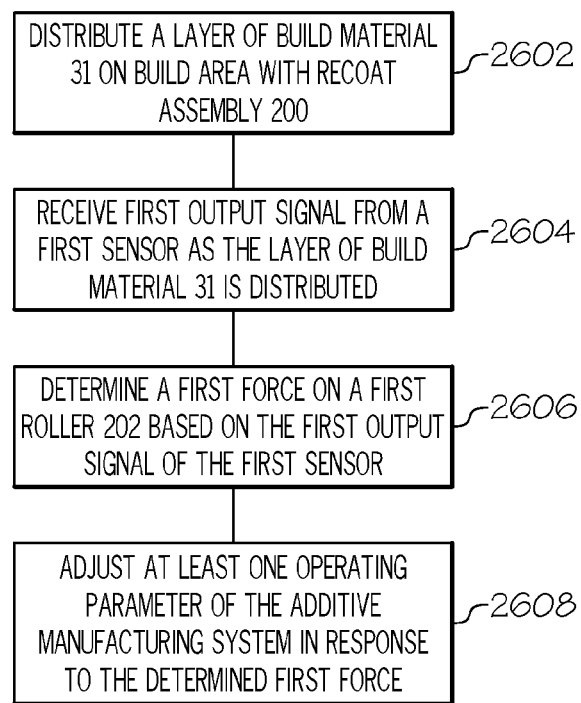
FIG. 26 is another flowchart for adjusting an operating parameter of the additive manufacturing system, according to one or more embodiments shown and described herein.

In some embodiments, the method illustrated in FIG. 26 further comprises determining a type of defect. For example, in some embodiments, a type of defect may be determined based on a comparison of an expected force on the first roller 202 and the first force on the first roller 202. For example, a defect in the build material 31 may be associated with a particular amount of force applied to the first roller 202, while a defect in the first roller 202 may be associated with a different amount of force applied to the first roller 202. Accordingly, the amount of force applied to the first roller 202 may be utilized to determine a type of defect within the additive manufacturing system 100.

In embodiments, the adjustment of the at least one operating parameter of the additive manufacturing system 100 can be implemented at one or more times during a build cycle. For example, in embodiments, the at least one operating parameter may be adjusted while the layer of build material 31 is being distributed by the recoat assembly 200. In some embodiments, the at least one operating parameter of the additive manufacturing system 100 is adjusted when a next layer of build material 31 is distributed by the recoat assembly 200.

In some embodiments, a wear parameter may be determined based on the determined first force. For example, as the first roller 202 wears, for example through repeated contact with the build material 31, the diameter of the first roller 202 may generally decrease. The decreased diameter of the first roller 202 may generally lead to lower forces on the first roller 202 as the first roller 202 distributes build material 31.

In some embodiments, wear on other components of the recoat assembly 200 may be determined based on the determined first force. For example, the first roller 202 may be coupled to the base member 250 (FIG. 3) via one or more bearings, or the like. Additionally and as noted above, the first roller 202 may be coupled to the first rotational actuator 206 (FIG. 3) through a belt, a chain, or the like. Wear on the one or more bearings and/or the belt, chain, or the like may generally lead to increased forces on the first roller 202. In some embodiments, the increased forces on the first roller 202 may be determined by the current sensor 306.

In some embodiments, the method depicted in FIG. 26 further includes receiving a second output signal from a second sensor mechanically coupled to and in contact with the second roller support 212. In embodiments, the second sensor may include any of the first strain gauge 240A, the second strain gauge 240B, the load cell 242, and/or the accelerometer 244. In embodiments, the method further includes receiving the second output signal from the second sensor as the layer of the build material 31 is distributed on the build area 124 with the recoat assembly 200 and determining the first force on the first roller 202 based on the first output signal of the first sensor and the second output signal of the second sensor.

In some embodiments, the method depicted in FIG. 26 further includes receiving a third output signal from a third sensor mechanically coupled to and in contact with the third roller support 216. In embodiments, the third sensor may include any of the include any of the first strain gauge 240A, the second strain gauge 240B, the load cell 242, and/or the accelerometer 244. In embodiments, the method further includes receiving the third output signal from the third sensor as the layer of the build material 31 is distributed on the build area 124 with the recoat assembly 200 and determining a second force on the second roller 204 based on the third output signal of the third sensor. In some embodiments, the method further includes adjusting the at least one operating parameter in response to the determined first force and the determined second force. In this way, the at least one operating parameter may be adjusted based on determined forces acting on both the first roller 202 and the second roller 204. For example a detection of a deceleration of the first roller 202 and/or the second roller 204 above a configurable threshold may be indicative of a collision of the recoat assembly 200 with an object, such as a foreign object within the additive manufacturing system 100. By detecting a collision, operation of the additive manufacturing system 100 may be halted to prevent further damage to the additive manufacturing system 100, and/or provide an indication to a user that maintenance is necessary.

In some embodiments, the method depicted in FIG. 26 further includes determining a collision of the recoat assembly 200. For example, in some embodiments, the method further includes determining a roller collision event based on an output of the at least one accelerometer 244, an adjusting the at least one operating parameter when the roller collision event is determined to have occurred.

Figure 27:
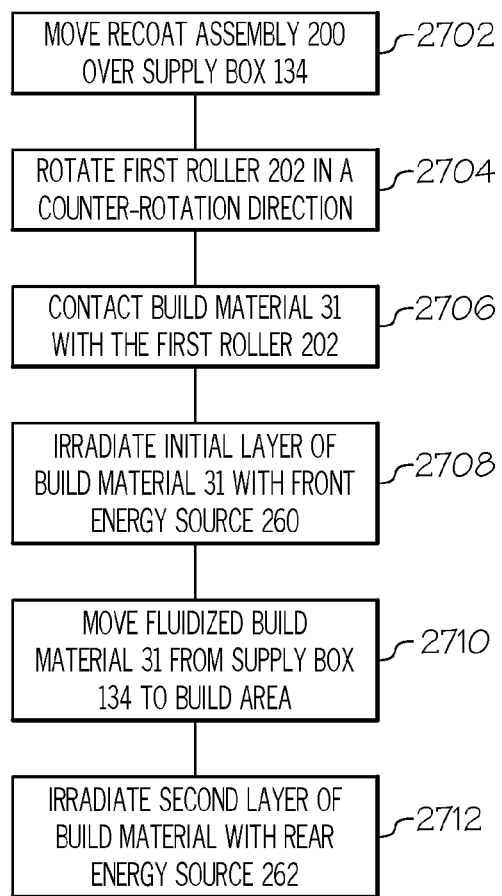
FIG. 27 is a flowchart for moving build material to a build area, according to one or more embodiments shown and described herein.

Referring to FIGS. 24, 27, and 28, a method for forming an object is schematically depicted. In a first step 2702, the method comprises moving the recoat assembly 200 over the supply receptacle 134 in a coating direction, as indicated by arrow 40. The supply receptacle 134 comprises build material 31 positioned within the supply receptacle 134, and the recoat assembly 200 comprises a first roller 202 and a second roller 204 that is spaced apart from the first roller 202. As noted above, in some embodiments, the recoat assembly 200 may include only a single roller. In a second step 2704, the method comprises rotating the first roller 202 of the recoat assembly 200 in a counter-rotation direction 60, such that a bottom of the first roller 202 moves in the coating direction 40. In the embodiment depicted in FIG. 28, the counter-rotation direction 60 is shown as the clockwise direction. In a third step 2706, the method comprises contacting the build material 31 with the first roller 202 of the recoat assembly 200, thereby fluidizing at least a portion of the build material 31. At step 2708, the method comprises irradiating, with the front energy source 260, an initial layer of build material 31 positioned in the build area 124 spaced apart from the supply receptacle 134. As noted above, irradiating the initial layer of build material 31 may bind the build material 31 to binder 50 positioned in the build area 124. Subsequent to step 2708, at step 2710, the method comprises moving the fluidized build material 31 from the supply receptacle 134 to the build area 124 with the first roller 202, thereby depositing a second layer of the build material 31 over the initial layer of build material 31 within the build area 124. Subsequent to step 2710, at step 2712, the method comprises irradiating, with the rear energy source 262, the second layer of build material 31 within the build area 124. In some embodiments, steps 2708-2712 may occur within a predetermined cycle time. For example, in some embodiments, steps 2708-2712 may be performed within a range between 5 seconds and 20 seconds.

While the method described above includes moving the recoat assembly 200 over a supply receptacle 134, it should be understood that in some embodiments a supply receptacle 134 is not provided, and instead build material 31 may be placed on the build area 124 through other devices, such as the build material hopper 360 (FIG. 2B).

In embodiments, the electronic control unit 300 may direct various components of the additive manufacturing system 100 to perform steps 2702-2712. In embodiments, by irradiating the initial layer of build material 31, the front energy source 260 may act to cure binder 50 positioned on the build material 31 of the build area 124. By irradiating the second layer of build material 31, the rear energy source 262 may generally act to pre-heat the build material 31, and/or further cure the binder material 50.

By irradiating the build material 31 with a front energy source 260 that is separate from a rear energy source 262, the intensity of energy emitted by the recoat assembly 200 may be distributed, as compared to recoat assemblies including a single energy source, which may reduce defects in the binder 50 and/or the build material 31. More particularly, the thermal power density of a single energy source heating system can quickly reach a limit due to space and cost constraints. Excessive power output in a single energy source heating system can be detrimental to the quality of the cure of the binder 50 in each layer of build material 31, as large spikes in temperature may induce stress and cracks in the relatively weak parts and can cause uncontrolled evaporation of solvents within the binder 50. By including the front energy source 260 and the rear energy source 262, the thermal power intensity of the recoat assembly 200 may be distributed. In particular and as noted above, including multiple energy sources (e.g., the front energy source 260 and the rear energy source 262), energy can be applied to build material 31 (FIG. 1A) over a comparatively longer period of time as compared to the application of energy via a single energy source. In this way, over-cure of build material 31 bound by cured binder 50 can be minimized.

Furthermore, because the recoat assembly 200 includes the front energy source 260 and the rear energy source 262, operation of the recoat assembly 200 may be maintained in the case of failure of the front energy source 260 or the rear energy source 262. In particular, by providing multiple energy sources (e.g., the front energy source 260 and the rear energy source 262 and/or other additional energy sources), in the case of failure of one of the energy sources, the other energy source may continue to be utilized, so that the recoat assembly 200 may continue to operate, thereby reducing downtime of the recoat assembly 200.

The first roller 204, in embodiments, is rotated at a rotational speed sufficient to fluidize at least a portion of the build material 31. In some embodiments, the first roller 204 is rotated at a rotational speed of at least 2.5 meters per second. In some embodiments, the first roller 204 is rotated at a rotational speed of at least 2 meters per second. In some embodiments, the first roller 204 is rotated at a rotational speed of at least 1 meter per second.

In some embodiments, the operation of the front energy source 260 and/or the rear energy source 262 may be controlled and modified. In embodiments, the front energy source 260 and/or the rear energy source 262 may be communicatively coupled to the electronic control unit 300 through one or more relays, such as solid state relays, that facilitate control of the front energy source 260 and/or the rear energy source 262.

In some embodiments, the additive manufacturing system 100 may include a temperature sensor 286 communicatively coupled to the electronic control unit 300. The temperature sensor 286 may include any contact or non-contact sensor suitable for detecting a temperature of the build material 31, for example and without limitation, one or more infrared thermometers, thermocouples, thermopiles or the like. As shown in FIG. 6A, one or more temperature sensors 286 may be positioned rearward of the first roller 202 and/or the second roller 204, however, it should be understood that the one or more temperature sensors 286 may be coupled to the recoat assembly at any suitable position. In embodiments, subsequent to irradiating the initial layer of build material 31 with the front energy source 260 and/or irradiating the second layer of build material 31, the method further comprises detecting a temperature of the irradiated build material 31 with the temperature sensor 286. In some embodiments, the output of the front energy source 260 and/or the rear energy source 262 may be adjusted in response to the detected temperature of the build material 31 (e.g., feedback control). In some embodiments, the detected temperature may be stored such that the electronic control unit 300 may develop a model for controlling the front energy source 260 and/or the rear energy source 262 (e.g., feedforward control). For example, in some embodiments, the method further comprises changing at least one parameter of the front energy source 260 or the rear energy source 262 based at least in part on the detected temperature. Further, in some embodiments, at least one of irradiating the initial layer of build material 31 with the front energy source 260 and irradiating the second layer of build material 31 comprises applying a predetermined power to the front energy source 260 or the rear energy source 262, and the method further comprises changing the predetermined power based at least in part on the detected temperature.

In some embodiments, the recoat assembly 200 includes a distance sensor 288 communicatively coupled to the electronic control unit 300. The distance sensor 288 is generally configured to detect a thickness of a layer of build material 31 positioned below the recoat assembly 200. In embodiments, the electronic control unit 300 may receive a signal from the distance sensor 288 indicative of the layer or build material 31 moved to the build area 124. The electronic control unit 300 may change one or more parameters based on the detected thickness of the layer of build material 31 such that the recoat assembly 200 may move build material 31 to the build area 124 as desired. In embodiments, the distance sensor 288 may include any sensor suitable for detecting a thickness of build material 31, such as and without limitation, a laser sensor, an ultrasonic sensor, or the like.

In some embodiments, the second roller 204 may be positioned above the first roller 202 in the vertical direction (i.e., in the Z-direction as depicted). In these embodiments, only the first roller 202 may contact the build material 31, and the second roller 204 may act as a spare roller that can be utilized in the case of failure or malfunction of the first roller 202.

In some embodiments, the second roller 204 is rotated in a rotation direction 62 that is the opposite of the counter-rotation direction 60 and the second roller 204 contacts the build material 31 within the build area 124. The second roller 204 may be rotated at a rotational velocity that corresponds to a linear velocity of the recoat assembly 200. More particularly, by matching the rotational velocity of the second roller 204 to match the linear velocity of the recoat assembly 200, the second roller 204 may generally act to compact the build material 31, while causing minimal disruption to the build material 31 as the recoat assembly 200 moves with respect to the build area 124. In embodiments, the rotational velocity of the first roller 202 is greater than the rotational velocity of the second roller 204. In some embodiments, as the second roller 204 compacts the build material 31, the second roller 204 may be positioned lower than the first roller 202 in the vertical direction (i.e., in the Z-direction as depicted).

In some embodiments, once the second layer of build material 31 is deposited the first roller 202 is moved upward in the vertical direction (i.e., in the Z-direction as depicted), such that the first roller 202 is spaced apart from the second layer of build material 31. The recoat assembly 200 is then moved to the supply receptacle 134 in a direction that is opposite of the coating direction 31. In this way, the recoat assembly 200 may be returned to the recoat home position 148 (FIG. 2A). In some embodiments, the recoat assembly 200 is moved to the supply receptacle 134 at a return speed. In embodiments the return speed is greater than a coating speed at which the recoat assembly 200 moves the fluidized build material 31 to the build area 124. In some embodiments, to avoid damaging cured binder the build material 31, the coating speed may be limited, and accordingly, by increasing the return speed, the overall cycle time required to deposit build material 31 may be reduced.

In some embodiments, the first roller 202 and/or the second roller 204 may compact the build material 31 in the build area 124 as the recoat assembly 200 moves back to the home position 148. For example and referring to FIGS. 29A and 29B, the recoat assembly 200 is depicted moving in coating direction 40, and a direction 42 opposite the coating direction 40, respectively. In some embodiments, the method further comprises rotating the first roller 202 and/or second roller 204 in the counter-rotation direction 60. Rotating the first roller 202 and/or the second roller 204 in the counter-rotation direction 60 may comprise rotating the first roller 202 and/or the second roller 204 at a rotational velocity that corresponds to a linear velocity of the recoat assembly 200 moving toward the supply receptacle 134.

In some embodiments, before moving the recoat assembly 200 to the supply receptacle 134, the method further comprises moving the first roller 202 and/or the second roller 204 upward in the vertical direction (i.e., in the Z-direction as depicted). In some embodiments, the first roller 202 and/or the second roller 204 is moved upward between 8 micrometers and 12 micrometers in the vertical direction, inclusive of the endpoints. In some embodiments, the first roller 202 and/or the second roller 204 is moved upward about 10 micrometers in the vertical direction. In some embodiments, before moving the recoat assembly 200 to the supply receptacle 134, the method further comprises moving the first roller 202 and/or the second roller 204 upward in the vertical direction (i.e., in the Z-direction as depicted). In some embodiments, the first roller 202 and/or the second roller 204 is moved upward between 5 micrometers and 20 micrometers in the vertical direction, inclusive of the endpoints. By moving first roller 202 and/or the second roller 204 upward in the vertical direction, the first roller 202 and/or the second roller 204 may be positioned to compact the build material 31 in the build area 124.

In some embodiments, as the first roller 202 and/or the second roller 204 contacts the build material 31 in the build area 124 moving back toward the supply receptacle 134, the first roller 202 and/or the second roller 204 is rotated at a rotational velocity that corresponds to the linear velocity of the recoat assembly 200 moving back toward the supply receptacle 134. As noted above, by correlating the rotational velocity of the first roller 202 and/or the second roller 204 to the linear velocity of the recoat assembly 200, the first roller 202 and/or the second roller 204 may compact the build material 31, with minimal disruption of the build material 31 in the longitudinal direction (i.e., in the X-direction as depicted).

While FIGS. 29A and 29B include a supply receptacle 134, it should be understood that in some embodiments a supply receptacle 134 is not provided, and instead build material 31 may be placed on the build area 124 through other devices, such as the build material hopper 360 (FIG. 2B).

Figure 29D:
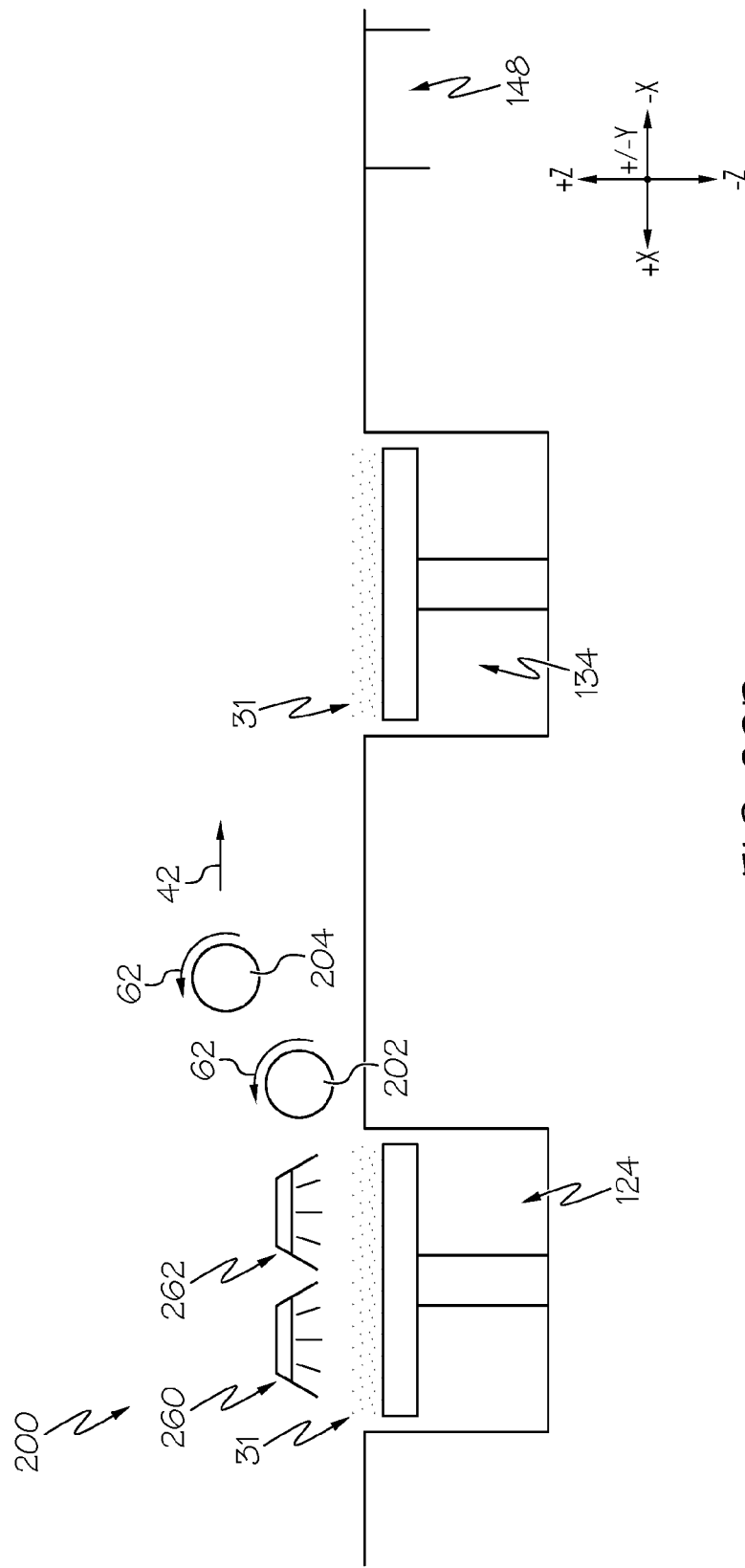
FIG. 29D schematically depicts a recoat assembly moving in a return direction, according to one or more embodiments shown and described herein.

In some embodiments, the first roller 202 and the second roller 204 may be rotated in the counter-rotation direction 60 as the recoat assembly 200 moves in the coating direction 40, as shown in FIG. 29C. In some embodiments, the first roller 202 is positioned above the second roller 204 as the recoat assembly 200 moves in the coating direction 40. The first roller 202 and the second roller 204 may be rotated in the rotation direction 62 as the recoat assembly 200 moves in the return direction 42, as shown in FIG. 29D. In some embodiments, the first roller 202 is positioned below the second roller 204 as the recoat assembly 200 moves in the return direction 42. Further, in some embodiments, the front energy source 260 and/or the rear energy source 262 may irradiate the build material 31 in the build area 124 as the recoat assembly 200 moves in the coating direction 40 (FIG. 29C) and/or as the recoat assembly 200 moves in the return direction 42.

Figure 30:
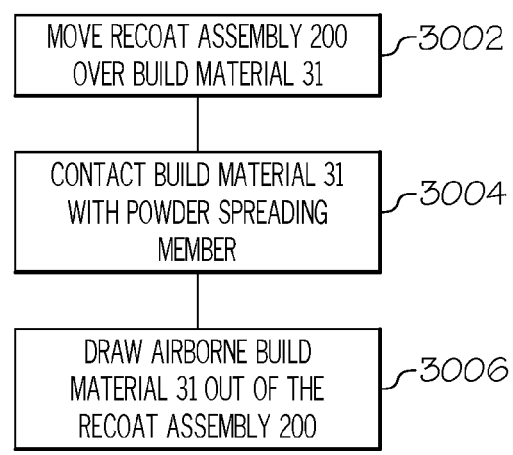
FIG. 30 is a flowchart of a method for drawing build material out of a recoat assembly, according to one or more embodiments shown and described herein.

Referring to FIGS. 24 and 30, an example method for drawing airborne build material 31 out of the recoat assembly 200 is schematically depicted. In a first step 3002, the method comprises moving the recoat assembly 200 build material 31 in the coating direction 40. At step 3004, the method further comprises contacting the build material 31 with the powder spreading member, causing at least a portion of the build material 31 to become airborne. At step 3006, the method further comprises drawing airborne build material 31 out of the recoat assembly 200 with a vacuum 290 in fluid communication with the recoat assembly 200.

In embodiments, each of steps 3002-3006 may be performed, for example, by the electronic control unit 300.

In embodiments, the vacuum 290 may draw the airborne build material 31 out of the recoat assembly 200 at one or more times during a build cycle. For example, in some embodiments, the step of drawing airborne build material 31 out of the recoat assembly 200 is subsequent to or during the step of moving the build material 31. Put another way, the vacuum 290 draws the build material 31 out of the recoat assembly 200 at the end of a build cycle. In some embodiments, the step of drawing airborne build material 31 out of the recoat assembly 200 is concurrent with the step of moving the build material 31. Put another way, the airborne build material 31 may be drawn out of the recoat assembly 200 during the build cycle in a continuous or semi-continuous manner.

In some embodiments, the vacuum 290 may apply a positive pressure to the recoat assembly 200 to dislodge build material 31 accumulated within the recoat assembly 200. For example, in some embodiments, subsequent to moving the build material 31, the vacuum 290 directs a process gas, such as air or the like, to the recoat assembly 200. In some embodiments, the vacuum 290 may apply positive pressure while the recoat assembly 200 is positioned over a drain that applies a negative pressure to collect the build material 31. In embodiments, the drain may be positioned proximate to the build area 134 (FIG. 2A).

Based on the foregoing, it should be understood that embodiments described herein are directed to recoat assemblies for an additive manufacturing system. In embodiments described herein, recoat assemblies include one or more sensors that detect forces acting on the recoat assembly. By detecting forces acting on the recoat assembly, defects may be identified and one or more parameters related to the operation of the recoat assembly may be adjusted to optimize the performance of the recoat assembly. In some embodiments, recoat assemblies described herein may include multiple redundant components, such as rollers and energy sources, such that the recoat assembly may continue operation in the event of failure of one or more components of the recoat assemblies. In some embodiments, recoat assemblies described herein are in fluid communication with a vacuum that acts to collect and contain airborne build material.

Further aspects of the embodiments are provided by the subject matter of the following clauses:

1. A recoat assembly for an additive manufacturing system, the recoat assembly comprising a base member that is movable in a lateral direction, a powder spreading member coupled to the base member, wherein the base member at least partially encapsulates the powder spreading member, and a vacuum in fluid communication with at least a portion of the base member.

2. The recoat assembly of any preceding clause, further comprising at least one energy source coupled to the base member.

3. The recoat assembly of any preceding clause, further comprising an agitation device configured to vibrate the recoat assembly.

4. The recoat assembly of any preceding clause wherein the base member comprises a primary containment housing that at least partially encapsulates the powder spreading member and a secondary containment housing that at least partially encapsulates and is spaced apart from the primary containment housing.

5. The recoat assembly of any preceding clause, wherein the vacuum is in fluid communication with a cavity defined by the primary containment housing and the secondary containment housing.

6. The recoat assembly of any preceding clause, wherein the powder spreading member is a doctor blade.

7. The recoat assembly of any preceding clause, wherein the powder spreading member is a roller rotatably coupled to the base member.

8. The recoat assembly of any preceding clause, wherein the roller is a first roller, and the recoat assembly further comprises a second roller rotatably coupled to the base member and at least partially encapsulated by the base member.

9. The recoat assembly of any preceding clause, wherein the recoat assembly further comprises a cleaning member selectively engageable with at least one of the first roller and the second roller.

10. The recoat assembly of any preceding clause, wherein the cleaning member comprises a cleaning roller positioned between and engaged with the first roller and the second roller.

11. The recoat assembly of any preceding clause, wherein the base member comprises a primary containment housing that at least partially encapsulates the powder spreading member.

12. The recoat assembly of any preceding clause, wherein the vacuum is in fluid communication with the primary containment housing.

13. The recoat assembly of any preceding clause, further comprising a diffuser plate positioned between the vacuum and the powder spreading member, the diffuser plate defining a plurality of apertures extending therethrough.

14. A method for forming an object, the method comprising moving a recoat assembly over a build material a coating direction, wherein the recoat assembly comprises a powder spreading member, contacting the build material with the powder spreading member, causing at least a portion of the build material to become airborne, and drawing airborne build material out of the recoat assembly with a vacuum in fluid communication with the recoat assembly.

15. The method of any preceding clause, further comprising moving build material over a build area with the powder spreading member, thereby depositing a second layer of the build material over an initial layer of build material.

16. The method of any preceding clause, wherein the step of drawing airborne build material out of the recoat assembly is subsequent to the step of moving the build material.

17. The method of any preceding clause, wherein the step of drawing airborne build material out of the recoat assembly is concurrent with the step of moving the build material.

18. The method of any preceding clause, further comprising, subsequent to moving the build material, directing air to the recoat assembly.

19. The method of any preceding clause, wherein the powder spreading member comprises a roller and the method further comprises rotating the roller.

20. The method of any preceding clause, wherein contacting the build material with the roller causes at least a portion of the build material to fluidize.

21. The method of any preceding clause, wherein drawing the airborne build material out of the recoat assembly comprises applying a vacuum pressure to a containment housing that at least partially encapsulates the powder spreading member.

22. The method of any preceding clause, further comprising, subsequent to moving the recoat assembly over the build material, directing process gas to the recoat assembly.

23. The method of any preceding clause, wherein directing air to the recoat assembly comprises directing air to a containment housing that at least partially encapsulates the roller.

24. The method of any preceding clause, wherein directing air to the recoat assembly comprises directing air to at least one of a secondary containment housing that is spaced apart from and at least partially encapsulates a primary containment housing that at least partially encapsulates the roller.

25. The method of any preceding clause, wherein drawing the airborne build material out of the recoat assembly comprises applying a vacuum pressure to a secondary containment housing that is spaced apart from and at least partially encapsulates a primary containment housing that at least partially encapsulates the at the powder spreading member.

26. The method of any preceding clause, further comprising, irradiating, with a front energy source coupled to an end of the recoat assembly, an initial layer of build material.

27. The method of any preceding clause, further comprising, subsequent to irradiating the initial layer of build material, moving the fluidized build material to a build area, thereby depositing a second layer of the build material over the initial layer of build material.

28. The method of any preceding clause, further comprising collecting the airborne build material drawn from the recoat assembly, and directing the collected build material beneath the recoat assembly.

29. The method of any preceding clause, further comprising vibrating the recoat assembly with an agitation device coupled to the recoat assembly.

30. An additive manufacturing system comprising a recoat assembly comprising a base member that is movable in a lateral direction, a powder spreading member coupled to the base member, wherein the base member at least partially encapsulates the powder spreading member, and a vacuum in fluid communication with at least a portion of the base member, an electronic control unit communicatively coupled to the vacuum, and a build area positioned below the recoat assembly.

31. The additive manufacturing system of any preceding clause, wherein the build area comprises a build receptacle positioned below the recoat assembly.

32. The additive manufacturing system of any preceding clause, further comprising a supply receptacle spaced apart from the build area.

33. The additive manufacturing system of any preceding clause, further comprising a build material hopper.

34. The additive manufacturing system of any preceding clause, wherein the electronic control unit directs the vacuum to draw build material out of the recoat assembly.

35. The additive manufacturing system of any preceding clause, wherein the base member comprises a primary containment housing that at least partially encapsulates the powder spreading member and a secondary containment housing that at least partially encapsulates and is spaced apart from the primary containment housing.

36. The additive manufacturing system of any preceding clause, wherein the vacuum is in fluid communication with the secondary containment housing.

37. The additive manufacturing system of any preceding clause, further comprising a recoat assembly transverse actuator coupled to the base member and communicatively coupled to the electronic control unit.

38. The additive manufacturing system of any preceding clause, wherein the electronic control unit directs the recoat assembly transverse actuator to move the base member in the lateral direction to move build material with the powder spreading member, thereby depositing a second layer of the build material over an initial layer of build material positioned in the build area.

39. The additive manufacturing system of any preceding clause, wherein the electronic control unit directs the vacuum to draw airborne build material out of the recoat assembly while directing the recoat assembly transverse actuator to move the build material.

40. The additive manufacturing system of any preceding clause, wherein the electronic control unit directs the vacuum to draw airborne build material out of the recoat assembly concurrently with directing the recoat assembly transverse actuator to move the build material.

41. The additive manufacturing system of any preceding clause, wherein the electronic control unit, subsequent to directing the recoat assembly transverse actuator to move the build material, directs the vacuum to direct air to a primary containment housing that at least partially encapsulates the powder spreading member.

42. The additive manufacturing system any preceding clause, wherein the powder spreading member comprises a roller.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A recoat assembly for an additive manufacturing system, the recoat assembly comprising:
   a base member that is movable in a lateral direction, the base member including a primary containment housing and a secondary containment housing that at least partially encapsulates and is spaced apart from the primary containment housing;
   a powder spreading member coupled to the base member, wherein the primary containment housing at least partially encapsulates the powder spreading member; and
   a vacuum in fluid communication with at least a portion of the base member and a cavity defined by the primary containment housing and the secondary containment housing.

2. The recoat assembly of claim 1, further comprising an agitation device configured to vibrate the recoat assembly.

3. The recoat assembly of claim 1, wherein the powder spreading member is a doctor blade.

4. The recoat assembly of claim 1, wherein the powder spreading member is a roller rotatably coupled to the base member.

5. The recoat assembly of claim 4, wherein the roller is a first roller, and the recoat assembly further comprises a second roller rotatably coupled to the base member and at least partially encapsulated by the base member.

6. The recoat assembly of claim 5, wherein the recoat assembly further comprises a cleaning member selectively engageable with at least one of the first roller and the second roller.

7. A method for forming an object, the method comprising:
moving a base member of a recoat assembly over a build material in a coating direction, wherein the recoat assembly comprises a powder spreading member, the base member including a primary containment housing that at least partially encapsulates the powder spreading member and a secondary containment housing that at least partially encapsulates and is spaced apart from the primary containment housing;
contacting the build material with the powder spreading member, causing at least a portion of the build material to become airborne; and
drawing airborne build material out of the recoat assembly with a vacuum in fluid communication with the recoat assembly and a cavity defined by the primary containment housing and the secondary containment housing.

8. The method of claim 7, further comprising moving build material over a build area with the powder spreading member, thereby depositing a second layer of the build material over an initial layer of build material.

9. The method of claim 7, further comprising, subsequent to moving the recoat assembly over the build material, directing process gas to the recoat assembly.

10. The method of claim 7, further comprising, irradiating, with a front energy source coupled to an end of the recoat assembly, an initial layer of build material.

11. The method of claim 10, further comprising, subsequent to irradiating the initial layer of build material, moving the fluidized build material to a build area, thereby depositing a second layer of the build material over the initial layer of build material.

12. An additive manufacturing system comprising:
a recoat assembly comprising:
a base member including a primary containment housing and a secondary containment housing that is spaced apart from the primary containment housing;
a powder spreading member, wherein the primary containment housing at least partially encapsulates the powder spreading member; and
a vacuum in fluid communication with at least a portion of the base member and a cavity defined by the primary containment housing and the secondary containment housing;
an electronic control unit communicatively coupled to the vacuum; and
a build area positioned below the recoat assembly.

13. The additive manufacturing system of claim 12, wherein the electronic control unit directs the vacuum to draw build material out of the recoat assembly.

14. The additive manufacturing system of claim 12, further comprising a recoat assembly transverse actuator coupled to the base member and communicatively coupled to the electronic control unit, wherein the electronic control unit directs the recoat assembly transverse actuator to move the base member in a lateral direction to move build material with the powder spreading member, thereby depositing a second layer of the build material over an initial layer of build material positioned in the build area.

15. The additive manufacturing system of claim 14, wherein the electronic control unit directs the vacuum to draw airborne build material out of the recoat assembly while directing the recoat assembly transverse actuator to move the build material.

* * * * *